United States Patent
Jeon et al.

(10) Patent No.: US 9,813,766 B2
(45) Date of Patent: Nov. 7, 2017

(54) DIGITAL DEVICE AND DATA PROCESSING METHOD BY DIGITAL DEVICE

(71) Applicant: LG ELECTRONICS INC., Seoul (KR)

(72) Inventors: Sanghoon Jeon, Seoul (KR); Peter Nordstrom, Santa Clara, CA (US); Ian Cain, Santa Clara, CA (US); Yousun Lee, Seoul (KR); Robert Jagt, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/121,867

(22) PCT Filed: Feb. 3, 2015

(86) PCT No.: PCT/KR2015/001087
§ 371 (c)(1),
(2) Date: Aug. 26, 2016

(87) PCT Pub. No.: WO2015/130022
PCT Pub. Date: Sep. 3, 2015

(65) Prior Publication Data
US 2017/0019717 A1    Jan. 19, 2017

Related U.S. Application Data

(60) Provisional application No. 61/945,078, filed on Feb. 26, 2014.

(30) Foreign Application Priority Data

Sep. 30, 2014 (KR) .......................... 10-2014-0131938
Sep. 30, 2014 (KR) .......................... 10-2014-0131939

(51) Int. Cl.
| | |
|---|---|
| H04N 21/462 | (2011.01) |
| H04N 21/414 | (2011.01) |
| H04N 21/431 | (2011.01) |

(52) U.S. Cl.
CPC ... *H04N 21/4622* (2013.01); *H04N 21/41407* (2013.01); *H04N 21/4312* (2013.01); *H04N 21/4316* (2013.01)

(58) Field of Classification Search
None
See application file for complete search history.

(56) References Cited

U.S. PATENT DOCUMENTS

2011/0252430 A1* 10/2011 Chapman ................ G06F 9/485
                                                          718/107
2012/0092450 A1*  4/2012 Choi ..................... H04N 13/004
                                                          348/43

(Continued)

FOREIGN PATENT DOCUMENTS

| | | |
|---|---|---|
| KR | 10-2012-0011137 | 2/2012 |
| KR | 10-2013-0048290 | 5/2013 |

(Continued)

OTHER PUBLICATIONS

International Search Report and Written Opinion dated May 12, 2015 issued in Application No. PCT/KR2015/001087 (with English translation).

*Primary Examiner* — Nicholas Corbo
(74) *Attorney, Agent, or Firm* — KED & Associates, LLP

(57) ABSTRACT

Disclosed are various embodiment(s) for a digital device and a service processing method by the digital device. Here, a digital device according to an embodiment of the present invention comprises: a display processing unit for transmitting a first lifecycle message, a second lifecycle message, and coordinate information on the size and the position of the second application in a display, to Webkits of a first (Continued)

application and a second application, when a plurality of applications exist in the foreground; a display engine comprising a main sink for the first application and a sub sink for the second application; and a video processing unit for connecting the first application to the main sink of the display engine according to an identifier and a connection request received from a Webkit of the first application and connecting the second application to the sub sink of the display engine according to an identifier and a connection request received from a Webkit of the second application. Therefore, the digital device outputs a video source of the plurality of applications existing in the foreground.

20 Claims, 69 Drawing Sheets

(56) References Cited

U.S. PATENT DOCUMENTS

| | | | |
|---|---|---|---|
| 2013/0113996 A1* | 5/2013 | Zhu | H04N 5/45 348/565 |
| 2014/0007123 A1* | 1/2014 | Yuan | G06F 3/0488 718/103 |
| 2014/0059628 A1* | 2/2014 | Kuo | H04N 21/4122 725/109 |

FOREIGN PATENT DOCUMENTS

| | | |
|---|---|---|
| KR | 10-2013-0127423 | 11/2013 |
| KR | 10-2014-0001120 | 1/2014 |
| KR | 10-2014-0022764 | 2/2014 |

* cited by examiner (a)　　　　　　　　　(b)

FIG. 26
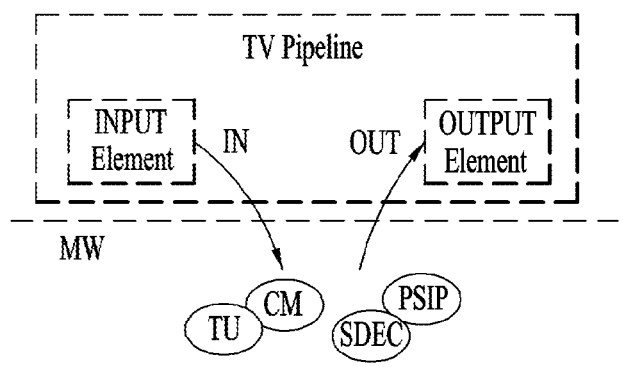
(a)
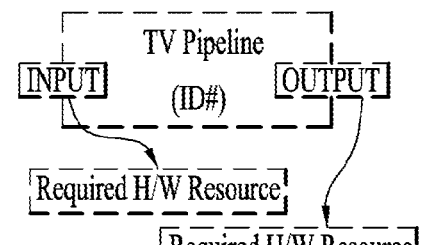
(b)
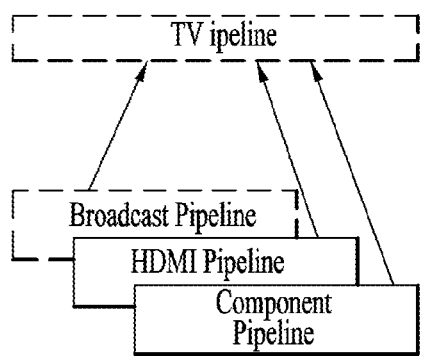
(c)

FIG. 27
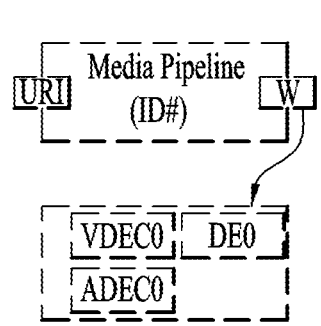
(a)
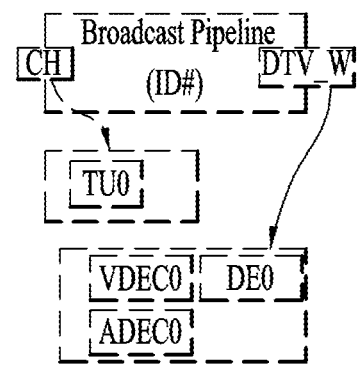
(b)
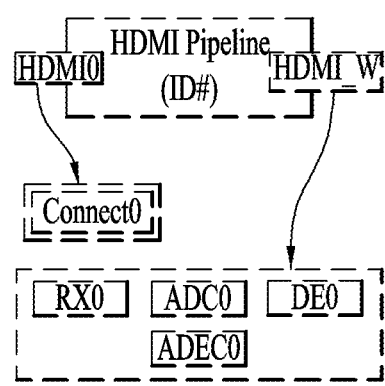
(c)

FIG. 28
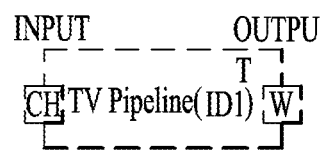
(a)
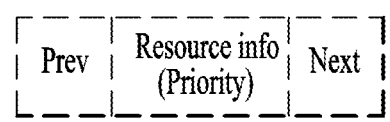
(b)
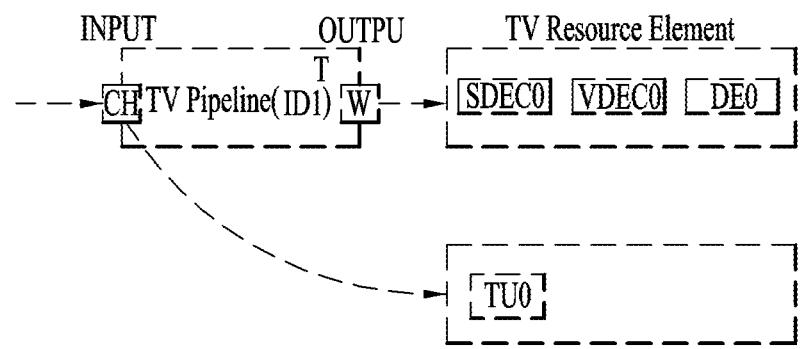
(c)

(a)    (b)

FIG. 43
(a) 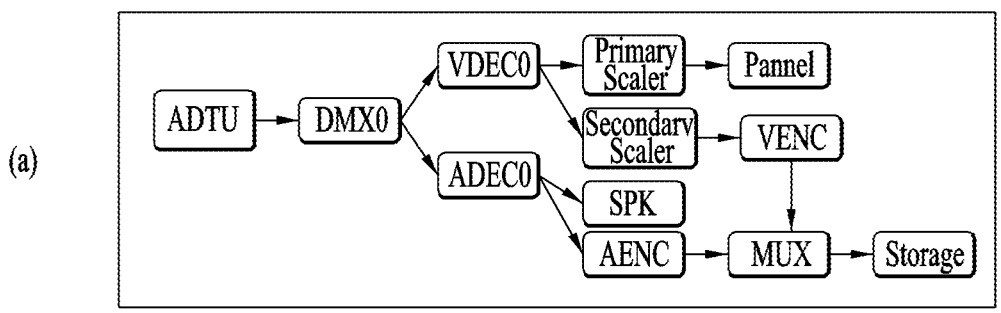
(b) 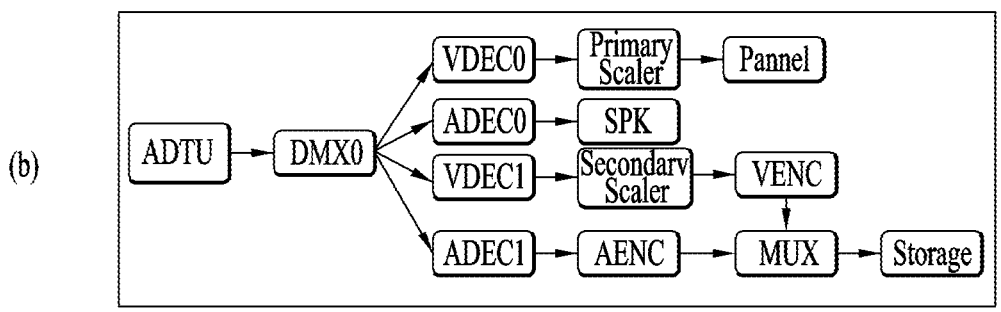
(c) 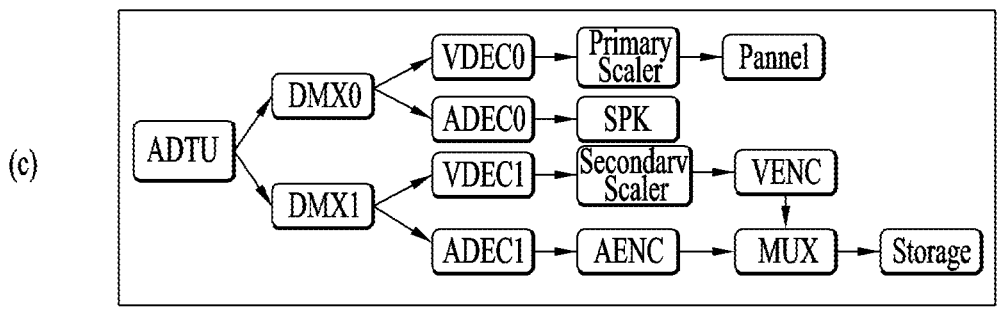

FIG. 44
(a) 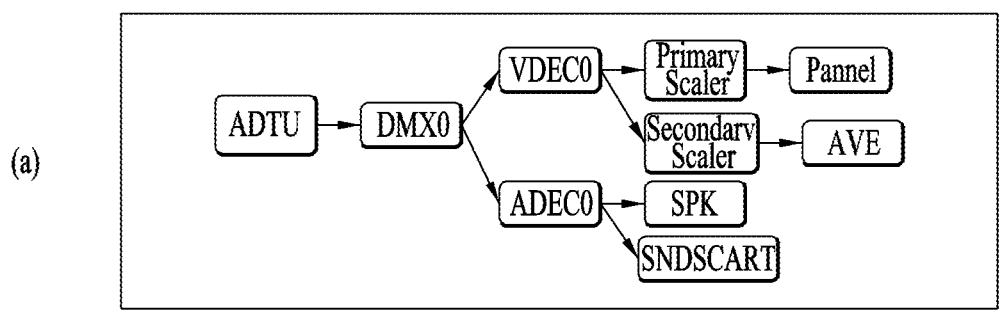
(b) 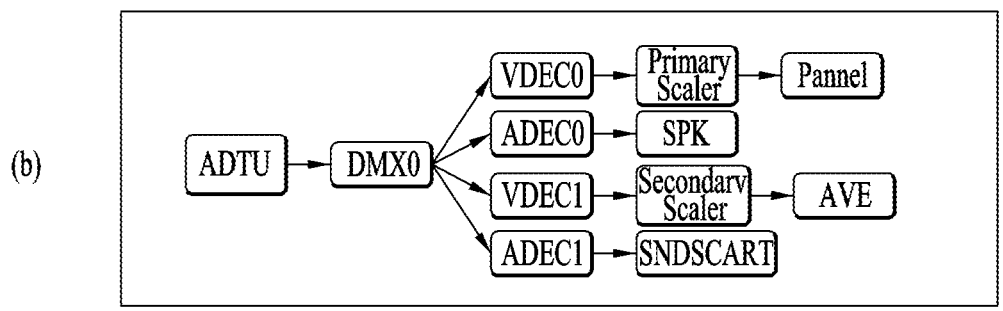
(c) 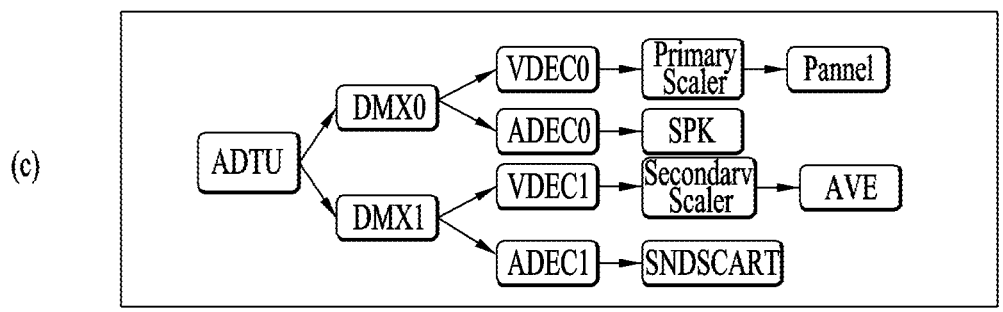

FIG. 76
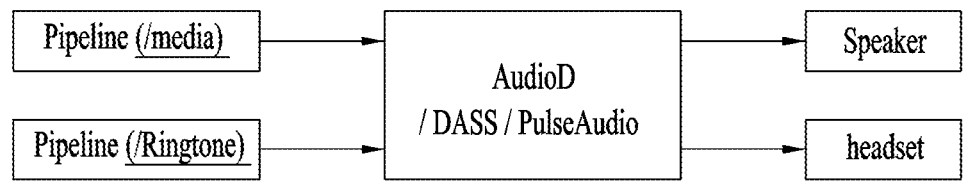
(A)
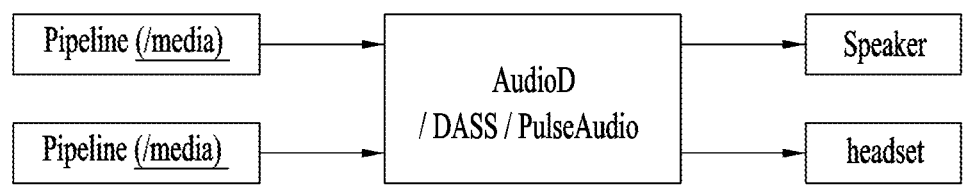
(B)
FIG. 77
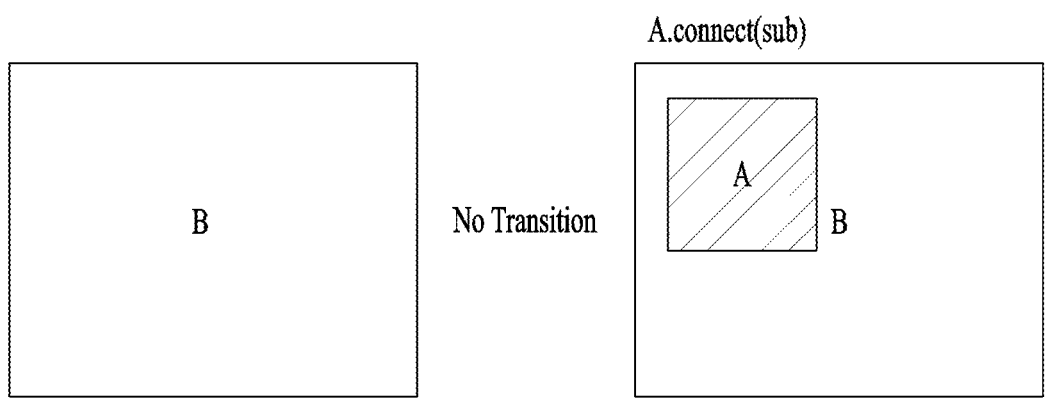

| video | Move | | operation |
|---|---|---|---|
| single(main video only) | full | pip | Transition effect Using VTG |
| | pip | full | Transition effect Using VTG |
| double ( main + sub video) | full | pip | No Transition effect, connect to sub sink. |
| | pip | full | No Transition effect, connect to main sink. |

DIGITAL DEVICE AND DATA PROCESSING METHOD BY DIGITAL DEVICE

CROSS-REFERENCE TO RELATED PATENT APPLICATIONS

This application is a U.S. National Stage Application under 35 U.S.C. §371 of PCT Application No. PCT/KR2015/001087, filed Feb. 3, 2015, which claims priority to U.S. Provisional Application No. 61/945,078 filed Feb. 26, 2014, Korean Patent Application No. 10-2014-0131938, filed Sep. 30, 2014, and Korean Patent Application No. 10-2014-0131939, filed Sep. 30, 2014, whose entire disclosures are hereby incorporated by reference.

TECHNICAL FIELD

The present invention relates to a digital device, and more particularly, to data processing such as video/application, etc. in a digital device with a web operating system (OS) platform installed therein.

BACKGROUND ART

Mobile devices such as smart phones and tablet personal computers (PCs) have been remarkably developed subsequent to standing devices such as personal computers (PCs) and televisions (TVs). Standing devices and mobile devices have been separately developed in respective fields but the differences between the fields have blurred along with the recent boom of digital convergence.

In addition, due to the development and change in environments of such digital devices, user expectation has become high and, thus, there are gradual needs for various high-specification services or application resources.

Generally, a conventional digital TV or the like provides a picture in picture (PIP) function. However, the PIP can be used only in the case of a plurality of tuners for a broadcast service, and since a display window for PIP is configured by previously punching a hole in an on screen display (OSD), movement and so on of the window are difficult. In addition, the PIP service is limited to a broadcast service of a digital device and, thus, it is difficult to apply the PIP service to an application and so on.

DISCLOSURE

Technical Problem

An object of the present invention devised to solve the problem lies in a device and method for processing data such as a service, an application, and video in a web operating system (OS).

An object of the present invention devised to provide a run-time view, resource management, policy management, and so on, required to process such as a service, an application, and video in a web OS.

Another object of the present invention devised to process and provide picture in picture (PIP) or app on app by a digital device with a web OS installed therein.

Another object of the present invention devised to process a plurality of applications in the foreground to enable multitasking in a web OS.

Another object of the present invention devised to enhance user convenience of a web OS and product satisfaction through the aforementioned handling process.

Another object of the present invention devised to enhance user usage satisfaction using multitasking handling through PIP or app on app as described above.

It is to be understood that both the foregoing general description and the following detailed description of the present invention are exemplary and explanatory and are intended to provide further explanation of the invention as claimed.

Technical Solution

The present specification discloses various embodiment(s) of a digital device and a processing method in the digital device.

The object of the present invention can be achieved by providing a digital device including a display processor configured to transmit a first lifecycle message and a second lifecycle message, and coordinate information on a size and a position in a display of a second application to Webkits of a first application and the second application, respectively when a plurality of applications are in the foreground, a display engine comprising a main sink for the first application and a sub sink for the second application, and a video processor configured to connect the first application to the main sink of the display engine according to an identifier and connection request received by the Webkit of the first application, to connect the second application to the sub sink of the display engine according to an identifier and connection request received by the Webkit of the second application, and to output a video source of the plurality of applications in the foreground.

In another aspect of the present invention, provided herein is a method of processing an application, the method including transmitting a first lifecycle message and a second lifecycle message, and coordinate information on a size and a position in a display of a second application to Webkits of a first application and the second application, respectively when a plurality of applications are in the foreground, by a display processor, requesting a video processor for connection with a display engine based on an identifier received by the Webkit of the first application, connecting the first application to a main sink of the first application, requesting the video processor for connection based on an identifier received by the Webkit of the second application, connecting the second application to a sub sink of the display engine, transmitting the coordinate information received by the Webkit of the second application to the sub sink, and outputting a video source of the plurality of application in the foreground.

It is to be understood that both the foregoing general description and the following detailed description of the present invention are exemplary and explanatory and are intended to provide further explanation of the invention as claimed.

Advantageous Effects

The present invention may have the following advantageous effects.

An embodiment of various embodiments of the present invention may provide a device and method for processing data such as a service, an application, and video in a web operating system (OS).

Another embodiment of various embodiments of the present invention may provide a run-time view, resource management, policy management, and so on, required to process such as a service, an application, and video in a web OS.

Another embodiment of various embodiments of the present invention may enhance user convenience of a web OS and product satisfaction through the aforementioned handling process.

Another embodiment of various embodiments of the present invention may process and provide picture in picture (PIP) or app on app by a digital device with a web OS installed therein.

Another embodiment of various embodiments of the present invention may process a plurality of applications in the foreground to enable multitasking in a web OS.

Another embodiment of various embodiments of the present invention may enhance user usage satisfaction using multitasking handling through PIP or app on app as described above.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 26 is a diagram for explanation of a structure of a pipeline according to an embodiment of the present invention;

FIG. 27 is a diagram for explanation of a type of a pipeline according to an embodiment of the present invention;

FIG. 28 is a diagram for explanation of definition of the characteristic of a pipeline according to an embodiment of the present invention;

FIGS. 42 to 49 are diagrams for explanation of resource arrangement configured for an operation(s) according to an embodiment of the present invention;

FIG. 76 is a diagram for explanation of audio handling when there is a PIP issue according to an embodiment of the present invention;

FIGS. 77 to 84 are diagrams for explanation of a PIP window transition for video according to an embodiment of the present invention;

FIG. 85 is a diagram for explanation of a PIP window transition procedure according to an embodiment of the present invention;

BEST MODE

Figure 1:
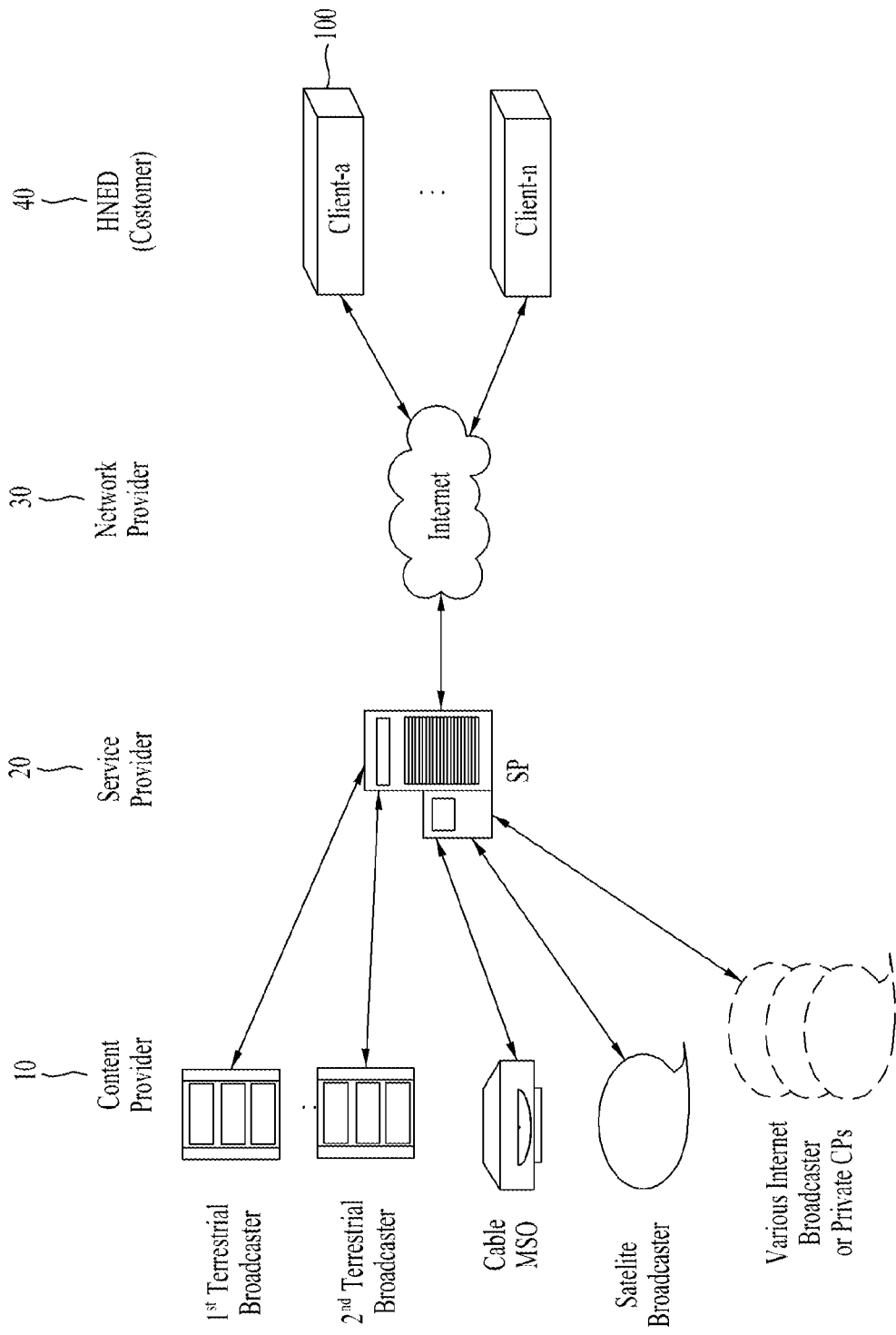
FIG. 1 is a schematic diagram for explanation of a service system including a digital device according to an embodiment of the present invention.

Description will now be given in detail according to exemplary embodiments disclosed herein, with reference to the accompanying drawings.

For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, contents specified in the present disclosure or drawings are an embodiment of the present invention, so a scope of the present invention must be determined through a claim set.

A digital device according to an embodiment of the present disclosure as set forth herein may be any device that can handle any one of transmitting, receiving, handling and outputting data, content, service, application, and so forth. The digital device may be connected to other digital devices through wired network or wireless network, paired or connected to an external server, and through the connections, the digital device may transmit and receive the prescribed data. Examples of the digital device may include standing devices such as a network television (TV), a Hybrid Broadcast Broadband TV (HBBTV), a smart TV, Internet Protocol TV (IPTV), and personal computer (PC), or mobile (or handheld) devices such as a Personal Digital Assistant (PDA), a smart phone, a tablet PC, or an Notebook computer. For convenience of description, in this disclosure, the Digital TV (DTV) is used in FIG. 2 and the mobile device is used in FIG. 3 depicting the digital device. Further, the digital device in this disclosure may be referred to configuration comprising only a panel, set-top box (STB), or a SET including the entire system.

Moreover, the wired/wireless network described in this disclosure may refer to various pairing methods, standard telecommunication network protocol methods which are supported for transmitting and receiving data between digital devices or between digital device and the external server. The wired or wireless network also includes various telecommunication network protocols supported now as well as in the future. Examples of the wired or wireless network include wired networks supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless networks supported by various standards including Bluetooth™, Radio Frequency Identification (RFID), infrared Data Association (IrDA), Ultra Wideband (UWB), ZigBee, Digital Living Network Alliance (DLNA), Wireless LAN (WLAN) (Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, the disclosure referring simply to the digital device can include a standing device or a mobile device depending on the context, and when it is not referred to a specific device, the digital device referred in this disclosure refers to both standing and mobile device.

Meanwhile, the digital device may perform intelligent functions such as receiving broadcasting program, operating computer functions, and supporting at least one external input, and by being connected through the network wired or wirelessly, the digital device may support e-mail functions, web browsing functions, banking, gaming, and executing applications. The digital device may further include an interface for any one of input or control means supporting a handwriting input, a touch-screen, and a spatial remote control.

Furthermore, the digital device may use a standard operating system (OS), however, the digital device described in this disclosure and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input mechanisms or digital devices, capable of transmitting and receiving data through wired or wireless network connected to and from the digital device. For example, the external input includes High Definition Multimedia Interface (HDMI), game devices such as Playstation or X-Box, smart phone, tablet PC, printing device such as pocket photo, digital devices such as smart TV and blue-ray device.

The "server" referred to as in this disclosure, includes a digital device or a system capable of transmitting and receiving data to and from a client, and may also be referred to as a processor. For example, the server may be servers providing services such as a portal server providing a web page, a web content or a web service, an advertising server providing advertising data, a content server, a Social Network Service (SNS) server providing a SNS service, a service server providing a service by a manufacturer, a Multichannel Video Programming Distributor (MVPD) providing a Video on Demand (VoD) or a streaming service, and a service server providing pay services.

When an application is described for the convenience of explanation, the meaning of disclosure in the context may include services as well as applications.

In the following description, various embodiments according to the present invention are explained with reference to attached drawings.

FIG. 1 illustrates a broadcast system including a digital device according to an embodiment of the present invention.

Referring to FIG. 1, examples of a broadcast system comprising a digital device may include a content provider (CP) 10, a service provider (SP) 20, a network provider (NP) 30, and a home network end user (HNED) (Customer) 40. The HNED 40 includes a client 100, that is, a digital device.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Figure 2:
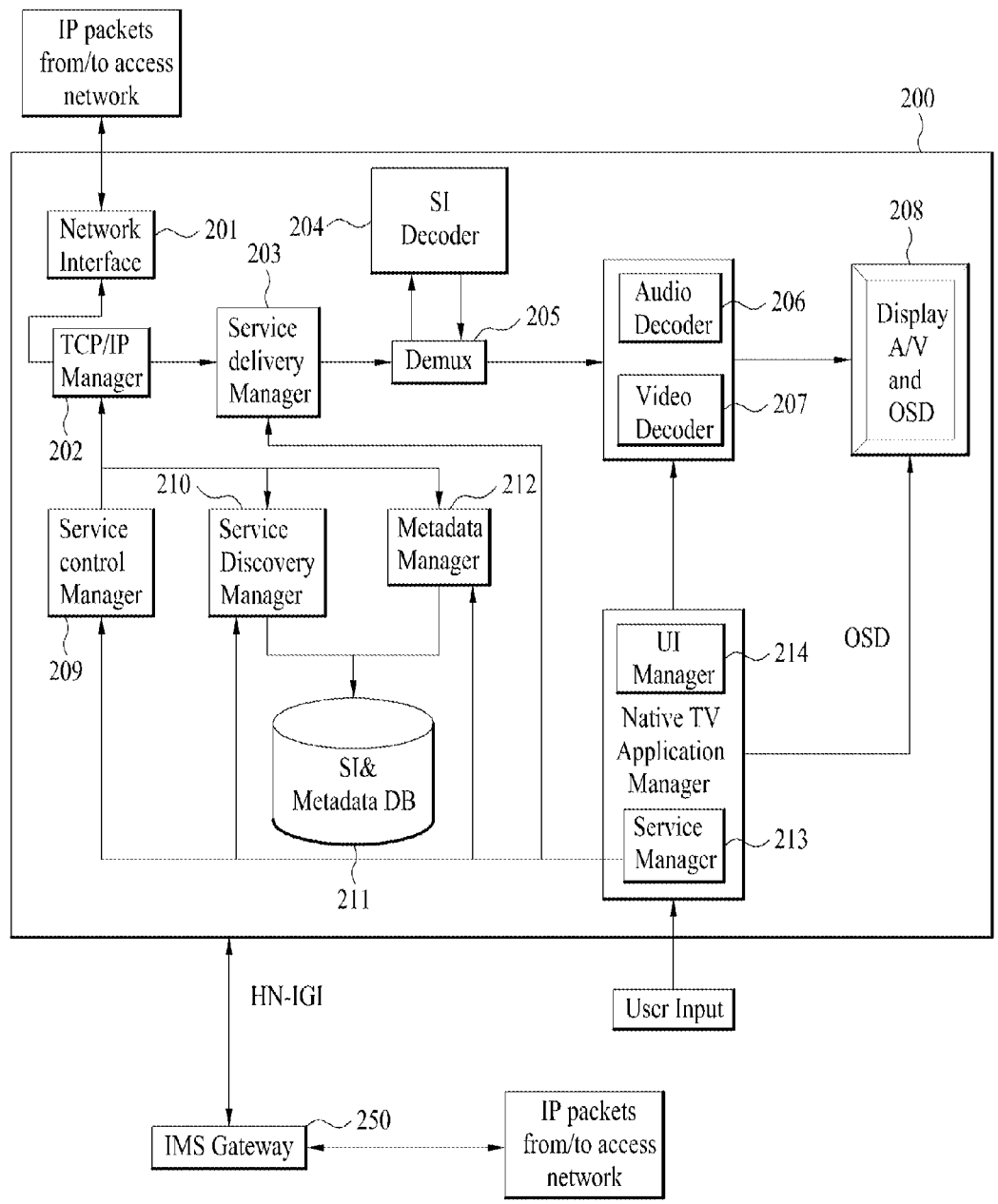
FIG. 2 is a block diagram for explanation of a digital device according to an embodiment of the present invention.
Figure 3:
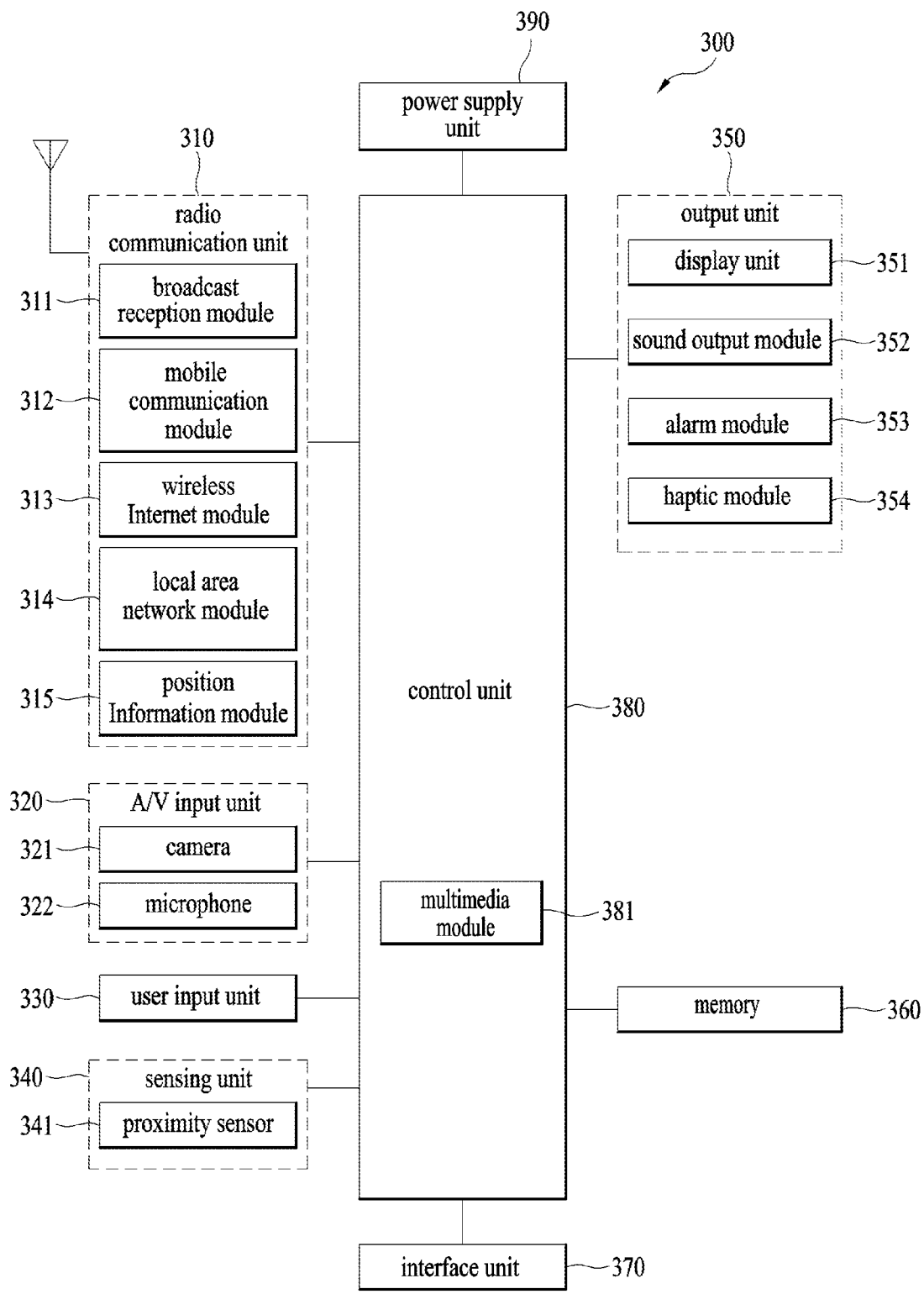
FIG. 3 is a block diagram for explanation of a digital device according to another embodiment of the present invention.

FIG. 2 is a schematic diagram of a digital device 200 according to an embodiment of the present invention.

Hereinafter, the digital device may correspond to the client 100 shown in FIG. 1.

The digital device 200 may include a network interface 201, a TCP/IP manager 202, a service delivery manager 203, an SI decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI (user interface) manager, etc.

The network interface 201 may receive or transmit internet protocol (IP) packets or IP datagrams (hereinafter, IP packet(s)) through an accessed network. As an example, the network interface 201 may receive service, application, content and the like from the service provider 20 of FIG. 1 via the network.

The TCP/IP manager 202 may involve delivery of IP packets transmitted to the digital device 200 and IP packets transmitted from the digital device 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212 and the like.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feedback network reception information to the server on the basis of the RTP.

The demultiplexer 205 may demultiplex audio data, video data, SI from a received packet and transmit the demultiplexed data to the audio/video decoder 206/207 and the SI decoder 204, respectively.

The SI decoder 204 may decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 may store the parsed and/or decoded SI data in the SI&metadata DB 211. The SI data stored in the SI&metadata DB 211 can be read or extracted and used by a component which requires the SI data.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, perform a function of a controller of the digital device 200. In other words, the application manager may administrate the overall state of the digital device 200, provide a UI, and manage other mangers.

The UI manager 214 can provide a graphic user interface (GUI)/UI through OSD, receive a key input from the user and provide a graphical user interface (GUI) related to a receiver operation corresponding to the key input through OSD. For instance, the UI manager 214 transmits the key input signal to the service manager 213 if the key input related to a channel selection from the user.

The service manager 213 may control and manage service-related managers such as the service delivery manager 203, the service discovery manager 210, the service control manager 209, the metadata manager 212, and the like.

The service manager 213 may configure a channel map and enable channel control at the request of the user on the basis of the channel map. The service manager 213 may receive service information corresponding to channel from the SI decoder 204 and set audio/video PID of a selected channel to the demultiplexer 205 so as to control the demultiplexing procedure of the demultiplexer 205.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

The SI & metadata DB 211 can be implemented using a Non-Volatile RAM (NVRAM) or a Flash memory, and the like.

An IMS (IP Multimedia Subsystem) gateway 250 may include functions required to access an IMS based IPTV services.

FIG. 3 is a block diagram of a mobile terminal 300 in accordance with an embodiment of the present invention.

FIG. 2 specifies a standing device as an embodiment of the digital device, and FIG. 3 specifies a mobile terminal as another embodiment of the digital device.

With reference to FIG. 3, the mobile terminal 300 includes a wireless communication unit 310, an A/V (audio/video) input unit 320, a user input unit 330, a sensing unit 340, an output unit 350, a memory 360, an interface unit 370, a controller 380, a power supply unit 390, and the like.

Hereinafter, each element is specified as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) and an electronic service guide (ESG).

The broadcast receiving module 311 may be configured to receive broadcast signals transmitted from various types of broadcast systems. By non-limiting example, such broadcasting systems may include ATSC, DVB-T (Digital Video Broadcasting-Terrestrial), DVB-S(Satellite), media forward link only (MediaFLO™), integrated services digital broadcast-terrestrial (ISDB-T) and DTMB/CMMB. Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from at least one of a base station, an external terminal, or a server via a mobile network. Such wireless signals may carry audio, video, and data according to text/multimedia messages.

The wireless Internet module 313 includes wireless Internet access. This module may be internally or externally coupled to the mobile terminal 300. The wireless Internet technology can include WLAN (Wireless LAN) (Wi-Fi), Wibro™ (Wireless broadband), Wimax™ (World Interoperability for Microwave Access), HSDPA (High Speed Downlink Packet Access).

The short-range communication module 314 facilitates relatively short-range communications. Suitable technologies for implementing this module include Bluetooth™, radio frequency identification (RFID), infrared data association (IrDA), ultra-wideband (UWB), ZigBee™, RS-232, RS-485.

The position-location module 315 identifies or otherwise obtains the location of the mobile terminal 100. According to one embodiment, this module may be implemented with a global positioning system (GPS) module.

The audio/video (A/V) input unit 320 is configured to provide audio or video signal input to the mobile terminal 300. As shown, the AN input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341 including a near field communication (NFC), and the like.

The output unit 350 generates an output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
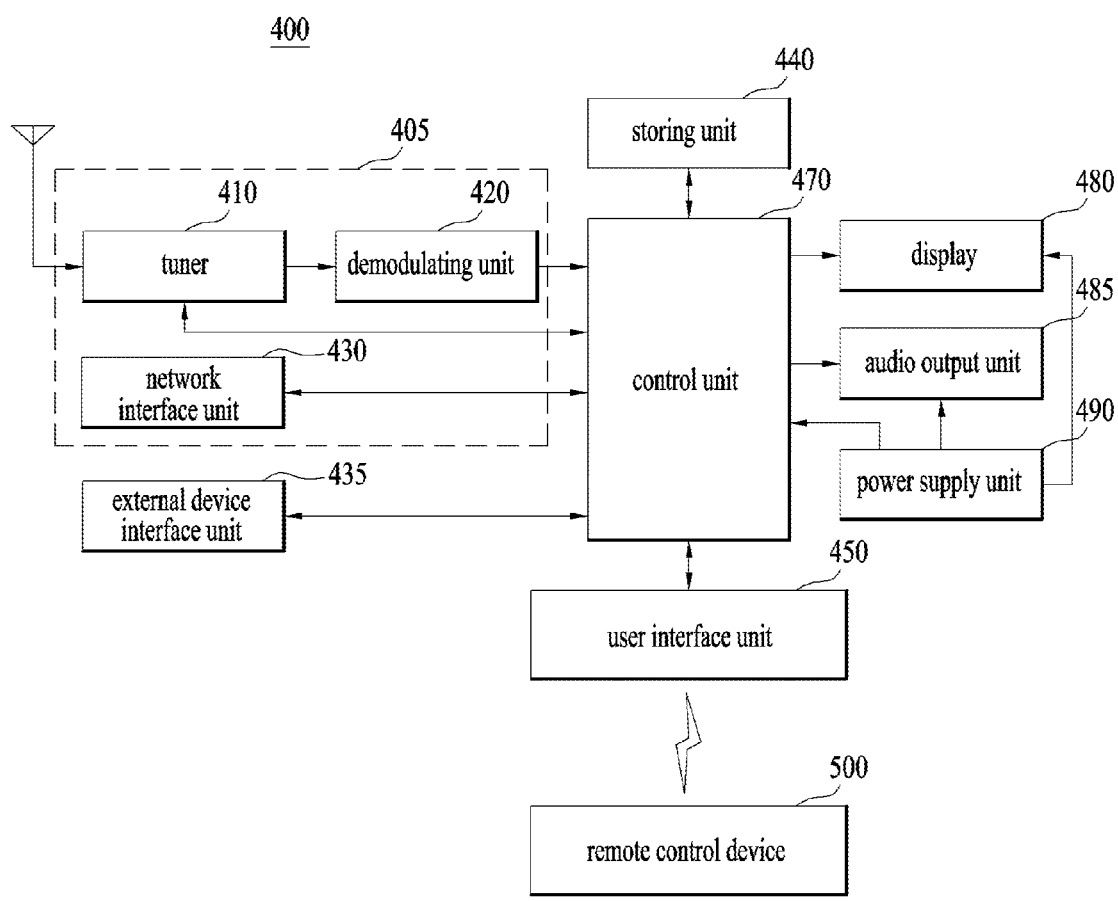
FIG. 4 is a block diagram for explanation of a digital device according to another embodiment of the present invention.

FIG. 4 illustrates a digital device according to another embodiment of the present invention.

Referring to FIG. 4, an exemplary digital device 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 410 can process both the digital broadcast signal and the analog broadcast signal. The analog baseband image or a voice signal output from the tuner 410 can be directly input to the controller 470.

The tuner 410 can receive a RF broadcast signal of single carrier or multiple carriers. The tuner 410 can sequentially tune and receive a RF broadcast signal of all broadcast channel stored by a channel memory function among RF broadcast signal received through an antenna to. And, the tuner 410 can convert the received RF broadcast signal into the DIF.

The demodulator 420 receives the DIF signal, demodulates the received DIF signal, and performs a channel decoding, etc. For this, the demodulator 420 includes a trellis decoder, a de-interleaver, a Reed-Solomon decoder, etc., or includes a convolution decoder, the de-interleaver, the Reed-Solomon decoder, etc.

The demodulator 420 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital device 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (including a notebook computer), a tablet PC, a smart phone, a Bluetooth device, a Cloud server and the like in a wired/wireless manner. The external device interface 435 transfer a signal to the controller 470 of the digital device. The signal includes image data, video data, audio data which is input through an external device. The external device is connected to the digital device. The controller 470 can control to output the signal including the processed image data, the processed video data and the processed audio data to the connected external device. For this, the external device interface 435 can further include an A/V input/output unit or a wireless communication unit (not shown).

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital device 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

Also, the external device interface 435 can connect a STB via at least one interface described above, and perform an input/output operation with the connected STB.

Meanwhile, the external device interface 435 can receive application or application list included in a nearby external device, and can transfer the application or the application list to the controller 470 or the storage unit 440.

The network interface 430 may provide an interface for connecting the digital device 400 with a wired/wireless network including an internet network. The network interface 430 can equip, for example, an Ethernet terminal to connect with a wired network and use a communication standard like wireless LAN (WLAN) (Wi-Fi), Wibro (Wireless broadband), Wimax (World Interoperability for Microwave Access), and HSDPA (High Speed Downlink Packet Access) to connect with a wireless network.

The network interface 430 can transmit/receive data to/from other users or other electronic apparatuses or access a network connected thereto or another network linked to the connected network. Especially, the network interface 430 can transmit some content data stored in the digital device to another user pre-registered in the digital device 400, a user using another digital device or a selected digital device.

Meanwhile, the network interface 430 can access a web page through a connected network or another network linked to the connected network. That is, the network interface 430 can transmit/receive data to/from a corresponding server by accessing the web page through the network. Besides, the network interface 430 can receive content or data provided from a content provider or a network provider. That is, the network interface 430 can receive the content like a movie, an advertisement, a game, a VoD, a broadcast signal and related information provided from the content provider or network provider. And, the network interface 430 can receive firmware update information and an update file provided from the network provider. Also, the network interface 430 can transmit data to internet, content provider or network provider.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430.

The storage unit 440 may store various platforms which will be described later.

The storage unit 440 can include storage media of one or more types, such as a flash memory type, a hard disk type, a multimedia card micro type, a card type memory (e.g. SD or XD memory), RAM, EEPROM, etc. The digital device 400 may reproduce content files (e.g., a video file, a still image file, a music file, a text file, an application file, etc.) and provide them to the user.

While FIG. 4 illustrates an embodiment in which the storage unit 440 is separated from the controller 470, the configuration of the digital device 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 480 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital device 300. For example, the controller 470 can control the tuner 410 to tune to an RF broadcast corresponding to a channel selected by the user or a previously stored channel.

The controller 470 can control the digital device 400 according to a user command input through the user input interface 450 or an internal program. Particularly, the controller 470 can control the digital device 400 to be linked to a network to download an application or application list that the user desires to the digital device 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital device 400, received broadcast content, or content input from an external device. The content may include at least one of a broadcast image, an external input image, an audio file, a still image, an image of a linked web, and a text file.

The controller 470 can control display of applications or an application list, downloadable from the digital device 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital device 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals.

The display unit 480 may be a PDP, an LCD, an OLED, a flexible display, a 3D display or the like.

The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital device 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450.

The digital device 400 may further include the photographing unit (not shown) for photographing the user.

Image information acquired by the photographing unit (not shown) can be supplied to the controller 470. The controller 470 may sense a gesture of the user from an image captured by the photographing unit (not shown) or a signal sensed by the sensing unit (not shown), or by combining the image and the signal.

The power supply unit 490 may supply power to the digital device 400.

Particularly, the power supply unit 490 can supply power to the controller 470 which can be implemented as a system-on-chip (SoC), the display unit 480 for displaying images, and the audio output unit 485 for audio output.

For this, the power supply unit 490 can include a converter (not shown) converting a direct current to an alternative current. And, for example, if the display 480 is implemented as a crystal panel including a plurality of backlight lamps, the power supply unit can include an inverter (not shown) capable of performing a PWM (Pulse Width Modulation) operation to perform a changeable luminance or a dimming operation.

The remote controller 500 may transmit user input to the user input interface 450. To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The digital devices shown in FIGS. 2 through 4 are a digital broadcast receiver which is capable of processing an ATSC or DVB digital broadcast signal for standing or mobile Some of the components shown in FIG. 2 may be omitted or a component (not shown in FIG. 2) may be added as required. The digital device according to the present invention may not include the tuner and the demodulator, differently from the digital devices shown in FIGS. 2 and 4, and may receive content through the network interface or the external device interface and reproduce the content.

Figure 5:
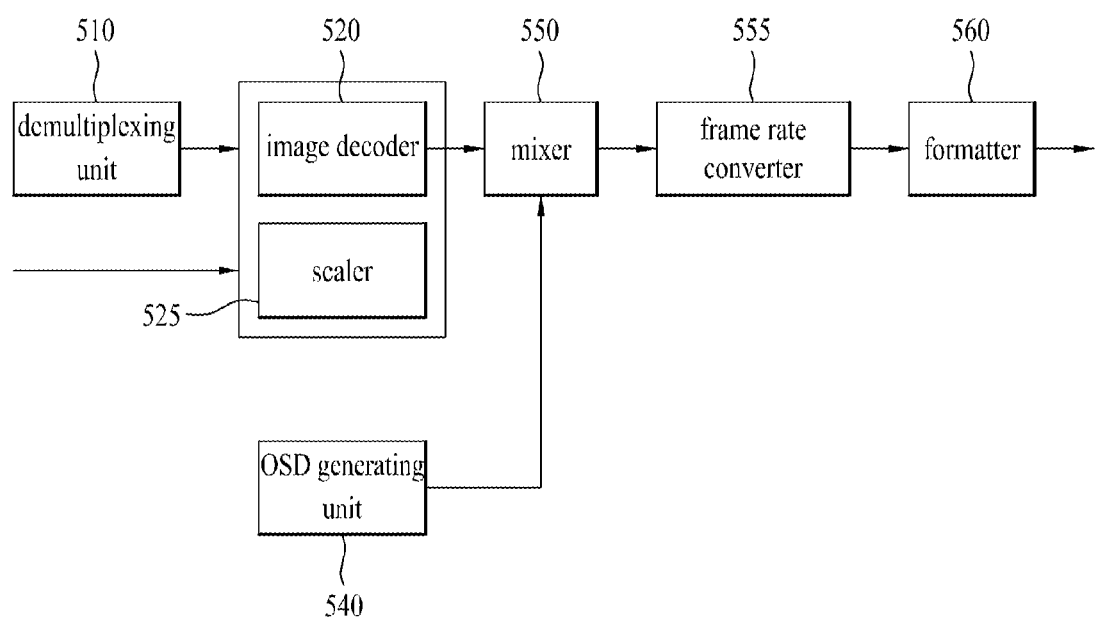
FIG. 5 is a block diagram for explanation of detailed configurations of a controller of FIGS. 2 to 4 according to an embodiment of the present invention.

FIG. 5 is a block diagram for explanation of detailed configurations of a controller of FIGS. 2 to 4 according to an embodiment of the present invention:

An example of the controller may include a demultiplexer 510, an image processor 520, an OSD generator 540, a mixer 550, a frame rate converter (FRC) 555, and a 3D formatter (or an Output formatter) 560. The controller further includes a voice processing unit (not shown) and a data processing unit (not shown).

The demultiplexer 510 can demultiplex an input stream signal into an MPEG-2 TS image, an audio signal and a data signal, for example. Here, the stream signal inputted to the demultiplexer 510 is a stream signal output from a tuner, a demodulator or an external device interface.

The image processor 520 can process a demultiplexed image signal. For this, the image processor 520 includes a video decoder 525 and a scaler 535.

The video decoder 525 can decode the demultiplexed image signal and the scaler 535 can scale the resolution of the decoded image signal such that the image signal can be displayed.

The video decoder 525 can support various Standard. For instance, the video decoder 525 performs a function of MPEG-2 decoder if a video signal is coded with a MPEG-2 standard. And, the video decoder 525 performs a function of H.264/H.265 decoder if a video signal is coded with a DMB (Digital Multimedia Broadcasting) method or H.264/H.265 standard.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital device, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

The digital device is exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention.

The digital device is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 6:
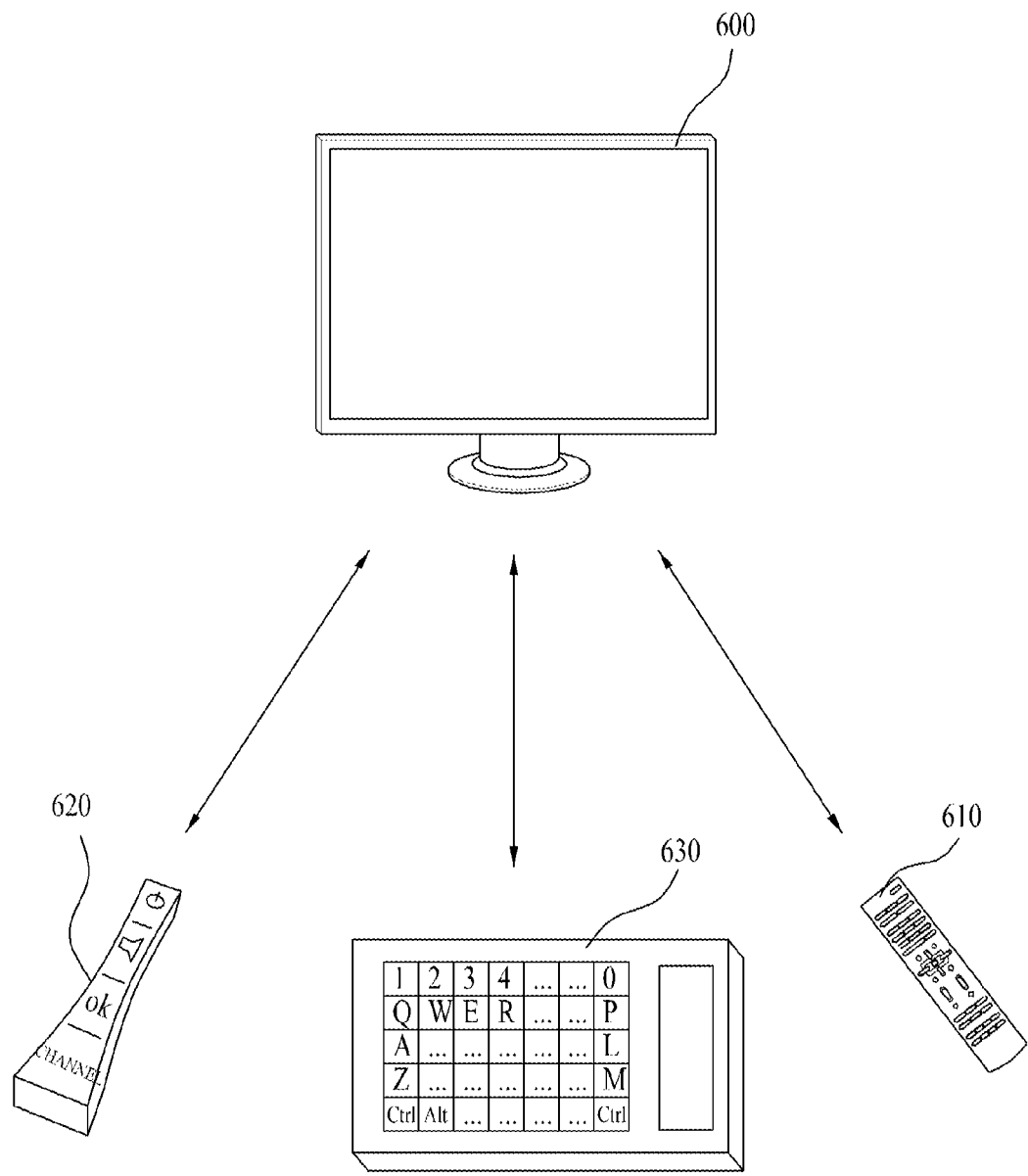
FIG. 6 is a diagram illustrating an inputter connected to the digital device of FIGS. 2 to 4 according to an embodiment of the present invention.

FIG. 6 illustrates remote controllers of a digital device according to an embodiment of the present invention.

To control the digital device, a front panel (not shown) equipped to the digital device 600 or control means (input means) is used.

Moreover, the control means is a user interface device (UID) capable of communicating with a wire/wireless communication, and includes a remote controller 610, a keyboard 630, a pointing device 620, a touch-pad for controlling the digital device 600. Further the control means includes a control mean dedicated to an external input which is connected to the digital device 600. Besides, the control means includes a mobile device like a smart phone and a tablet PC controlling the digital device 600 by switching a mode. Hereinafter, the present disclosure can specify the pointing device as an embodiment of the present invention.

The remote controllers can use various communication protocols such as Bluetooth, RFID, IrDA, UWB, ZigBee, DLNA, etc.

The remote controller 610 is a general input means including a various and necessary key buttons for controlling the digital device 600.

The pointing device 620 may include a gyro sensor mounted therein to sense vibration of a user's hand or rotation. That is, the pointing device 620 can move a pointer according to up, down, left and right motions of the user. The pointing device 620 is named to a magic remoter controller, a magic controller or the like.

The keyboard 630 UIDs can include a mobile device (e.g., a smart phone, a tablet PC, and the like), a magic remote controller 620 and a remote controller 630 equipped with a keyboard and a touch pad in addition to a general remote controller 610.

The remote controller 630 including the keyboard and touch pad can facilitate text input through the keyboard and control of movement of a pointer and magnification and reduction of a picture or video through the touch pad.

The digital device described in the present specification can be operated by based on Web OS platform. Hereinafter, a Web OS based process or algorithm may be performed by the controller of the above-described digital device. The controller includes the controllers of FIGS. 2 to 5 and has wide concepts. Accordingly, hereinafter, a component for processing Web OS based services, applications, content, etc., including software, firmware or hardware in a digital device is referred to a controller.

Such a Web OS based platform may improve development independency and functional extensibility by integrating services, applications, etc. based on a Luna-service bus, for example, and increase application development productivity based on web application framework. In addition, system resources, etc. may be efficiently used via a Web OS process and resource management to support multitasking.

A Web OS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
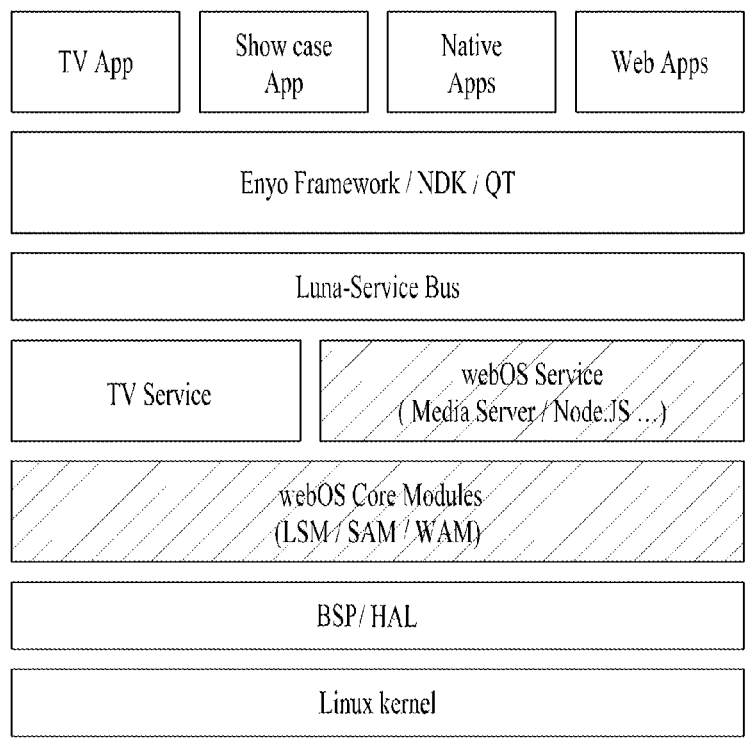
FIG. 7 is a diagram for explanation of a web OS architecture according to an embodiment of the present invention.

FIG. 7 is a diagram illustrating Web OS architecture according to one embodiment of the present invention.

The architecture of a Web OS platform will now be described with reference to FIG. 7.

The platform may be largely divided into a kernel, a Web OS core platform based on a system library, an application, a service, etc.

The architecture of the Web OS platform has a layered structure. OS is provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided.

One or more layers of the above-described Web OS layered structure may be omitted and a plurality of layers may be combined to one layer and one layer may be divided into a plurality of layers.

The Web OS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application may use a service via a Luna-service bus. A service may be newly registered via a bus and the application may detect and use a desired service.

The service layer may include services having various service levels, such as a TV service, a Web OS service, etc. The Web OS service may include a media server, Node.JS, etc. and, in particular, the Node.JS service supports JavaScript, for example.

The Web OS service may be communicated to a Linux process implementing function logic via a bus. This Web OS service is largely divided into four parts, migrates from a TV process and an existing TV to a Web OS, is developed as services which differ between manufacturers, Web OS common services and Javascripts, and is composed of the Node.JS service used via Node.JS.

The application layer may include all applications supportable by a digital device, such as a TV application, a showcase application, a native application, a web application, etc.

Applications on the Web OS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and Javascripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a native application based on Qt and includes basic applications provided along with the Web OS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
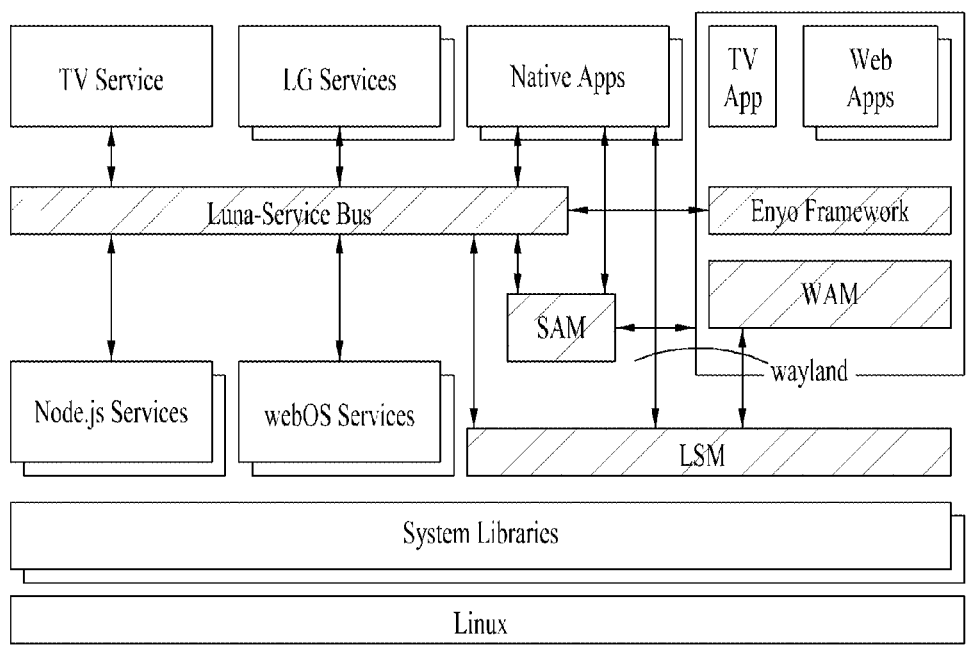
FIG. 8 is a diagram for explanation of an architecture of a web OS device according to an embodiment of the present invention.

FIG. 8 is a diagram illustrating the architecture of a Web OS device according to one embodiment of the present invention.

FIG. 8 is a block diagram based on a runtime of a Web OS device and is described with reference to the layered structure of FIG. 7.

Hereinafter, a description will be given with reference to FIGS. 7 and 8.

Referring to FIG. 8, services, applications and Web OS core modules are included on a system OS (Linux) and system libraries and communication therebetween may be performed via a Luna-service bus.

Node.JS services based on HTML5 such as e-mail, contact or calendar, CSS, Javascript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on model view controller (MVC) and easily develop code for processing user input. An interface between the QML and the Web OS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, Recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
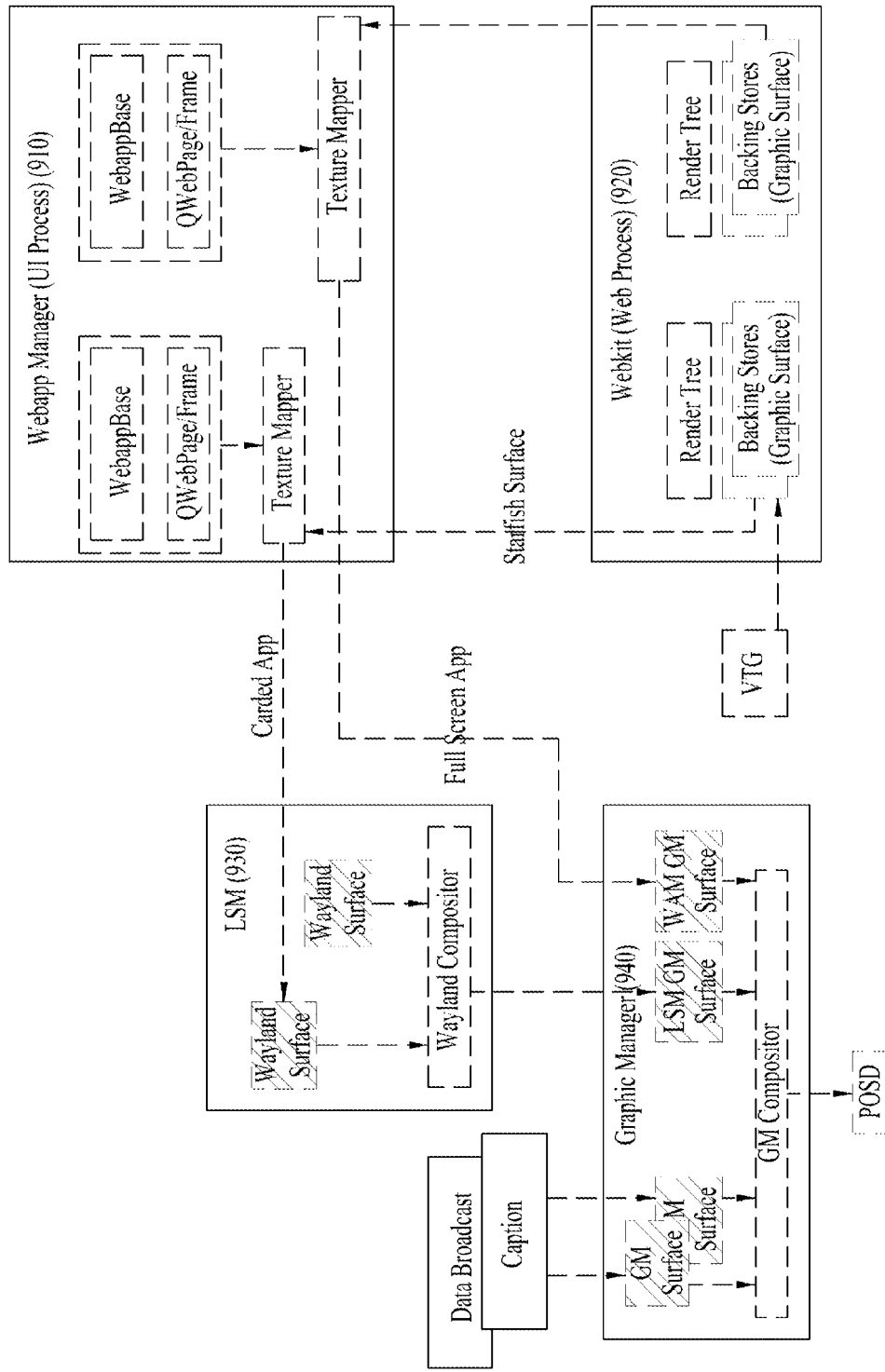
FIG. 9 is a diagram for explanation of a graphic composition flow in a web OS device according to an embodiment of the present invention.

FIG. 9 is a diagram illustrating a graphic composition flow in a Web OS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a full-screen application. The web application manager 910 receives an application generated by the WebKit 920 in order to share a graphic processing unit (GPU) memory for graphic management between the UI process and the web process and delivers the application to the LSM 930 if the application is not a full-screen application. If the application is a full-screen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The full-screen application is directly delivered to the graphics manager 940 without passing through the LSM 930 as described above and is processed in the graphics manager compositor via the WAM GM surface.

The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
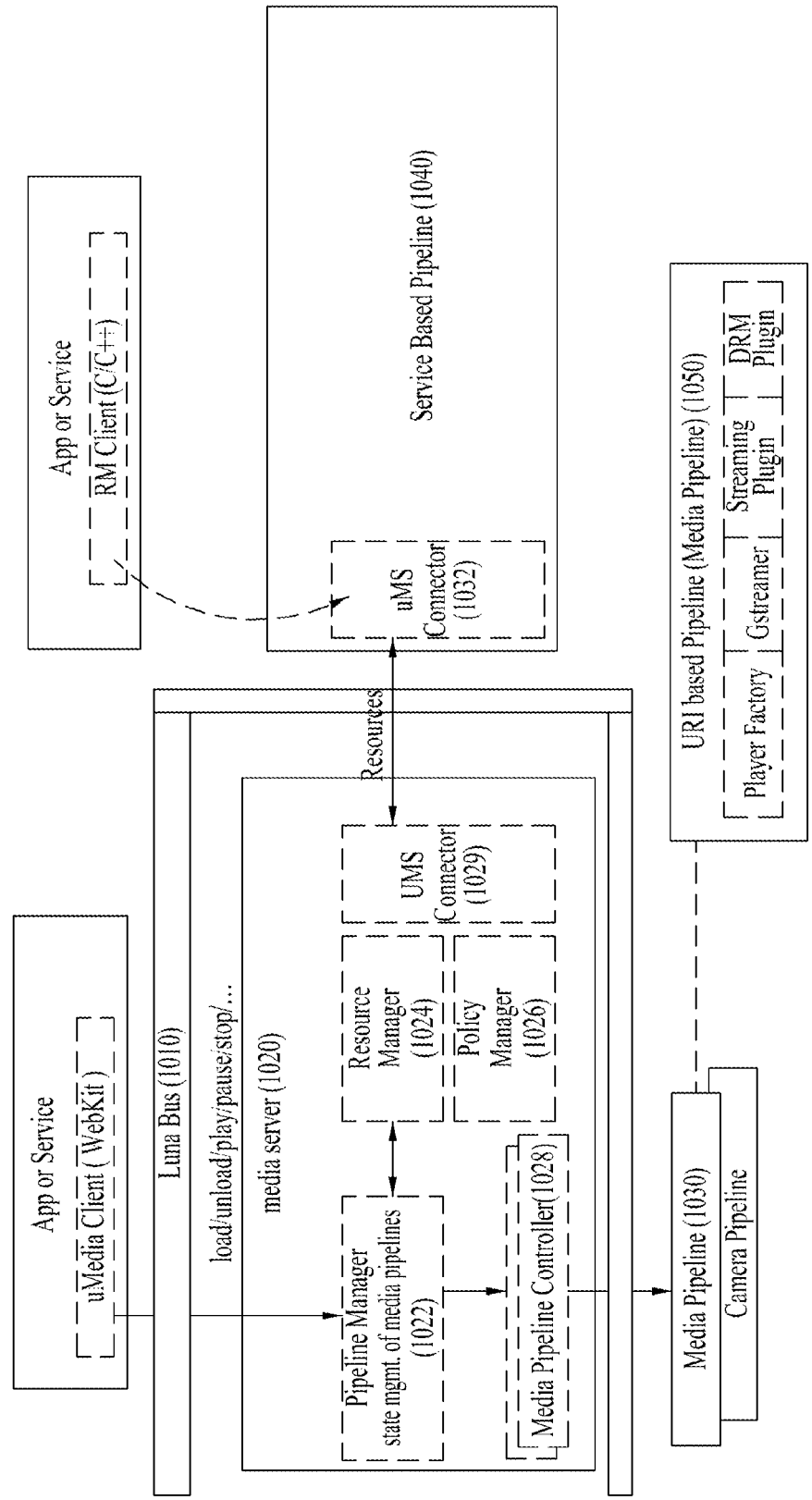
FIG. 10 is a diagram for explanation of a media server according to an embodiment of the present invention.
Figure 11:
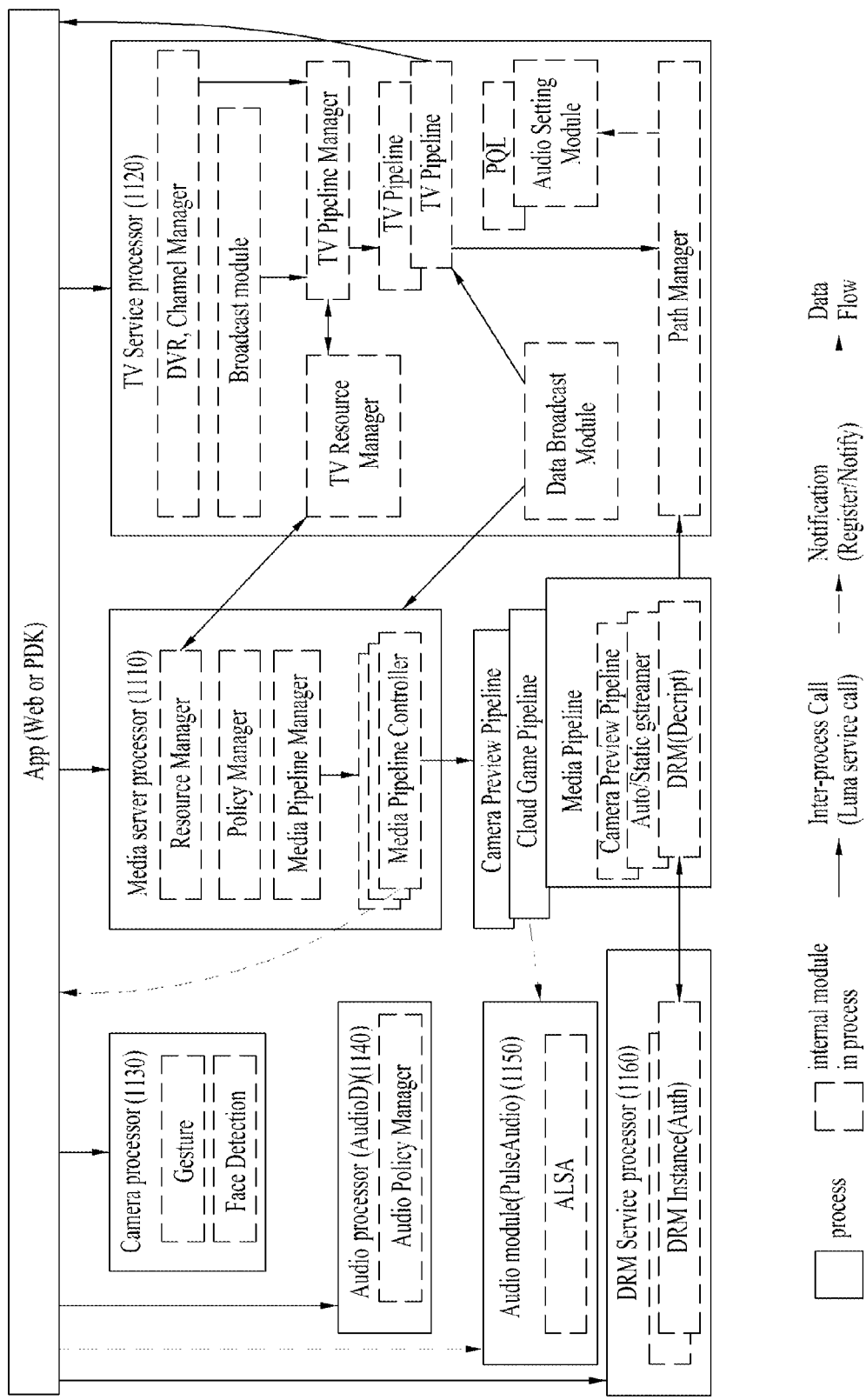
FIG. 11 is a diagram for explanation of a block diagram of a media server according to an embodiment of the present invention.
Figure 12:
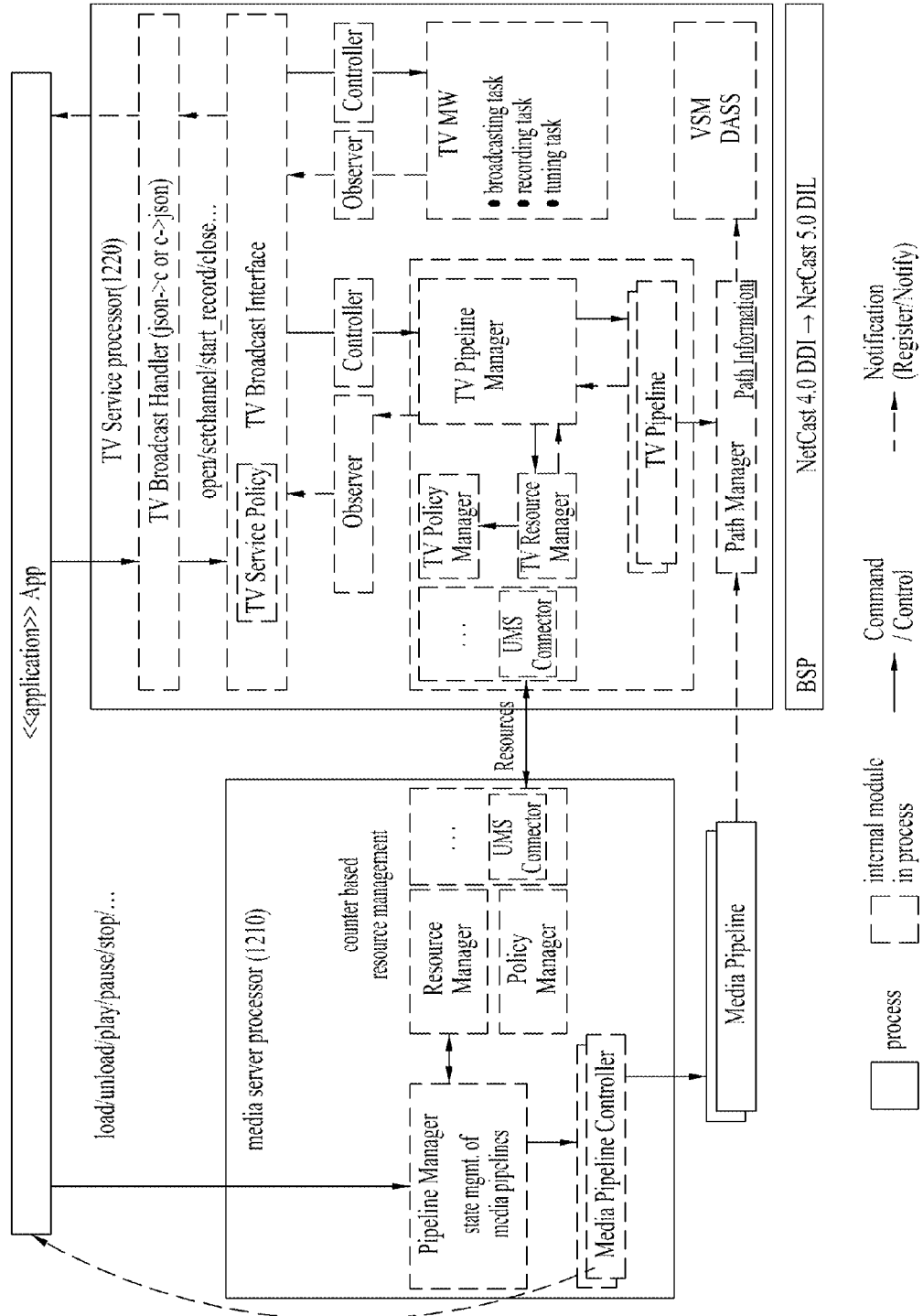
FIG. 12 is a diagram for explanation of a relationship between a media server and a TV service according to an embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (e.g., Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smarthshare playback, thumbnail extraction, NDK, cinema, multimedia and hypermedia information coding experts group (MHEG), etc.

The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used.

Alternatively, a method of using in existing CP may be used. For backward compatibility, plug-in of an existing platform may be extended and used based on Luna.

Lastly, an interface method using a non-Web OS may be used. In this case, a Luna bus may be directly called to perform interfacing.

Seamless change is processed by a separate module (e.g., TVwin) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present disclosure, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

A Terminal below of TV broadcast interface included in TV service processor 1220 of FIG. 12 is detailed described as follows.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The TV pipeline manager arranges returned resources included in a generated TV pipeline, registers pipeline information to a path manager. Then, the TV pipeline manager returns a resultant to the TV pipeline manager. The pipeline manager returns the pipeline to TV broadcast interface.

TV broadcast interface requests a channel change by communicating a TV middleware (M/W). The TV middleware returns a resultant.

TV service can be processed as described process above.

The TV pipeline manager generates one or more pipelines in response to the TV pipeline generation request from a process module or manager in the TV service. At this time, the TV pipeline manager can be controlled by the TV resource manager. The TV resource manager can be controlled by the TV policy manager so as to request status and assignment of a assigned resource for TV service according to generating TV pipeline of TV pipeline manager. And, The TV resource manager can communicated via the media server processor 1110/1210 and uMS connector. The resource manager in the media server processor 1110/1210 transfers status and assignability of the resource for a current TV service to a TV resource manager. For example, if a resource for TV service is already assigned based on the determination of resource manager included in the media server processor 1110/1210, the resource manager can notify that the resource for the TV service was already assigned to the TV pipeline manager. At this time, the resource manager included in the media server processor can eliminate some TV pipeline among assigned pipelines for the TV service according a priority or standard and request or assign generating new TV pipeline for the requested TV service. Or, TV resource manager can properly eliminate, add or generate TV pipeline according to a status report of resource manager included in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted. In the present specification, the resource manager in the media server processor 1110/1210 may perform resource management to a counter base, for example.

In the disclosure, the resource manager included in the media server processor 1110/1210, for instance, can manage the resource using a counter base.

The media service design in the Web OS platform as described above is described as follows.

The media server is a media framework supporting to interface the third-party multimedia pipeline(s) with the Web OS platform. The media server can control, manage, isolate or deconflict the resources for compliant the third-party multimedia pipeline(s). The media server provides a generalized API to reproduce media by application, and is a platform module to manage consistently the hardware resource and policy. Also, a design of the media server can generalize a media process and divide a related module for reducing a complexity.

The point of the media server, for example, provides integration between a service interface and a Web OS UI. For this, the media server controls a resource manager, a policy manager and a pipeline manager, and provides API access according to a resource manager query.

A uMS connector is a main API and a SDK to interface client media pipeline processes with the media server. The uMS connector is an event and message related to an interface. The client media pipeline processes can implement client media pipeline status events to enable load, play, pause, seek, stop, unload, release_resource, and acquire_resource.

A uMedia API provides C, C++ API to the media server.

The media resource manager provides a method for describing

The media policy manager operates if a resource manager rejects a media pipeline according to a resource conflict. The policy manager can provide a consistent API and SDK to be possible a third-party manager. The policy manager supports media pipelines matched with LRU (least recently used), can be used the media pipelines for one or more conflicted resources.

The pipeline manager traces client media pipelines and then maintains. The pipeline controller provides a consistent API to a pipeline manager for controlling and managing client media pipelines.

The media server communicates with the resource manager using a library call. The resource manager can communicate with TV services and media pipeline via a Luna service bus.

The media resource manager configures a total configurable configuration file for describing a media hardware and media client pipelines. The media resource manager can detect a resource conflict and can collect all information necessary for implement a media policy management.

The media policy manager reads policy_select field and a policy_action field of a resource configuration file. The resource contention tries to select active pipeline which is specified by the policy_select field. The media policy manager issue problem on outgoing/selected pipelines based on the policy_action field. A reference of the selection can be a parameter supported by a pipeline configuration setting entry. The policy actions include a unload command and a release command. All pipelines support the unload command to release all resources assigned. The pipeline can additionally support the release command to release a specific resource. Here, the release command is for fast switch pipelines which are competed with common resources, and incoming pipeline and deconflict cannot require the unload command of all resources.

The pipeline manager manages a pipeline controller. The pipeline manager maintains a running queue of the pipeline controller and provides a unique indexing for incoming message from application(s) via the media server.

The pipeline controller maintains a relationship of a related media client pipeline process. The pipeline controller maintains all related status and provides media client pipeline control interface to a pipeline manager. The pipeline client process is an individual process using a uMS connector to provide control interface to media server, etc. The pipeline (client) media technology (Gstreamer, Stage Fright) can be independent with media server management and services and can be perfectly decoupled.

Figure 13:
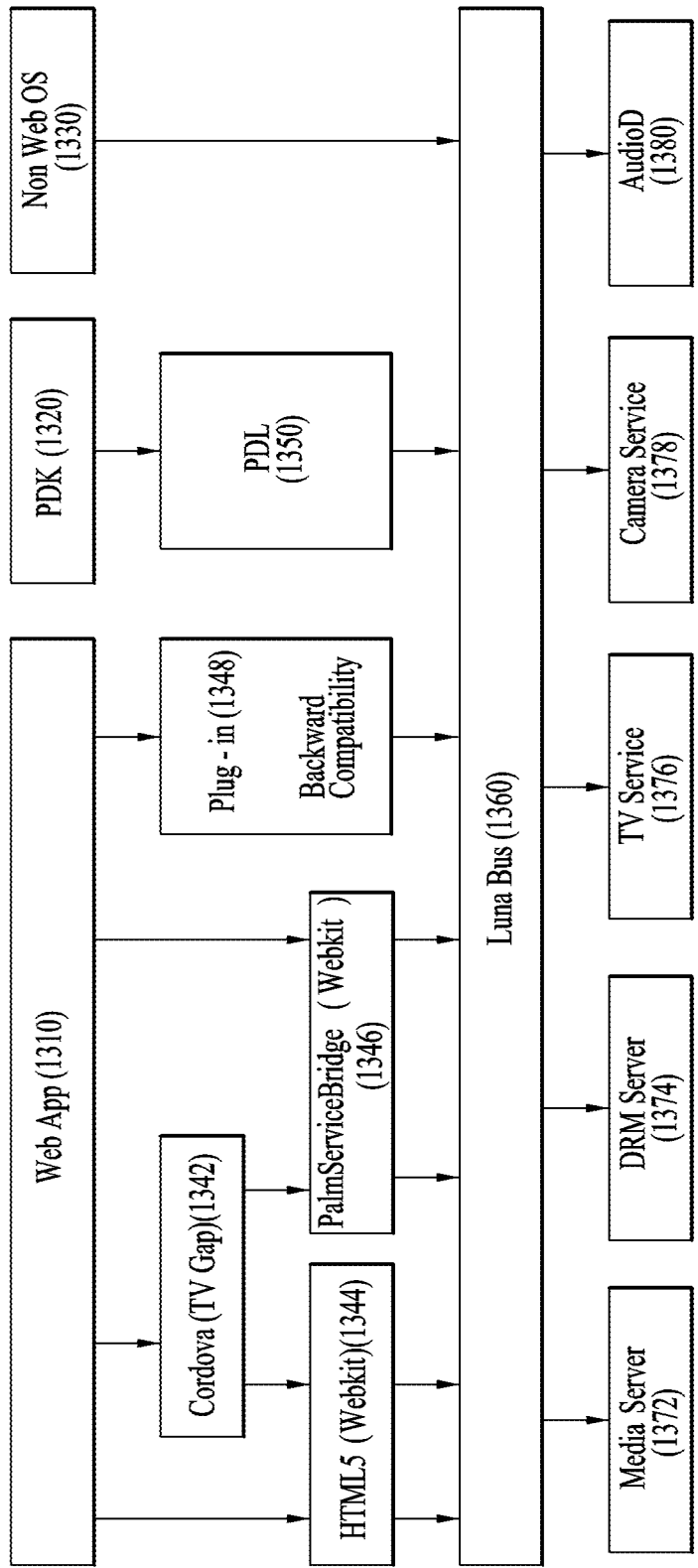
FIG. 13 is a diagram for explanation of an interfacing method between an application and media services according to an embodiment of the present invention.

FIG. 13 is a diagram for explanation of an interfacing method between an application and media services according to an embodiment of the present invention.

Referring to FIG. 7 above, a service in a web operating system (OS) may be a Linux process for execution of function logic and communicated through a bus and may be classified into a web application, a palm development kit (PDK) application, a Qt Meta Language or Qt Modeling Language (QML) application, and so on according to an execution method. The web application may be performed in WAM runtime based on a Webkit engine and may be developed and executed based on an Enyo framework or general HTML5, Cascading Style Sheets (CSS), and Javascript. The PDK application may include a native application and so on, which are developed with C/C++ based on PDK provided for a 3rd-Party or an external developer. The QML application may be a Qt-based native application and may include a basic application and so on, which are provided along with a web OS platform. The native application may refer to an application that is developed and compiled with C/C++ and executed in binary form.

Hereinafter, with reference to FIG. 13, a method of using a service in an application will be described.

First, the method using a service in a web application may roughly include three methods. The three methods may include a method using the HTML5 standard, a method using Cordova, and a Luna call method using a palm service bridge (PSB). Thereamong, the method using the HTML5 standard may correspond to, for example, video tag, media element, or the like. The method using Cordova may use, for example, a method of extending a display with a video tag.

In other words, referring to FIG. 13, applications 1310 and 1320 may use a media server 1372 for a media service, a DRM server 1374 for a DRM service, a TV service processor 1376 for a TV service, a camera service processor 1378 for a camera service, an audio processor 1380 for an audio service, and so on through a Luna service bus 1360. During this procedure, the web application 1310 may use a Cordova (TV gap) processor 1342, an HTML5 (Webkit) processor 1344, a palm service bridge (Webkit) processor 1346, and so on. In this case, an existing CP of the web application 1310 may use a plug-in processor 1348 for backward compatibility as necessary. In addition, the PDK application 1320 may use a PDL processor 1350 and a non-web OS application 1330 may directly use a service through the Luna service bus 1360. In particular, when the web application 1310 uses a service based on the aforementioned HTML5 standard, the web application 1310 may use a service through the HTML5 (Webkit) processor 1344 and the Luna service bus 1360. When the web application 1310 uses a service based on the aforementioned Cordova, the web application 1310 may use the service in the Cordova (TV gap) processor 1342 via the HTML5 (Webkit) processor 1344 and/or the palm service bridge (Webkit) processor 1346 through the Luna service bus 1360. Lastly, when the web application 1310 uses a service based on the aforementioned palm service bridge, the web application 1310 uses the service through the Luna service bus 1360 via the palm service bridge (Webkit) processor 1346. When the method using a service by the PDK application 1320 may be performed based on PDL. For example, the PDK application 1320 may perform Luna call using PDL_Service or PDL_ServiceCallWithCallback to use a corresponding service.

In addition, the non-web OS application may use the aforementioned service through Luna call without a separate configuration.

As described above, as illustrated in FIGS. 11 and 12, an application and a TV service may be processed by a media server, a TV service processor, and so on and, during the procedure, a resource manager, a policy manager, a media pipeline and media pipeline controller based on the media server, and a TV pipeline and TV pipeline controller based on the TV service processor may be used. API for repro- duction of media with a distinct identifier assigned thereto as a multi instance may include load, unload, exit, play back, pause, resume, stop, setproperty, getproperty, and so on and API for TV reproduction may include open, release, setchannel, channelup, channeldown, start_record, record_stop, and so on.

Figure 14:
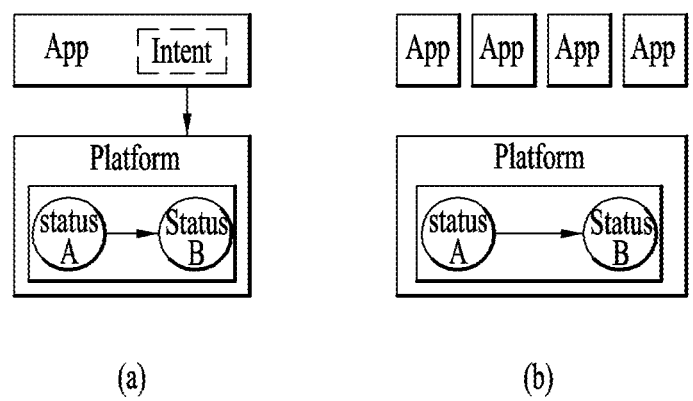
FIG. 14 is a diagram for explanation of a base line between a platform and an application according to an embodiment of the present invention.

FIG. 14 is a diagram for explanation of a base line between a platform and an application according to an embodiment of the present invention.

With reference to FIG. 14(a), a rule at a platform side will be described below.

A platform may manage a lifecycle of resources such as an application, media, and TV reproduction.

The platform may manage a state change in resources and notify an application that is affected by the state change of accurate information.

Upon detecting the state change of the resources, the application may perform an action and the platform may guide an event that occurs when the application does not perform the action.

A rule at an application side will be described below. Upon being notified of a state change by the platform, the application may disregard the state change or perform an action.

When the application disregards the state change, the application is responsible for an event corresponding to the state change. Here, an additional effect may be limited only to a corresponding application. Similarly, the application may also have the authority of disregard the state change with predetermined intention without any action.

Then, referring to FIG. 14(b), when the application disregards a specific state change, an additional effect may not be limited to the corresponding application and may affect an entire portion of the platform or another application.

In this case, responsibility and authority for the corresponding state change need to be internally managed by a platform or to be in charge of a minimum exceptional process that does not affect the platform.

For explanation of a baseline between a service and an application, for example, a position of a controller during execution of MVC (or MVP) will be described below.

First, a controller of a service may be determined with reference to a state, a condition, and so on of a model (logic) in the service and a policy that is not dependent upon the application may be processed by the controller of the service. For example, when bad video is generated, mute handling may be performed on A/V.

On the other hand, a controller of an application may process a UI policy in the application or a policy that is dependent upon the application in the application. In this case, even if the application is corrected, the application may not affect a service.

Hereinafter, a baseline between a platform and an application in media according to the present invention will be described.

First, case A is a case in which an application that is playing back media in the foreground is moved to the background or an application is moved back to the foreground after being in the background.

In the former, the application that is playing back media in the foreground may receive background notification before being moved to the background. In this case, the application may be autonomously paused while media is being reproduced. When the application is not autonomously paused, audio reproduction is maintained but video may be automatically hidden by Z-order but may occupy a bandwidth. For example, even if an MP3 player application is moved to the background, audio reproduction may be maintained.

In the latter, the application moved to the background may be moved back to the foreground. The application may receive notification prior to the movement and re-play media that is autonomously paused upon receiving the notification. In this case, a play back point may be played back, for example, after the media is paused. When the application does not perform play back, paused media may be output to a user and played back according to a user request.

Case B is a case in which a resource is forcibly released according to resource contention with another application in background of an application or the application is moved back to the foreground.

In the former, when the corresponding resource is released according to resource contention with another application in background of the application, a media server may forcibly unload media. In addition, the media server may be notified of the fact that media is unloaded to the corresponding application due to insufficient resources after the media is forcibly unloaded by the application. In this case, the application that is notified of the fact that media is unloaded due to insufficient resources by the media server may be appropriately and exceptionally handled like notification pop-up exposure.

On the other hand, in the latter, when the application that releases a resource is moved back to the foreground, the application but not a media server may autonomously call a load. However, when the application does not autonomously perform load in the above case, a resource that is in an unload state may be output to a user and may be managed according to a user request.

This will be described in more detail with reference to the diagrams.

FIGS. 15 to 19 are diagrams for explanation of a run-time view between an application and a media service according to an embodiment of the present invention.

Figure 15:
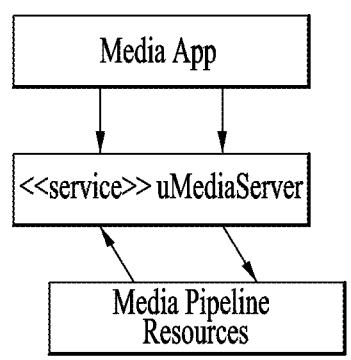
FIGS. 15 to 19 are diagrams for explanation of a run-time view between an application and a media service according to an embodiment of the present invention.
Figure 16:
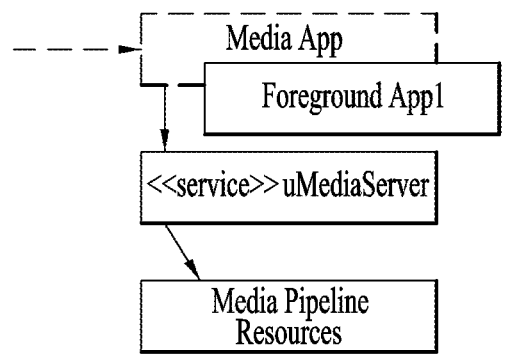
Figure 17:
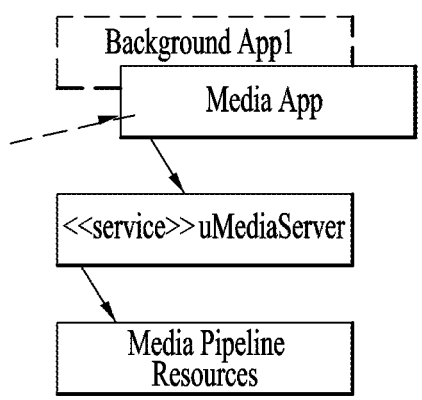
Figure 18:
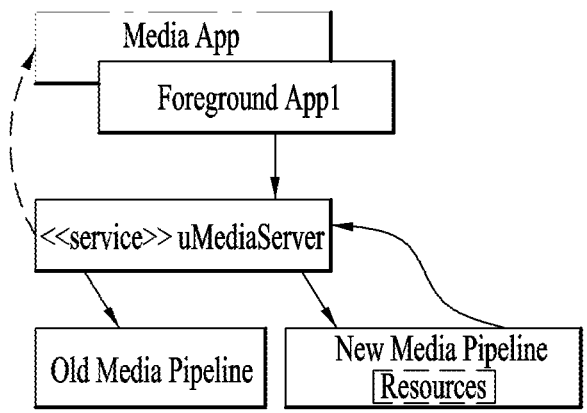
Figure 19:
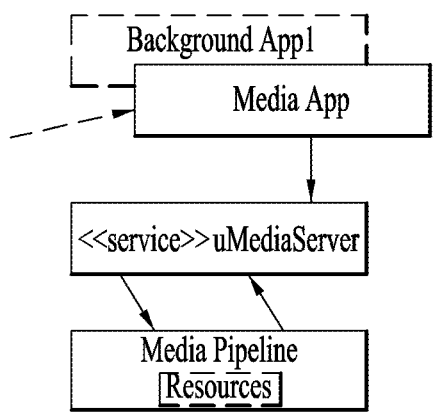

FIGS. 15 to 17 illustrate a run-time view with regard to the aforementioned case A and FIGS. 18 and 19 illustrate a run-time view with regard to the aforementioned case B.

FIG. 15 illustrates a run-time view in the case of load and play back in a media application. When the media application requests a media server for load, the media server may generate a media pipeline and acquire a resource of the generated media pipeline. Then, the media application may make a request for play back.

FIG. 16 illustrates a run-time view when the media application being played back in the foreground in FIG. 15 is moved to the background. The media application may be notified about movement to the background from the foreground by a system manager. Then, the media application may request the media server for pause and the media server may transmit the received request for pause to the media pipeline.

FIG. 17 is a run-time view when an application that has been moved to the background as illustrated in FIG. 16 is moved back to the foreground. As described above, the media application may be notified about movement back to the foreground by the system manager. Then, the media application may request the media server for play back and the media server may transmit the received request to the media pipeline.

FIG. 18 illustrates a run-time view when a pre-assigned resource of, for example, the media application being in the background as illustrated in FIG. 16 is released according to a relationship with another application. When the media application is in the background and the foreground application (a new application that is not the media application) requests the media server for a load, the media server may make a request for generation of a new media pipeline according to the load request of the foreground application. Here, a resource for the newly generated media pipeline needs to be assigned, and may be in a contention relationship with a resource assigned to an old media pipeline. In this case, when a resource is assigned to a newly generated pipeline compared with the old media pipeline, the media server may order the old media pipeline to perform unload according to resource assignment for the new media pipeline and the old media pipeline may release a resource. In addition, the media server may notify the media application in the background that an unload event occurs.

Lastly, FIG. 19 illustrates a run-time view when the media application being in the background in FIG. 18 is moved back to the foreground. When the media application is notified about movement to the foreground by a system manager, the media application may request the media server for a load, the media server may generate a new media pipeline instead of the media pipeline that has been destroyed according to the resource release in FIG. 18, and the media pipeline may request the media server for a resource and acquire the resource. Then, the media application in the foreground may request the media server for play back.

Thus far, a run-time view between the application and the media server has been illustrated and described. Hereinafter, a run-time view between an application and a TV server will be described.

FIGS. 20 to 23 are diagrams for explanation of a run-time view between an application and a TV service according to an embodiment of the present invention.

A run-time view between an application and a TV service will now be described, in particular, in terms of the TV service. A TV service processor may substitute for the function of the aforementioned media server of FIGS. 15 to 19 above.

Here, the run-time view is based on the TV service instead of the aforementioned media service and, thus, a run-time view of a service such as channel change or watching reservation will be illustrated and described.

Figure 20:
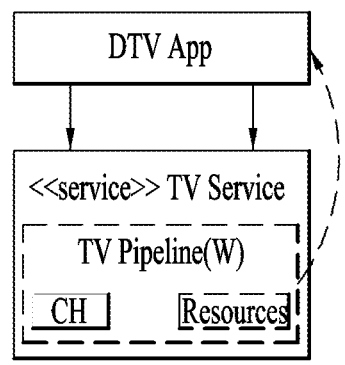
FIGS. 20 to 23 are diagrams for explanation of a run-time view between an application and a TV service according to an embodiment of the present invention.

FIG. 20 is a diagram for explanation of a run-time view for handling channel change by a TV service, that is, a DTV application.

The DTV application may request the TV service processor to open a pipeline for output of a broadcast program of a tuned channel, and the TV service processor may generate a TV pipeline for the channel and may be assigned a resource.

Then, the DTV application may request the TV service processor for a setchannel and the TV service processor may store the requested channel in a TV pipeline and assign a resource for the stored channel. In this case, the resource may include, for example, a tuner, or the like. Then the TV media pipeline may notify the DTV application that video can be output.

Channel change is performed via the above procedure. In this case, a new TV pipeline may be generated every time the channel is changed or an existing TV pipeline may be used.

Figure 21:
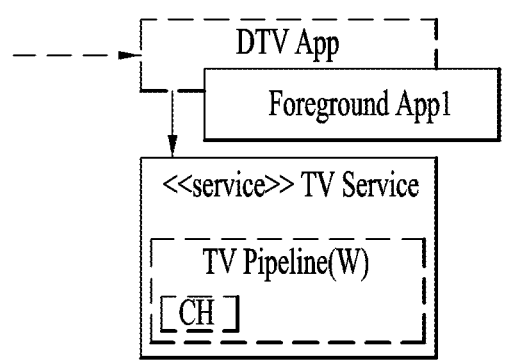

FIG. 21 illustrates a run-time view when a DTV application for a TV service is moved to the background. Upon being notified about movement to the background by the system manager, the DTV application may request the TV service processor for stop. Upon receiving the stop request from the DTV application in the background, the TV service processor may release a resource assigned to the pre-generated TV pipeline.

Figure 22:
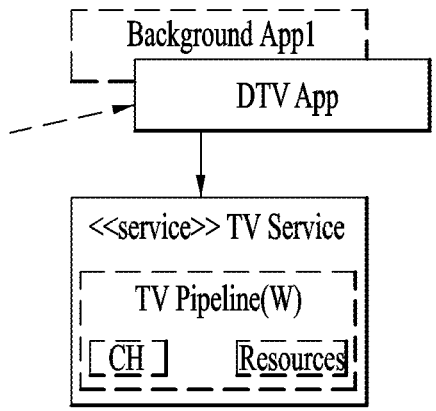

FIG. 22 illustrates a run-time view when the DTV application for a TV service in the background as illustrated in FIG. 21 is moved back to the foreground. Upon being notified about movement to the foreground from the background by the system manager, the DTV application may request the TV service processor for channel setting for output of a broadcast program. The TV service processor may store a corresponding channel in the pre-generated media pipeline and assign a resource for handling channel tuning and so on.

Figure 23:
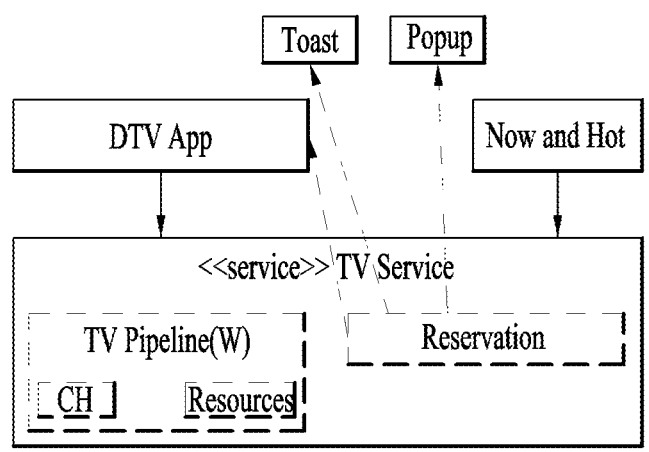

FIG. 23 illustrates a run-time view for watching reservation during a TV service. Upon receiving a request for watching reservation from a client (now and hot), the TV service processor may provide a pop-up message indicating that a watching reservation request time is reached a pre-determined time period (e.g., one minute) before the requested watching reservation and control launching of a DTV application for providing a TV service. Then, after the TV service processor may provide an emergency message (alert) toast to a screen, the DTV application may request the TV service processor for watch-reserved channel setting and the TV service processor may store the requested channel in a TV media pipeline and assign a required resource.

Figure 24:
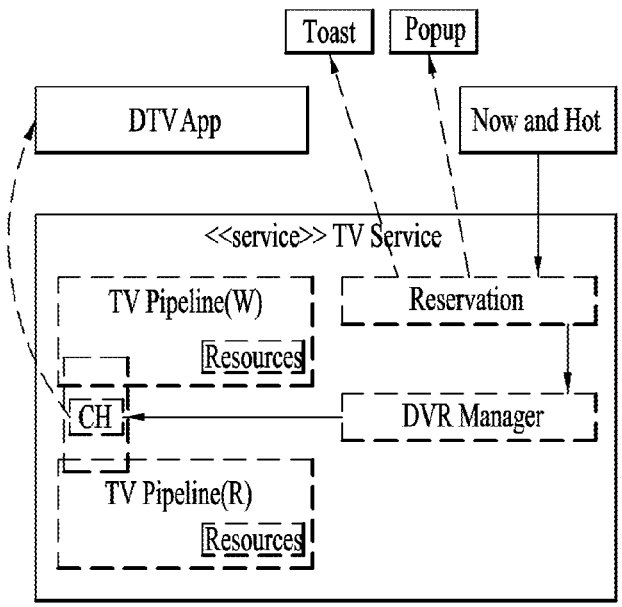
FIGS. 24 and 25 are diagrams for explanation of an application and a TV service according to another embodiment of the present invention.
Figure 25:
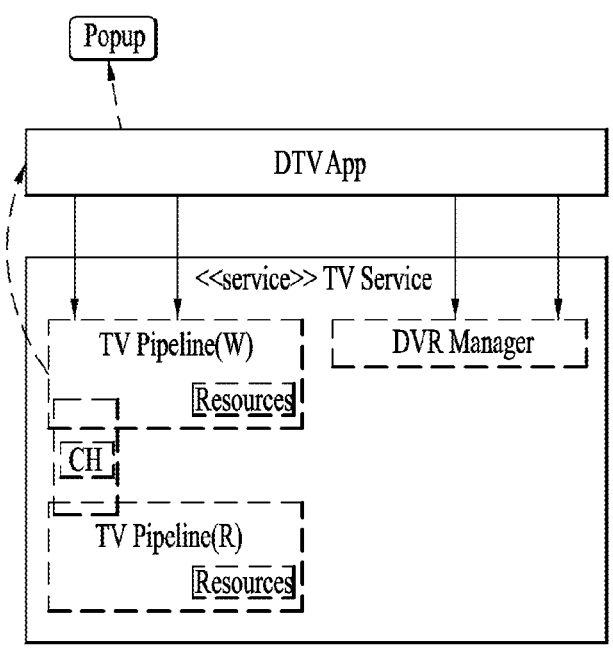

FIGS. 24 and 25 are diagrams for explanation of an application and a TV service according to another embodiment of the present invention.

FIGS. 24 and 25 illustrate a run-time view for handling a consecutive TV service process unlike FIGS. 20 to 23. In particular, FIG. 24 illustrates a run-time view for recording reservation after watching and FIG. 25 illustrates a run-time view for channel change during recording. In particular, FIG. 24 exemplifies a single tuner, for convenience.

Referring to FIG. 24, when a client requests a TV service processor for AddReservedRecord, the TV service processor may notify a user of the AddReservedRecord via a pop-up message a predetermined time period before the AddReservedRecord. Then when a reservation processor in the TV service processor transmits a startRecord command to a DVR manager, the reservation processor may newly generate a TV pipeline for recording and assign a resource, and a pre-generated TV pipeline may share a channel with the generated TV pipeline for recording, the DTV manager may compare the shared channel information and a record-reservation requested channel based on the startRecord command and make a request for channel change for recording, and the TV service processor may notify the DTV application of channel change according to recording reservation.

In this case, as described above, FIG. 24 assumes a single tuner, for example. In the case of a plurality of tuners, assignment of a new resource instead of channel change according to resource channel may be indicated.

FIG. 25 illustrates a run-time view when a request for channel change is received during recording, for example. The DTV application may request the TV service processor for channel setting according to the channel change request. The TV service processor may transmit the request to the TV pipeline for watch and detect resource sharing and a policy. Then, the TV service processor may notify the DTV application that channel change is not possible due to recording, and the DTV application may perform notification by outputting a result of watching selection selected by a user as a pop-up message.

Upon requesting a record list from a DVR manager, receiving the record list as return, and determining that channel change is prioritized compared with a currently recorded channel from the returned record list, the DTV application may request the DVR manager for stopRecording, and the DVR manager may transmit stopRecording to the TV pipeline for recording, and the TV service processor may destroy the TV pipeline for recording.

Thus far, a run-time view between an application and a TV service as well as between an application and a media service have been illustrated and described with regard to various embodiments of the present invention.

Hereinafter, resource sharing will be described.

Basically, a function of a TV service may not be simply limited to watching. For example, additional functions in association with watching may be simultaneously performed, like instant record, screen capture, and so on. In addition, separate operations from watching may be performed in the background, like reserved record, second TV ($2^{nd}$ TV), SCART signal output, and so on. In addition, background operations may be moved to the foreground and performed.

This may affect resource allocation as follows. For example, in order to simultaneously perform various operations in a limited resource situation, a resource conflict phenomenon may occur. In order to overcome this, there may be various methods. In the present specification, a resource sharing concept of sharing the same resource as one example of the various methods will be disclosed and described.

In terms of a TV service as an example, when TV watching and record are simultaneously performed in a single tuner situation, there is one tuner among resources required for the above two operations, resource conflict may occur. Accordingly, in this case, resource sharing may be used. Alternatively, as an operation performed in the background is moved to the foreground, the operation is associated with a watching operation that is being performed in the foreground and, thus, resource conflict may occur. Accordingly, in this case, resource sharing may also be used.

The feature of shared resource(s) will now be described. First, a change in setting a resource to be shared may affect another operation and, thus, the change needs to be controlled carefully. For example, in the case of a single tuner, when TV watching and recording are simultaneously performed, resource sharing is possible. In this case, how to change a channel being watched is an issue. In addition, when a resource that is allocated due to resource conflict is released, an operation of the shared resource may affect priority. This will be described below in more detail.

Thus far, although resource sharing has been described in terms of a TV service as an example, the present invention is not limited thereto. For example, not only may be the resource sharing concept used in a TV service and an operation associated therewith, the resource sharing concept may also be used between a TV service and a media service and between media services. In summary, resource sharing may be used when resource conflict occurs due to limited resources even if necessary resource(s) are required during a procedure using an application and/or a service is used.

Hereinafter, a pipeline related to a resource sharing concept as well as source management, policy management, etc. will be described.

FIG. 26 is a diagram for explanation of a structure of a pipeline according to an embodiment of the present invention.

A pipeline may be roughly classified into a media pipeline associated with media reproduction, etc. and a TV pipeline associated with a TV service, etc. Hereinafter, to aid in understanding and for convenience of description of the applicant, the embodiment of the present invention will be described, in particular, in terms of a TV pipeline as an example.

The TV pipeline may be configured by connecting elements having different functions and features. For example, in the case of broadcast, elements such as a tuner, SDEC, PSIP, VDEC, and DE may be connected as the pipeline. Here, the elements may correspond to, for example, a resource and the resource may be, in particular, a hardware resource.

The elements may be embodied based on a thread in TV middleware and may be organically controlled by receiving and transmitting data between modules. Accordingly, in order to define all elements according to a pipeline concept, the TV middleware may be re-configured.

As one method for re-configuration of the TV middleware, a TV pipeline may define only an abstract input element and output element and the TV middleware may be responsible for substantial connection and control of each element, as illustrated in FIG. 26a.

The TV pipeline may have a unique identifier (ID) for each instance and a client may control the pipeline through the ID.

FIG. 26a is re-illustrated as FIG. 26b. FIG. 26c is a schematic diagram illustrating an example in which a broadcast pipeline, an HDMI pipeline, and a component pipeline are derived from a TV pipeline.

A type of TV pipeline will be described below.

FIG. 27 is a diagram for explanation of a type of a pipeline according to an embodiment of the present invention.

FIG. 27a illustrates a media pipeline, FIG. 27b illustrates a broadcast pipeline, and FIG. 27c illustrates an HDMI pipeline.

FIG. 27a illustrates a media pipeline in the expression form of the aforementioned TV pipeline illustrated in FIG. 26. The media pipeline may be managed by a media server and, thus, may have another expression form or configuration unlike in the drawings.

An input element or source of the media pipeline may not require a separate hardware resource. The input element may indicate a URI and the output element may indicate watching (W). Accordingly, resources such as VDEC0, ADEC0, and DE0 may be required.

In FIG. 27b, the broadcast pipeline may be a channel and, accordingly, a tuner TU0 may be required. In addition, the output element may be DTV watching and, accordingly, resources such as VDEC0, ADEC0, and DE0 may be required.

In FIG. 27c, the HDMI pipeline may be an HDMI port and a connector resource may be required. The output element may be HDMI watching (HDMI_W) and, accordingly, RX0, ADC0, ADEC0, DE0, etc. may be required.

In FIGS. 27a to 27c, the output element may be generated as an element required for each pipeline for watch and assigned a required hardware resource.

FIG. 28 is a diagram for explanation of definition of the characteristic of a pipeline according to an embodiment of the present invention. Here, FIG. 28 illustrates a TV broadcast pipeline as an example for convenience.

Referring to FIG. 28a, a TV pipeline may have a unique identifier (ID1) and, as described above, have one input port and one output port. Here, a channel number (CH) may be input to the input port, and watch, record, etc. may be output from the output port.

With reference to FIG. 28b, a TV resource element related to FIG. 28a above is defined as follows. The TV resource element may have resource information and priority information (Resource Infor (Priority)) acquired from a resource manager. A link with resource information acquired from the resource manager may be permitted through Prev and Next fields of FIG. 28b.

With reference to FIG. 28c, the characteristic of an operation of a TV pipeline is now described. An action of the TV pipeline may be divided into the following operations for setting two ports. A channel is input as a first operation, and output is determined as a second operation. Here, when there is a resource required in each operation, the TV pipeline may request a resource manager for a resource, acquire the resource, generate a TV resource element and, then, link with a port. FIG. 28c illustrates a case after, in particular, setChannel.

Figure 29:
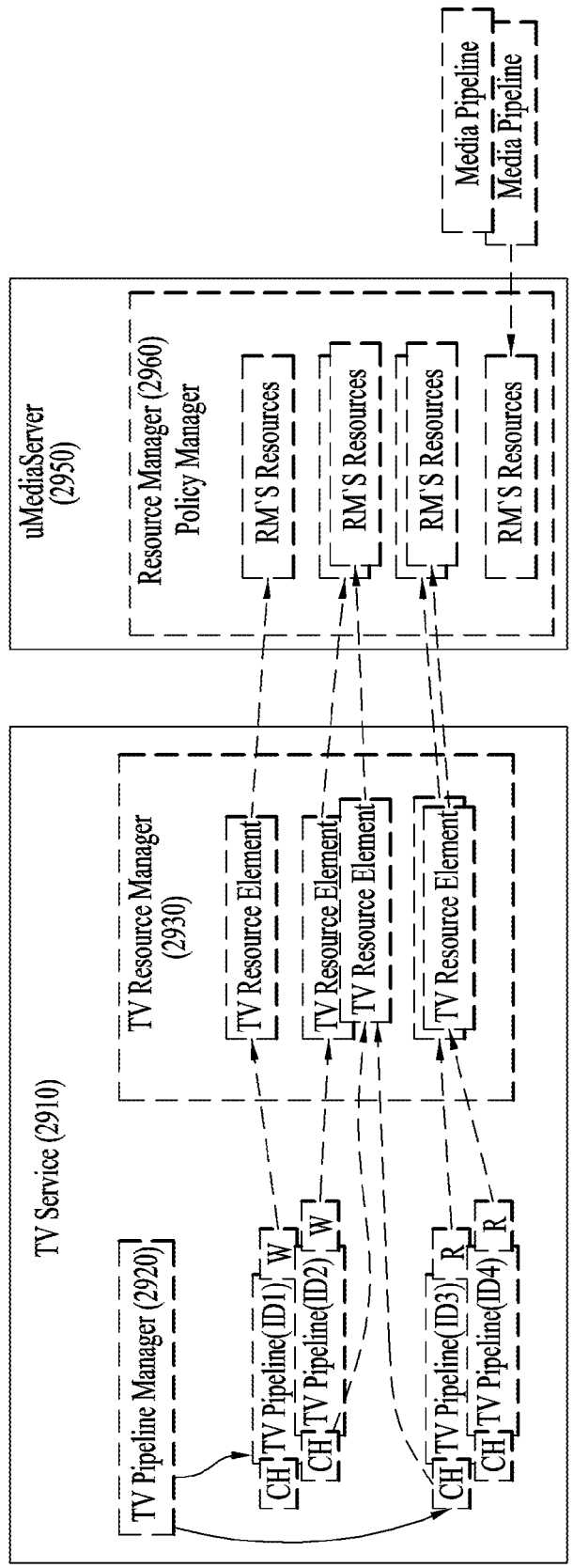
FIG. 29 is a diagram for explanation of a relationship between a pipeline and a resource manager according to an embodiment of the present invention.

Hereinafter, a relationship between a TV pipeline and a resource manager will be described. FIG. 29 is a diagram for explanation of a relationship between a pipeline and a resource manager according to an embodiment of the present invention.

Referring to FIG. 29, in relation to a pipeline, there may be a TV service processor 2910 and a media server 2950.

The TV service processor 2910 may include a TV pipeline manager 2920, a TV resource manager 2930, and so on. The media server 2950 may include a resource manager 1960, a policy manager, and so on.

A TV resource element in the TV resource manager 2930 may have resource information acquired from the resource manager 1960, may have a relationship of resource contention with a media pipeline, and may be a target of a policy.

When there are sufficient resources, N (here, N is a positive integer) TV pipelines managed by the TV pipeline manager 2920 may be generated.

In addition, a port of the TV pipeline may be linked with, for example, a TV resource element in the TV resource manager 2930, as illustrated in the drawing.

Aliasing may occur between TV resource elements of TV pipelines.

Figure 30:
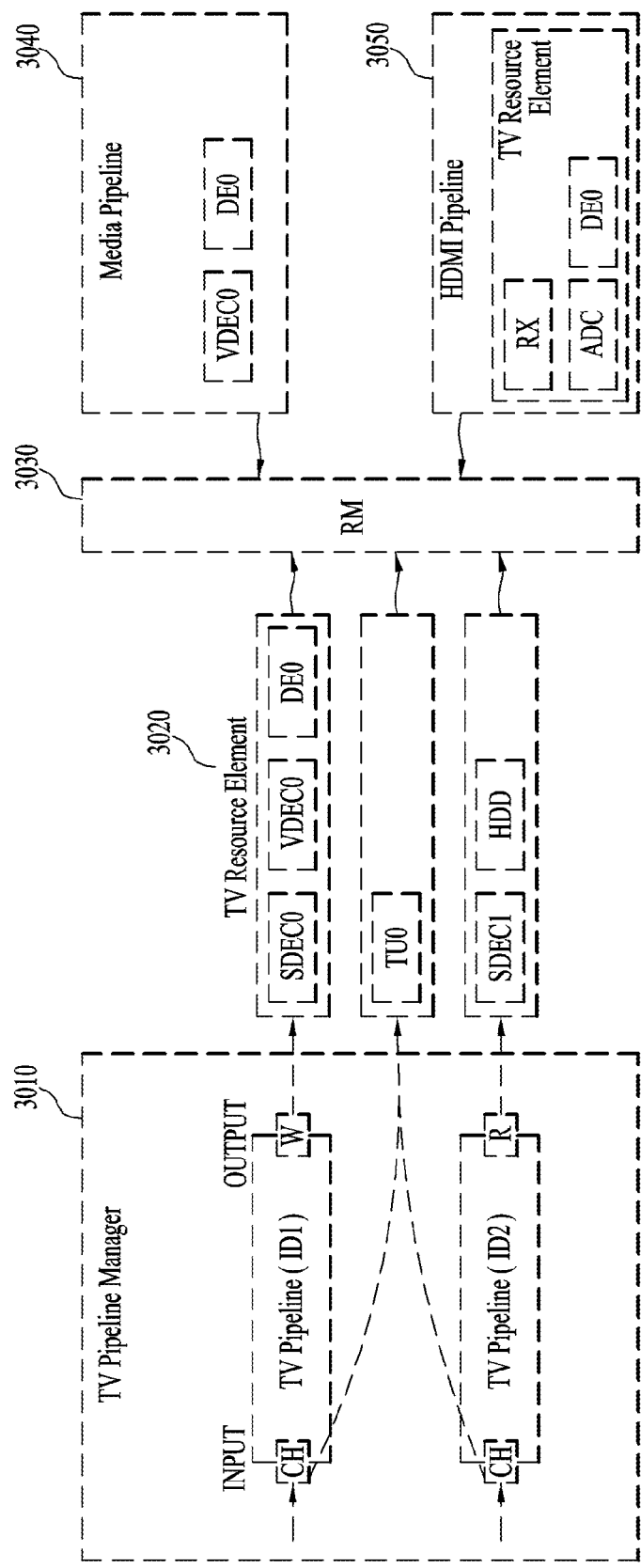
FIG. 30 is a diagram illustrating a configuration for simultaneous watching and recording via a TV service according to an embodiment of the present invention.
Figure 31:
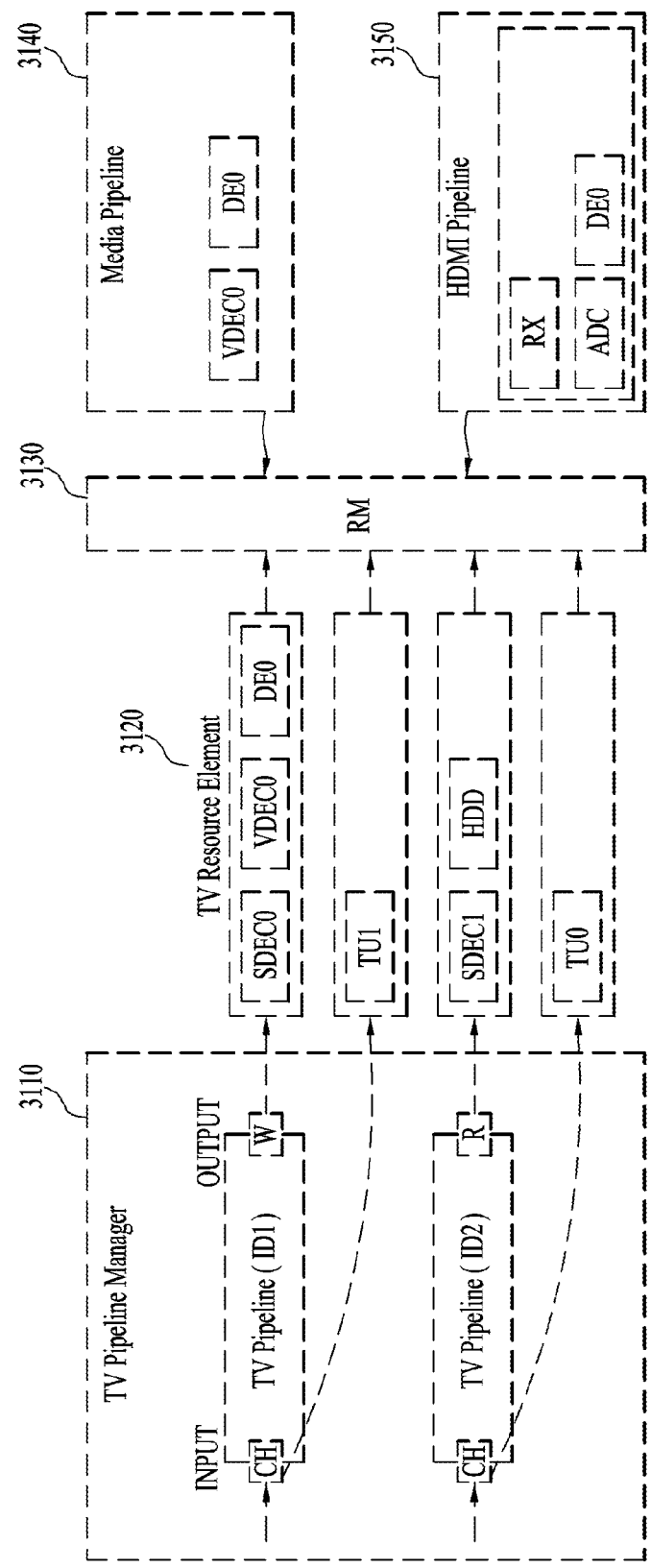
FIG. 31 is a diagram illustrating a configuration for simultaneous watching and recording via a TV service according to another embodiment of the present invention.

FIG. 30 is a diagram illustrating a configuration for simultaneous watching and recording via a TV service according to an embodiment of the present invention. FIG. 31 is a diagram illustrating a configuration for simultaneous watching and recording via a TV service according to another embodiment of the present invention.

FIG. 30 illustrates the case of a single tuner and FIG. 31 illustrates the case of a multi-tuner. Accordingly, in FIG. 30, tuner (TU) resources may be aliased, and in FIG. 31, aliasing of the TU resource may not be required. However, this may be considered from the TU resource point of view, and in FIGS. 30 and 31, aliasing may occur between at least one resource of an input port and an output port. However, the watching & recording operation will be described on the assumption that aliasing occurs or does not occur between, in particular, tuner resources.

Referring to FIGS. 30 and 31, in order to simultaneously perform watching and recording, a watch pipeline ID1 and a record pipeline ID2 need to be generated and, in this case, each of the generated pipelines may have a unique identifier.

FIG. 30 illustrates the case of a single tuner. In this case, both an input port of a watch pipeline and an input port of a record pipeline may be aliased with a TV resource element having a tuner (TU0) resource. However, FIG. 31 illustrates the case of a multi-tuner and, in this case, each input port can be linked with a TV resource element having a tuner resource and, thus, aliasing may not occur.

In FIGS. 30 and 31, an output port may be linked with a TV resource element according to the characteristics of the output port.

When input of each pipeline is changed, output may also be affected. For example, when a channel of an input port of one pipeline is changed, input of another pipeline may also be changed, and output of each pipeline may also be affected.

From a resource manager point of view, when a media pipeline is generated, resource-contention may occur with respect to DE0 and, in this case, a resource linked with an output port of a watch pipeline may be released. However, in this case, even if a resource of the watch pipeline is released, a record pipeline, that is, a recording operation may not be affected and may be maintained.

In FIG. 31, a TV pipeline manager may be responsible for swapping of specific resources (ex, TU0 and TU1) according to, in particular, a hardware policy situation. In FIG. 31, even if channel change is requested to an input port of a watch pipeline, recording may not be affected.

Figure 32:
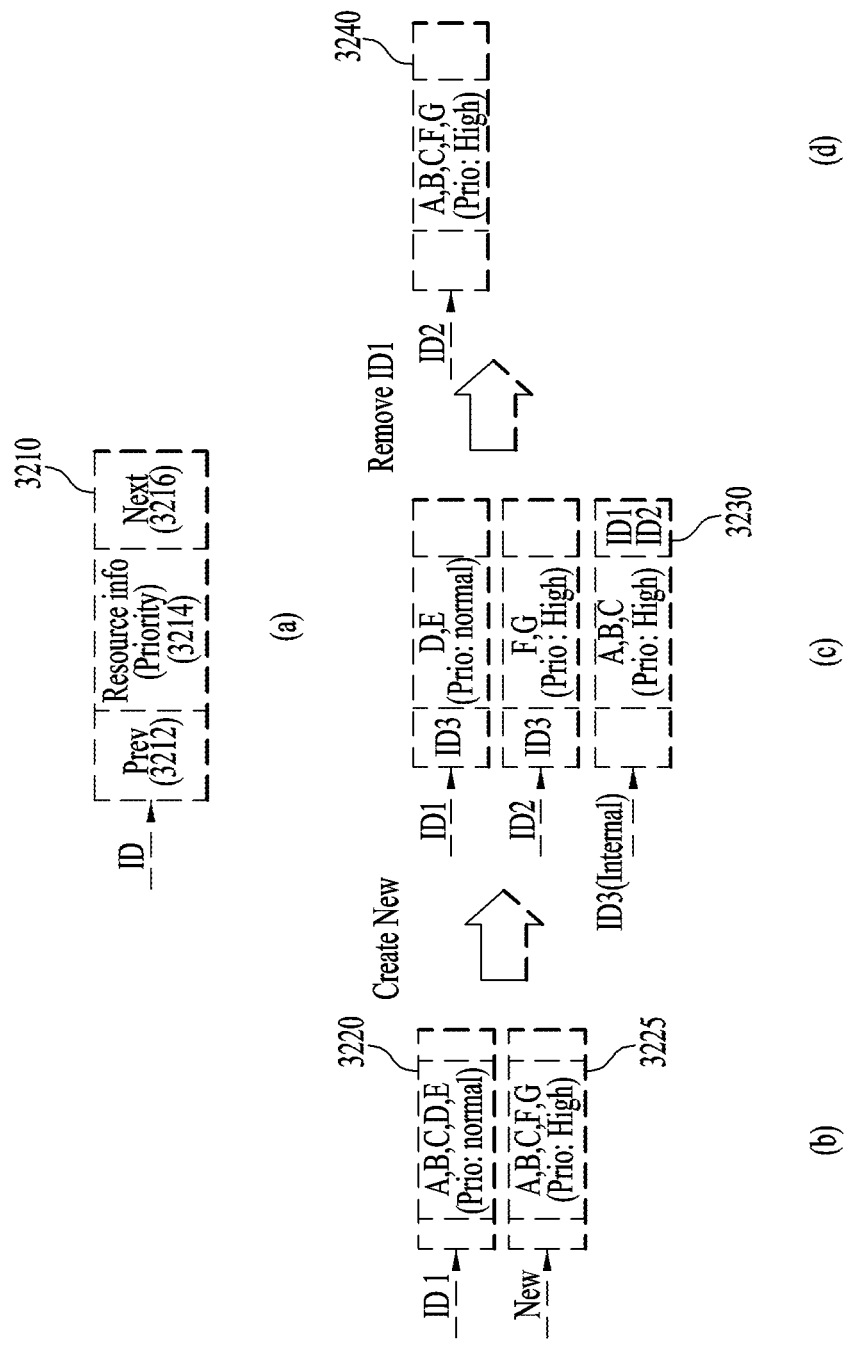
FIG. 32 is a diagram for explanation of definition of a resource element according to an embodiment of the present invention.

FIG. 32 is a diagram for explanation of definition of a resource element according to an embodiment of the present invention.

Referring to FIG. 32a, as described above, a TV resource element 3210 may include a Prev field 3212, a resource information field 3214, and a Next field 3216. The resource information field 3214 may also include priority information. In addition, the TV resource element 3210 may be linked with another TV resource element based on the Prev and Next fields 3212 and 3216.

Referring to FIGS. 32b to 32d, a resource element 3220 of ID1 may be present. In this case, the resource element 3220 of the ID1 may have normal priority and have resource information A to E. Here, when a new resource element 3225 is generated and at least one resource information item of the generated resource element overlaps one of resources of the previous resource element 3220, an internal resource element 3230 with common resources A, B, and C may be generated and the new resource element 3225 and the previous resource element 3220 may be linked with each other (ID3) based on the Prev field, as illustrated in FIG. 32c. The internal resource element 3230 may be linked (ID1 and ID2) with the above elements based on the Next field. This may be referred to as, for example, a relationship between a parent and a child. In this case, the internal resource element 3230 among the above elements may have highest priority. The priority of the internal resource element 3230 may be the highest priority among priorities of child elements. In summary, referring to FIGS. 32b and 32c, when the resource element 3220 of the ID1 may have resources A to E and have normal priority and the resource element 3225 of the ID2 may have resources A, B, C, F, and G and have high priority, A, B, and C among resources of the resource element of the ID2 are included in resources of the resource element of the ID1 and, thus, an internal resource element of ID3 may be newly generated and may have resource information of A, B, and C as common resources. In this case, the internal resource element of the ID3 may have high priority according to ID2 with highest priority among normal of ID1 and high of ID2. The internal resource element of ID3 may include and be linked with child ID1 and child ID2 in the Next field. In this case, as illustrated in FIG. 32c, with regard to resource elements of ID1 and ID2, the resource element of ID1 may include resources D and E and the resource element of ID2 may include resources F and G, and priority of the elements is not changed, unlike in FIG. 32b. However, in this case, resource elements of ID1 and ID2 in a relationship of a parent and a child may include and may be linked with ID3 in the Prev field in order to use the common resources A, B, and C.

Referring to FIG. 32D, when one ID1 of child elements is removed and only one ID2 of child elements of the internal element ID3 remains, the internal element is not required any longer and, thus, may be merged with a child element ID2 3240 that remains after removal.

Figure 33:
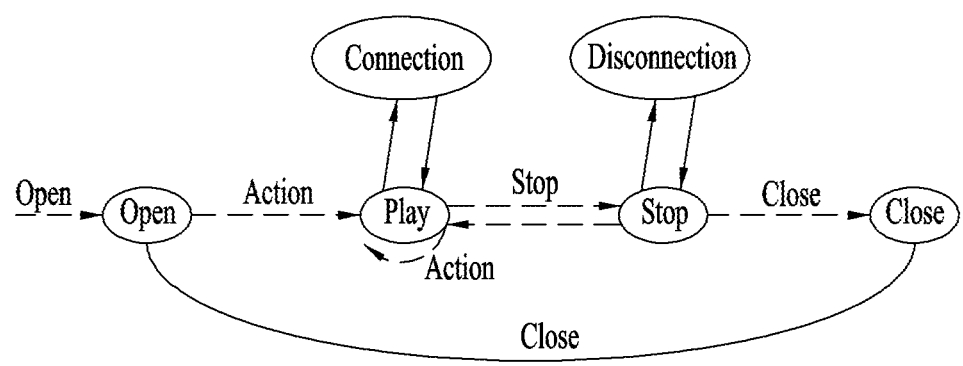
FIG. 33 is a diagram for explanation of a lifecycle of a pipeline lifecycle according to an embodiment of the present invention.

FIG. 33 is a diagram for explanation of a lifecycle of a pipeline lifecycle according to an embodiment of the present invention.

Referring to FIG. 33, the pipeline lifecycle may include open, play, stop, and close.

According to an open command, a pipeline may be generated and, in this case, a pipeline ID may be generated and a pipeline instance may be generated. According to a play command (e.g., watch, record, etc.), an operation, that is, an action is begun. In this case, in order to perform an action according to the play command, the pipeline may be connected to a resource manager, may be dynamically assigned a resource, and may perform the action. Then, according to a stop command, the pipeline may stop the action and release the pre-used resource. However, despite the stop command, the pipeline ID and the pipeline instance may be maintained. However, when the close command is received, the maintained or generated pipeline ID and pipeline instance may be removed.

As illustrated in FIG. 33, one pipeline lifecycle may be completed. However, the pipeline lifecycle may be configured using another path or configuration differently from the drawing.

Figure 34:
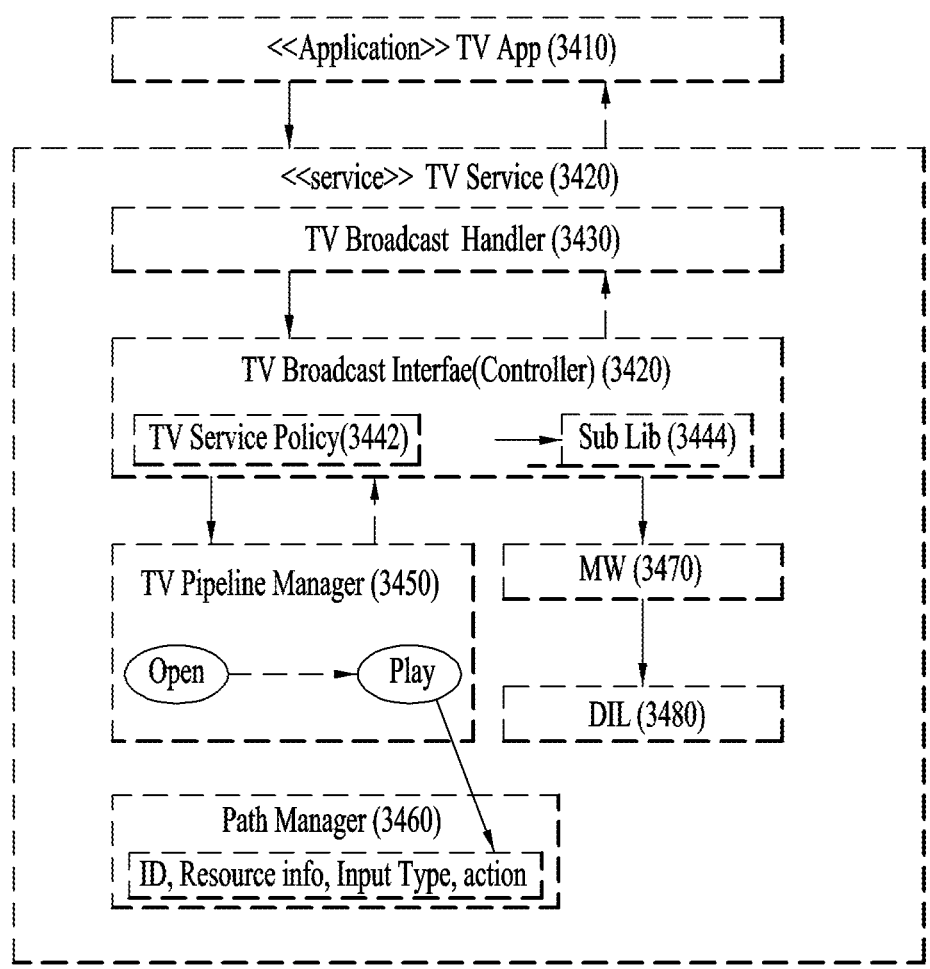
FIG. 34 is a diagram for explanation of a relationship between internal components in the case of channel change according to an embodiment of the present invention.

FIG. 34 is a diagram for explanation of a relationship between internal components in the case of channel change according to an embodiment of the present invention.

When a TV application 3410 transmits ID and channel information in com.webos.service.tv.broadcast/ changeChannel to a TV service processing module 3420, a TV broadcast handler 3430 in the TV service processing module 3420 may transmit ID and channel information in interface_broadcast_changeChannel to a TV service policy processor 3442 in a TV broadcast interface (controller) 3440. The TV service policy processor 3442 may transmit ID, input_type, action, and parameters in API_PIPELINE_SetAction to a TV pipeline manager 3450, and the TV pipeline manager 3450 may allocate a resource and convert a pipeline state into play from open. When a pipeline state is converted into play, the TV pipeline manager 3450 may transmit ID, resource information, input type, and action in PathOpen to a path manager 3460, and the path manager 3460 may generate a path instance and store data such as ID, resource information, input type, and action.

Then, as described above, when the path manager 3460 generates a path instance and stores corresponding data, the TV pipeline manager 3450 may notify a TV broadcast interface 3440 of a resource connection event and the TV broadcast interface 3440 may be call-connected to middleware MW 3470 using DIL. The MW 3470 may call DIL 3480 for connection and the DIL 3480 may perform connection.

The TV broadcast interface 3440 may register ID, channel information, etc. in a sub library 3444, transmit API_CM_ChannelChange including the registered ID, channel information, etc. to the MW 3470, and return "OK" to the TV broadcast handler 3430. Then, the TV broadcast handler

3430 may return "OK" with respect to a channel change request requested by the initial TV application 3410 and perform a channel change operation.

Hereinafter, a call sequence for a pipeline will be described with reference to the accompanying drawings.

Figure 35:
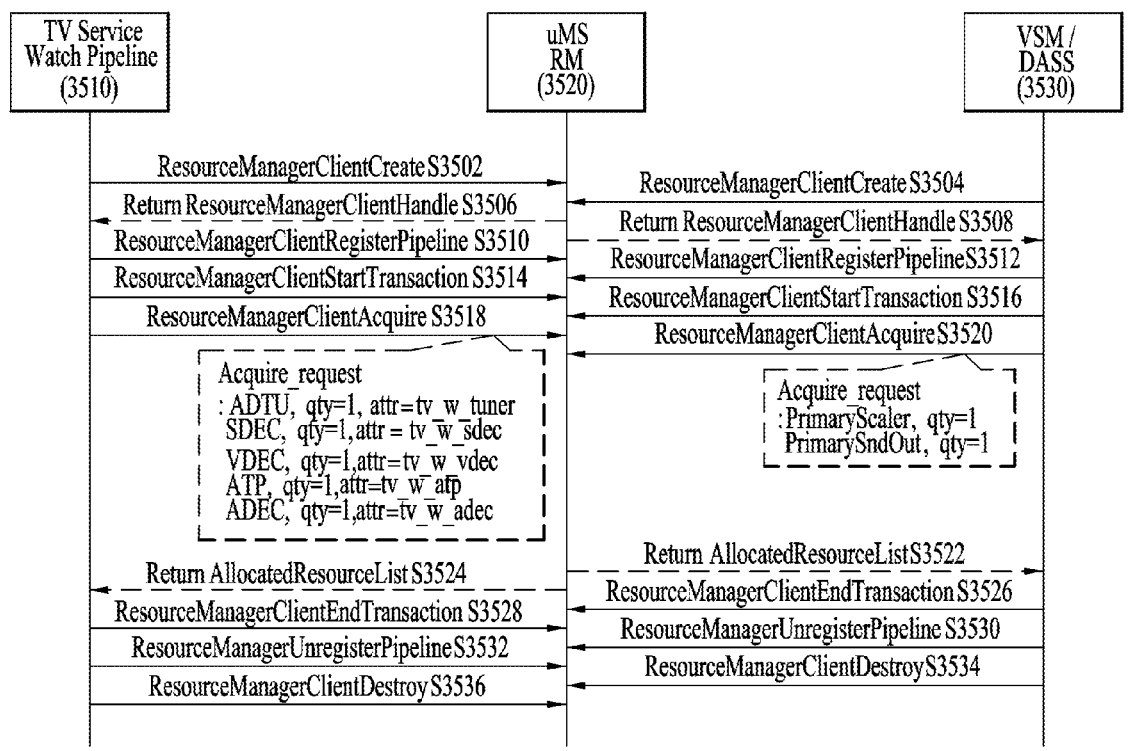
FIG. 35 is a sequence diagram for explanation of a pipeline call sequence according to an embodiment of the present invention.
Figure 36:
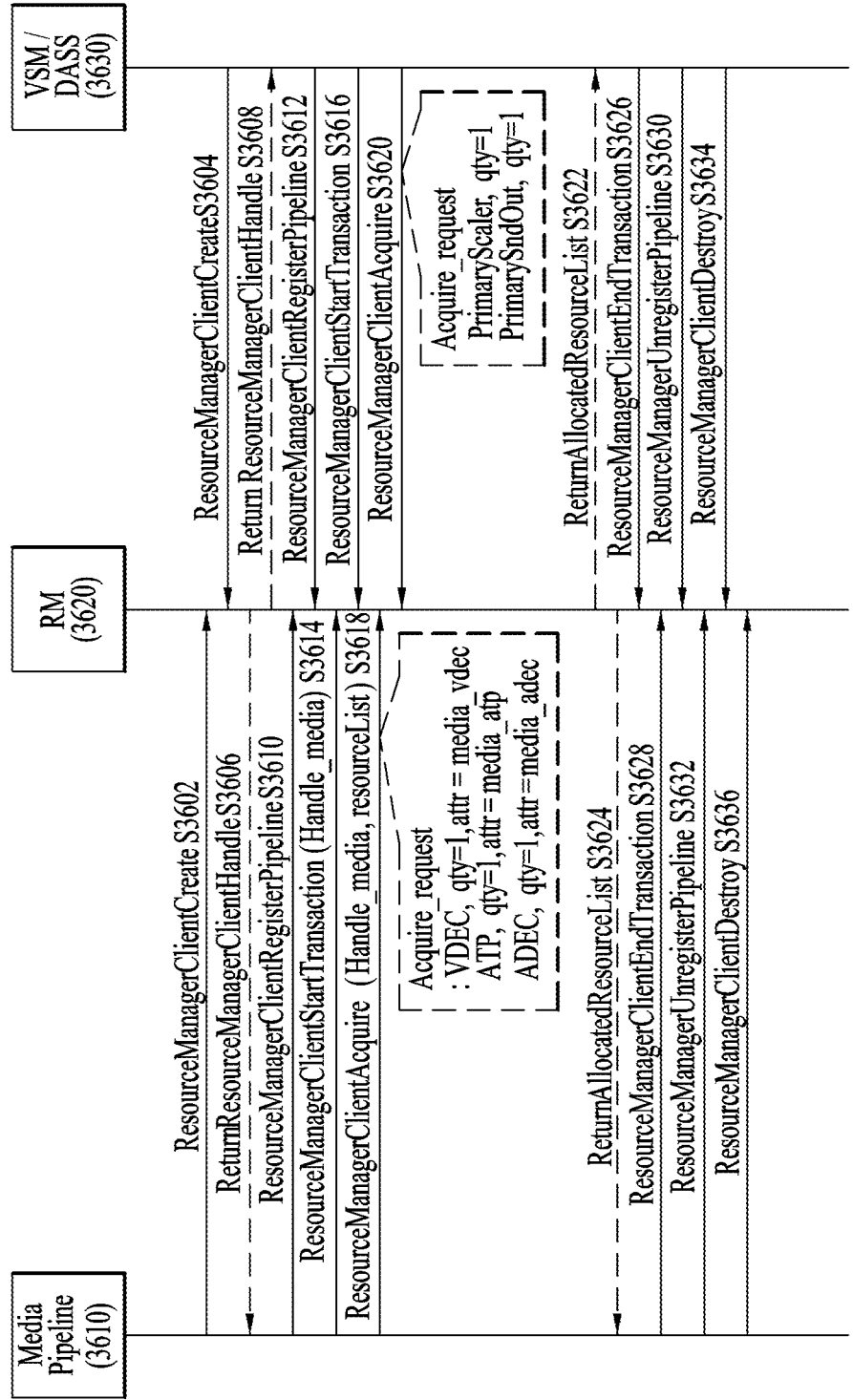
FIG. 36 is a sequence diagram for explanation of a pipeline call sequence according to another embodiment of the present invention.

FIG. 35 is a sequence diagram for explanation of a pipeline call sequence according to an embodiment of the present invention and FIG. 36 is a sequence diagram for explanation of a pipeline call sequence according to another embodiment of the present invention.

FIG. 35 illustrates, for example, a TV service watch pipeline call sequence and FIG. 36 illustrates, for example, a media pipeline call sequence.

First, with reference to FIG. 35, the TV service watch pipeline call sequence will be described. Here, components related to the TV service watch pipeline call sequence may include a TV service watch pipeline 3510, a media server resource manager 3520 a video sink manager (VSM)/DASS 3530, and so on. The VSM may also be referred to as a video processor.

The TV service watch pipeline 3510 and the VSM/DASS 3530 may each request the media server resource manager 3520 for ResourceManagerClienCreate [PolicyActionHandler] (S3502 and S3504).

The media server resource manager 3520 may return ResourceManagerClientHandle in response to each request of the TV service watch pipeline 3510 and the VSM/DASS 3530 (S3506 and S3508).

The TV service watch pipeline 3510 and the VSM/DASS 3530 may request the media server resource manager 3520 for ResourceManagerClientRegisterPipeline [tv_watch] and ResourceManagerClientRegisterPipeline [vsm], respectively (S3510 and S3512).

The TV service watch pipeline 3510 and the VSM/DASS 3530 may request the media server resource manager 3520 for ResourceManagerClientStartTransaction [Handle_watch] and ResourceManagerClientStartTransaction [Handle_vsm], respectively (S3514 and S3516).

In addition, the TV service watch pipeline 3510 and the VSM/DASS 3530 may request the media server resource manager 3520 for ResourceManagerClientAcquire [Handle_watch, resourceList] and ResourceManagerClientAcquire (Handle_vsm, resourceList), respectively (S3518 and S3520). Here, an acquisition request of the TV service watch pipeline 3510 may be as follows: (ADTU, qty=1, attr=tv_w_tuner), (SDEC, qty=1, attr=tv_w_sdec), (VDEC, qty=1, attr=tv_w_vdec), (ATP, qty=1, attr=tv_w_atp), and (ADEC, qty=1, attr=tv_w_adec). Furthermore, an acquisition request of the VSM/DASS 3530 may be as follows: (PrimaryScaler, qty=1) and (PrimarySndOut, qty=1).

Then, the media server resource manager 3520 may return AllocateResourceList to the VSM/DASS 3530 and the TV service watch pipeline 3510 (S3522 and S3524).

The VSM/DASS 3530 and the TV service watch pipeline 3510 may request the media server resource manager 3520 for ResourceManagerClientEndTransaction [Handle_vsm] and ResourceManagerClientEndTransaction [Handle_watch], respectively (S3526 and S3528).

The VSM/DASS 3530 and the TV service watch pipeline 3510 may request the media server resource manager 3520 for ResourceManagerClientUnregisterPipeline [Handle_vsm] and ResourceManagerClientUnregisterPipeline [Handle_watch], respectively (S3530 and S3532).

The VSM/DASS 3530 and the TV service watch pipeline 3510 may request the media server resource manager 3520 for ResourceManagerClientDestroy [Handle_vsm] and ResourceManagerClientDestroy [Handle_watch], respectively (S3534 and S3536).

Hereinafter, with reference to FIG. 36, a media pipeline call sequence will be described. Here, components of the media pipeline call sequence may include a media pipeline 3610, a media server resource manager 3620, a VSM/DASS 3630, and so on.

The media pipeline 3610 and the VSM/DASS 3630 may each request the media server resource manager 3620 for ResourceManagerClienCreate [PolicyActionHandler] (S3602 and S3604).

The media server resource manager 3620 may return ResourceManagerClientHandle in response to each request of the media pipeline 3610 and the VSM/DASS 3630 (S3606 and S3608).

The media pipeline 3610 and the VSM/DASS 3630 may request the media server resource manager 3620 for ResourceManagerClientRegisterPipeline [media_play] and ResourceManagerClientRegisterPipeline [vsm], respectively (S3610 and S3612).

The media pipeline 3610 and VSM/DASS 3630 may request the media server resource manager 3620 for ResourceManagerClientStartTransaction [Handlemedia] and ResourceManagerClientStartTransaction [Handle_vsm], respectively (S3614 and S3616).

In addition, the media pipeline 3610 and the VSM/DASS 3630 may request the media server resource manager 3620 for ResourceManagerClientAcquire [Handle_media, resourceList] and ResourceManagerClientAcquire (Handle_vsm, resourceList), respectively (S3618 and S3620). Here, an acquisition request of the media pipeline 3610 may be as follows: (VDEC, qty=1, attr=media_vdec), (ATP, qty=1, attr=media_atp), and (ADEC, qty=1, attr=media_adec). In addition, an acquisition request of the VSM/DASS 3630 may be as follows: (PrimaryScaler, qty=1) and (PrimarySndOut, qty=1).

Then, the media server resource manager 3620 may return AllocateResourceList to the VSM/DASS 3630 and the media pipeline 3610 (S3622 and S3624).

The VSM/DASS 3630 and the media pipeline 3610 may each request the media server resource manager 3620 for ResourceManagerClientEndTransaction [Handle_vsm] and ResourceManagerClientEndTransaction [Handle_media] (S3626 and S3628).

The VSM/DASS 3630 and the media pipeline 3610 may request the media server resource manager 3620 for ResourceManagerClientUnregisterPipeline [Handle_vsm] and ResourceManagerClientUnregisterPipeline [Handle_media], respectively (S3630 and S3632).

The VSM/DASS 3630 and the media pipeline 3610 may each request the media server resource manager 3620 for ResourceManagerClientDestroy [Handle_vsm] and ResourceManagerClientDestroy [Handle_media] (S3634 and S3636).

Hereinafter, resource management according to the present invention will be described in more detailed with reference to the drawings.

TV middleware may have a plan of resource use, which will be described with reference to FIGS. 42 to 44. A resource manager of a media server may not directly handle TV resource management due to complexity of the TV resource management. For example, the resource manager in the media server may allocate a resource for a TV service but detailed resource management for a TV service may be handled by a resource manager, a policy manager, or the like in a TV service processing module. In this regard, resource use according to a TV service scenario will be described in detail with reference to FIGS. 45 to 49. However, the resource manager of the media server may support the aforementioned resource sharing concept in order to handle TV resource management.

Hereinafter, in relation to TV resource management, a handling method of a TV service processor and a resource manager/policy manager in a media server may be variously performed.

For example, the resource manager of the media server may determine all hardware resources and, in this case, the hardware resources may include hardware resources of another device paired with a digital device as well as hardware resources in the digital device. The resource manager may also know types of resources used in a specific TV service scenario in order to appropriately allocate a resource according to a request of a user as well as overall services of a device or an application as well as a TV service.

For example, upon receiving a record request, the TV service processor may request the resource manager/policy manager to allocate resources in order to perform the requested record operation. The resource manager/policy manager may recognize a state of a TV pipeline and determine required resources based on the state. In this case, the state of the TV pipeline may be changed, for example, to recording from watching. In addition, the resource manager/policy manager may return resource information allocated based on the determined resources to the TV service processor.

As another example, the resource manager in the media server may simply return available resources for a TV and media unlike in the aforementioned example. Accordingly, in relation to a TV service, the TV service processor needs to memorize a state of a TV pipeline and to determine required TV resources. That is, in the previous example, when the resource manager simply makes a request for a resource according to a TV service, the resource manager may autonomously determine a resource required for the TV service and allocate the resource, and, on the other hand, in the present example, resources required in a TV service may be determined according to the TV service, the resource manager may be requested to allocate the determined resources, and the resources may be allocated. In other words, in the present example, the resource manager may simply handle whether a resource is allocated or released.

For example, upon receiving a record request during watching, the TV service processor may recognize a TV pipeline state and, accordingly, determine required resources. In addition, the TV service processor may request the resource manager/policy manager in the media server to allocate the determined resources, and the resource manager/policy manager may allocate the requested resources in response to the request and return the allocated resource information to the TV service processor.

Each of the above examples has both advantage and disadvantages and it is sufficient to use a method that is appropriately determined according to the characteristics of a corresponding digital device. Although not illustrated, a method obtained by appropriately combining both of the methods. In addition, the methods may be combined and used in various forms, and for example, any one of the methods may be used or both of the methods may be sequentially determined based on a service unit, an application unit, burden of a TV service processor, a media server, or the like, state such as load, etc.

The TV resource manager may provide resource sharing information to the TV pipeline manager. In this case, the aforementioned resource configuration file may be used. The TV resource manager may provide linkage information between resources and the TV pipeline manager. In addition, the TV resource manager may provide all resource information items to the TV policy manager and may also interface with the media server. That is, the TV resource manager may acquire resources from the media server including real resources and return resources to the media server.

The resource configuration file may be the same as a master plan of a TV service about how resources are used and the same as design about how resources required for a TV-dedicated function are used in a TV service. The resource configuration file may, for example, represent a resource to be used by a TV service, may be used for a resource sharing concept, and may also be used for a resource sharing concept irrespective of a state of a device or pipeline. For example, the resource configuration file of a service may be pre-known, and a limited resource may be effectively used via appropriate use of the resource sharing concept in response to a request of the service(s).

Here, the resource configuration file has been illustrated and described with regard to, for example, a TV service, but the preset invention is not limited thereto. In other words, the resource configuration file may be pre-stored, downloaded and used from a paired external device and/or external server, or defined and used in order to perform an operation of a media service, an application, etc. as well as the TV service. However, hereinafter, a TV service with relatively complex resource configuration will be exemplified.

Hereinafter, a resource configuration file will be described in more detail with reference to the drawings.

FIGS. 37 to 41 are diagrams for explanation of a resource configuration file according to an embodiment of the present invention.

Hereinafter, expressions required to aid in understanding of the resource configuration file are schematically shown in Table 1 below.

TABLE 1

| Expression | Meaning or Definition |
| --- | --- |
| + | Shareable (however, sharing with the same usage may be impossible) |
| w | Watching usage |
| r | Recording usage |
| c | Capturing usage |
| t | Transmission usage |
| ts | Time shift usage |
| sw | Switching usage |
| x | Different usage from original usage |
| A\|B(e.g. resource) | Different usage from original usage |

As shown in Table 1 above, expressions may be used as follows. For example, "+x" may indicate that a resource is shareable with all different usages other than the same usage as that of the file, "+w" may indicate that the resource is shareable with a watching usage, and "+c+w" may indicate that the resource is shareable with a capturing or watching usage.

Figure 37:
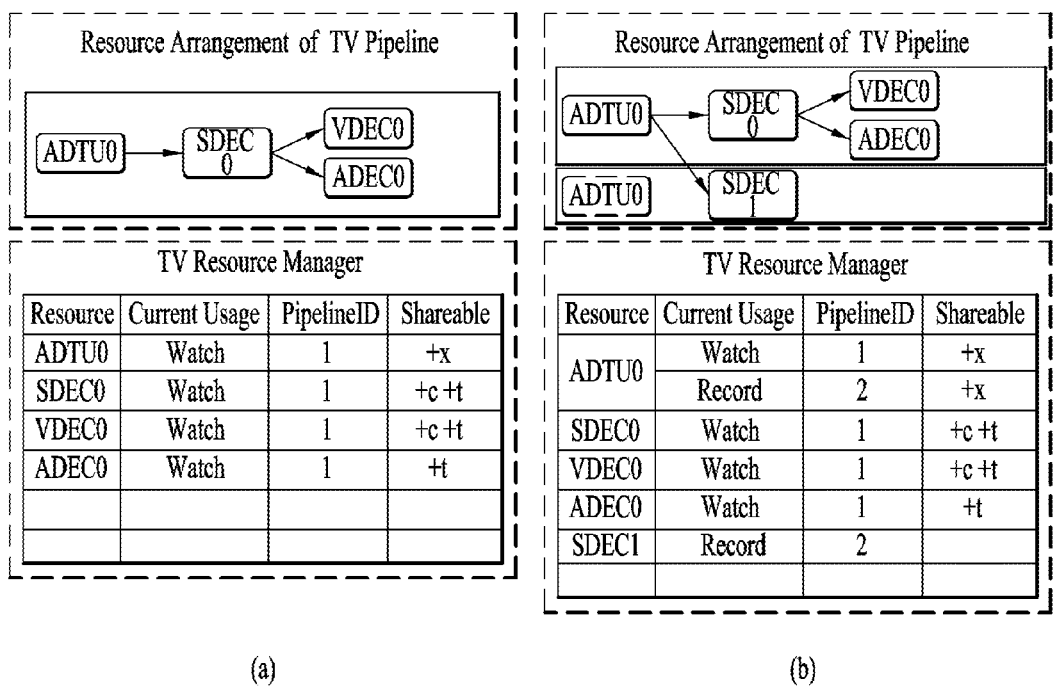
FIGS. 37 to 41 are diagrams for explanation of a resource configuration file according to an embodiment of the present invention.

FIG. 37 illustrates the case of a single tuner model. In particular, FIG. 37a illustrates a resource configuration file with regard to a watching operation and FIG. 37b illustrates a resource configuration file with regard to a recording operation during the watching operation of FIG. 37a.

First, with reference to FIG. 37a, a watching operation configuration file will be described.

Resources for a watching operation may require, for example, ADTU (a tuner), SDEC (a system decoder), VDEC (a video decoder), and ADEC (an audio decoder), and as illustrated in the drawing, resources may be arranged in the TV pipeline in the above order.

Here, the watching operation configuration file may be configured as illustrated in the drawing. It may be seen that a resource ADTU0 is currently used for watching, a pipelineID is 1, and the resource is shareable with different usage other than the same usage as the resource using [+x] from a shareable point of view. It may be seen that a resource SDEC0 is currently used for watching, a pipelineID is 1, and the resource is shareable with capturing usage or transmission usage using [+c+t] from a shareable point of view. It may be seen that a resource VDEC0 is currently used for watching, a pipelineID has 1, and the resource is shareable with capturing usage or transmission usage using [+c+t] from a shareable point of view. It may be seen that a resource ADEC0 is currently used for watching, a pipelineID has 1, and the resource is shareable with transmission usage using [+t] from a shareable point of view.

FIG. 37b illustrates the case in which a user makes a request for recording during watching as illustrated in FIG. 37a. Hereinafter, a recording operation configuration file will be described.

Resources for a recording operation may require, for example, ADTU and SDEC, which are included in, for example, resources for the aforementioned watching operation of FIG. 37a.

The recording operation configuration file may be configured as illustrated in the drawing. Here, the recording operation configuration file may use, for example, the aforementioned watching operation configuration file of FIG. 37a.

The TV resource manager may check whether a resource ADTU is currently acquired by a TV service, and when the ADTU is already acquired, the TV resource manager may check whether the ADTU can be used and shared. Accordingly, with reference to a configuration file of the resource ADTU0 illustrated in FIG. 37a, the resource ADTU is shareable and, thus, the resource ADTU0 is shareable even if there is no request for acquisition of a resource with respect to the resource manager of the media server. Accordingly, a configuration file of the resource ADTU0 may be currently used for watching usage and recording usage, pipelineID is 1 for watching usage and is 2 for recording usage, and both the resources may be defined to be shareable with different usage other than the same usage as the resource using [+x] from a shareable point of view. Accordingly, the resource ADTU0 is shareable with different usage, i.e., recording usage other than the watching usage of FIG. 37a. However, TV middleware does not request whether the resource SDEC is shared and, thus, the resource SDEC needs to request the resource manager of the media server to acquire a resource. Referring to FIG. 37a, the resource SDEC is defined to be shareable with only capturing or transmission usage and, thus, separate resource acquisition may be required. Accordingly, with reference to the configuration file of FIG. 37b, the resource SDEC0 is the same as in FIG. 37a above and is newly defined as follows with respect to the resource SDEC1. The resource SDEC1 may be used for recording usage and pipelineID may be 2. However, the resource SDEC1 may not be particularly defined from a sharable point of view.

Figure 38:
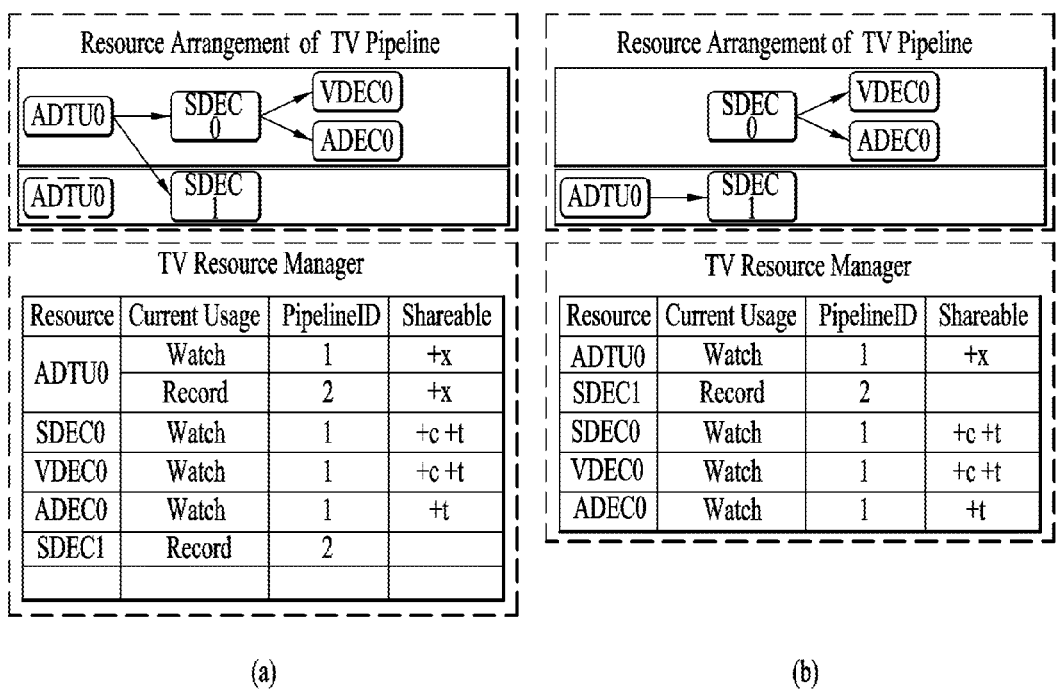
Figure 39:
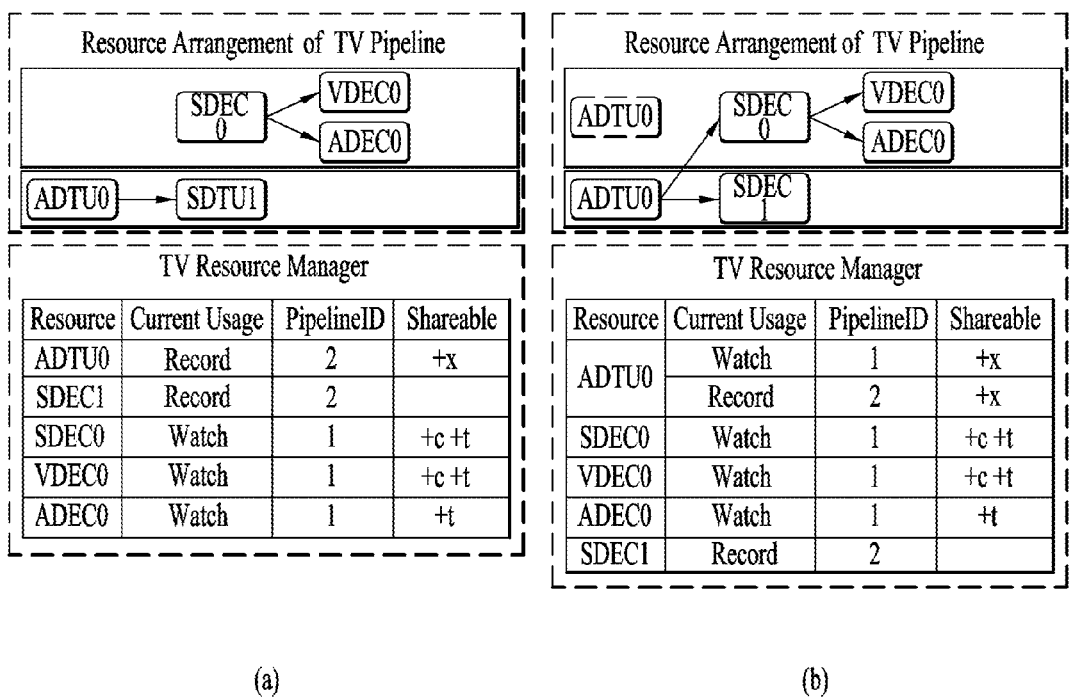
Figure 40:
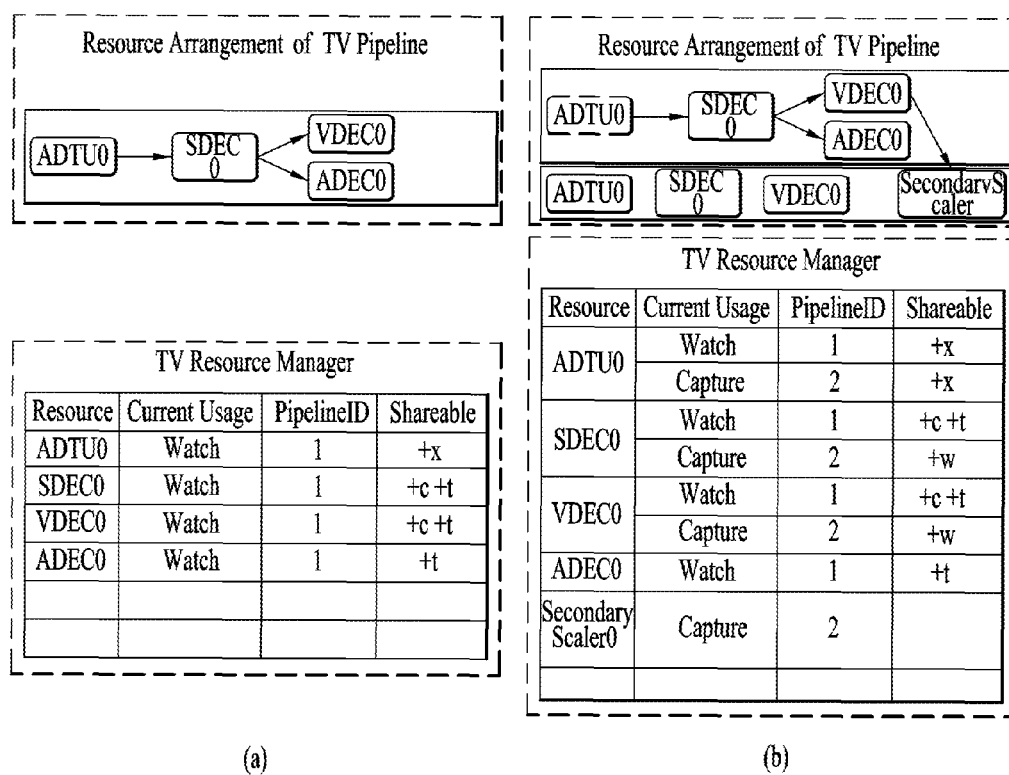
Figure 41:
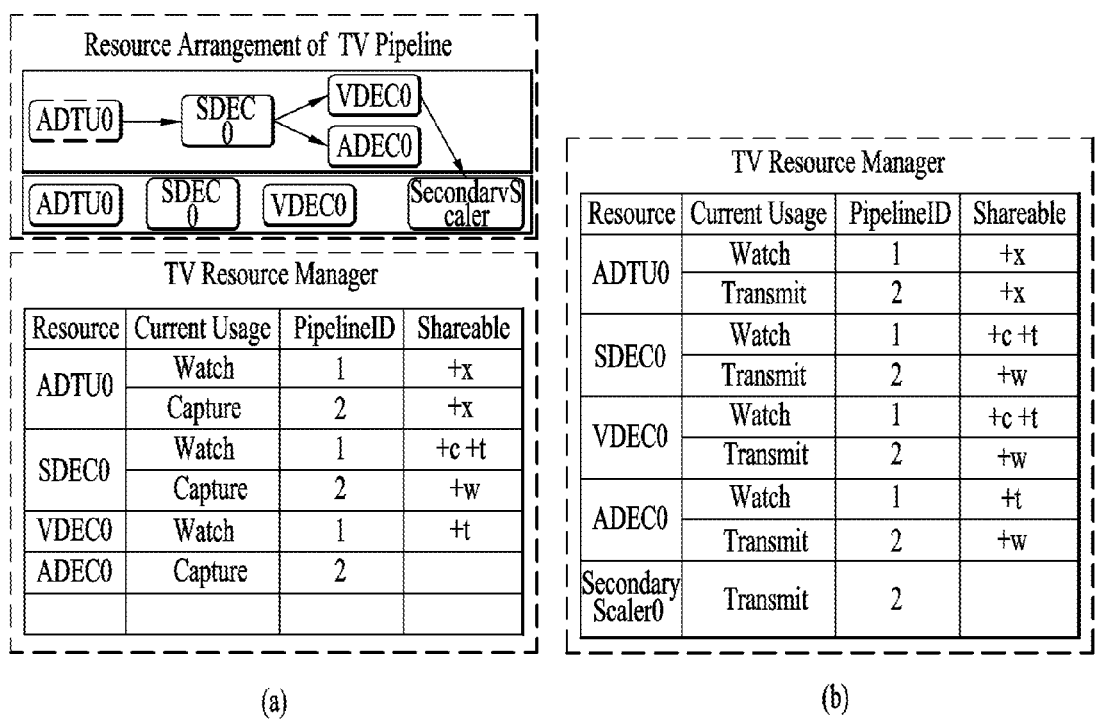

FIG. 38 also illustrates the case of a single tuner model. However, unlike in FIG. 37, FIG. 38a illustrates a resource configuration file with regard to DTV watching and DVR recording (HQ) operations and FIG. 38b illustrates a resource configuration file with regard to an HDD operation when an input source is changed to HDMI during the operation of FIG. 38a.

FIG. 38a illustrates a DTV watching and DVR recording (HQ) operation configuration file and is the same as FIG. 37b. Accordingly, a detailed description thereof has already been given above and, thus, will not be repeated here.

FIG. 38b illustrates the case in which an input source is changed to HDMI in FIG. 38a. In this case, resources required for the operation may require SDEC, VDEC, and ADEC. Accordingly, for the operation of FIG. 38b, resource conflict may occur with respect to the resource SDEC. Accordingly, in this case, a DTV watch pipeline may receive an inquiry about whether the resource SDEC is released. When the resource SDEC0 is released, DTV watching may become meaningless any longer. Accordingly, all resources related to the DTV watching operation may be removed from watching usage. All corresponding resources may be release since the resources cannot be used. Accordingly, resources SDEC, VDEC, and ADEC can be collectively acquired.

A structure of a configuration file for the HDD watching operation of FIG. 38b will be described. Here, in the DTV watching operation of FIG. 38a, all resources related to a pipeline or the watching are released but resources related to a pipeline for the DVR recording operation may be maintained. Accordingly, the resource ADTU0 that has been acquired for the DTV watching operation and shared for the DVR recording operation may be used only for the DVR recording operation. In summary, the resource ADTU0 may be currently used for recording usage, pipelineID may be 2, and [+x] may be used from a shareable point of view. The resource SDEC1 may be currently used for recording usage and pipelineID may be 2. The resource SDEC0 may be currently used for HDD watching usage, pipelineID may be 1 (as a DTV watch pipeline is removed, ID1 is not for a DTV watch pipeline), and [+c+t] may be used from a shareable point of view. The resource VDEC0 may be currently used for HDD watching usage, pipelineID may be 1, and [+c+t] may be used from a shareable point of view. The resource ADEC0 may be currently used for HDD watching usage, pipelineID may be 1, and [+t] may be used from a shareable point of view.

FIG. 39a illustrates a configuration file in the same state as in FIG. 38b above and FIG. 39b illustrates the case in which an input source is changed to DTV from HDMI and a DTV watching operation is requested like in FIG. 38a.

Accordingly, in this case, as described above, resource conflict of the resource SDEC0 may occur and an HDD watch pipeline may receive a resource release request. In this case, when the resource SDEC0 is released, HDD watching may become meaningless any longer and all resources related to the HDD watching may be removed from watching usage and released. Unlike HDD watching, the resource ADTU is required in DTV watching usage and, in this case, it may be seen that the ADTU is shareable with all usages other than watching usage. Accordingly, the resource ADTU is used with previous usage as DVR recording usage and, thus, is shareable with the present DTV watching usage. Accordingly, even if there is no resource acquisition request with respect to the resource manager of the media server for separate acquisition of the resource ADTU, it may be sufficient to share the resource ADTU0 that is pre-acquired for DVR recording usage. The recording usage resource SDEC1 cannot be shared and, thus, acquisition of the resource SDEC needs to be requested to the resource manage and to be used. In this case, a pipeline and resource for HDD watching usage are already released and, thus, resources VDEC and ADEC may also be acquired from the resource manager, as described above.

Accordingly, the structure of the configuration file is the same as in FIG. 38a above.

FIG. 40a illustrates the case of a DTV watching operation illustrated in FIG. 37a above. Accordingly, this would be understood with reference to the description of FIG. 37a above and will be omitted here.

FIG. 40b illustrates a structure of a configuration file when a request for the capturing operation is received in FIG. 40a above.

Resources required with regard to a capturing operation may require, for example, ADTU, SDEC, VDEC, and a secondary scaler. Here, compared with FIG. 40a, among the resources, ADTU, SDEC, and VDEC are the same. Accordingly, with regard to the corresponding resources, whether resources are shareable needs to be checked. For example, a TV resource manager may check whether resources ADTU, SDEC, and VDEC are currently acquired by a TV service, and when the corresponding resources are acquired, the TV resource manager may check whether the resources are being used for watching. In this case, the corresponding resources may be shareable without a separate resource acquisition request to the resource manager. However, the secondary scaler needs to request the resource manager to acquire a resource.

Accordingly, referring to FIG. 40b, a configuration file for a DTV watching operation and a capturing operation may be configured as follows. The resource ADTU0 may be currently used for watching usage and capturing usage, a pipelineID for watching usage may be 1, a pipelineID for capturing usage may be 2, and [+x] may be used both for watching usage and capturing usage from a shareable point of view. The resource SDEC0 may be the same as the resource ADTU except that [+c+t] is used for watching usage and [+w] is used for capturing usage from a shareable point of view. In addition, the resource VDEC0 may be the same as the aforementioned SDEC0. The resource ADEC0 may be used only for watching usage, a pipelineID may be 1, and [+t] may be used from a shareable point of view. In addition, a resource secondary scaler may be used only for capturing usage, a pipelineID may be 2, and there may be no particular definition from a shareable point of view.

FIG. 41a is the same as FIG. 40b above and, thus, will be understood with reference to the description of FIG. 40b and a detailed description of FIG. 41a will be omitted here. FIG. 41b illustrates the case in which a DTV transmits SCART output. Resources required for FIG. 41b may be, for example, ADTU, SDEC, VDEC, and a secondary scaler.

Basically, comparing FIGS. 41a and 41b, all resources are the same except for the resource ADEC. However, the capturing operation of FIG. 41a can be terminated and changed to a transmission operation and, thus resources ADTU, SDEC, and VDEC among the resources may be shareable instead of capture, as described above. However, since secondary scaler cannot be shareable, resource conflict of a corresponding resource may occur. That is, in terms of resource conflict, the secondary scaler is different from the resources ADTU, SDEC, and VDEC. Accordingly, a current pipeline may receive a release request. When the resource secondary scaler is released, capture may become meaningless any longer. Accordingly, all resources related to capture may be released. Then, the TV service processor may check whether the resources ADTU, SDEC, VDEC, and ADEC are still being acquired. When the resources are still being acquired, whether the resources are for DTV watching may be determined. Accordingly, for a transmission operation, the resources being acquired may be compared with a shareable point of view and may be shared. When the resources are not acquired or released for a DTV watching operation, a resource manager needs to be requested to acquire corresponding resources for the transmission operation.

Accordingly, the TV resource manager may configure a configuration file for a DTV watching operation and a SCART transmitting operation as illustrated in FIG. 41b.

Hereinafter, with reference to the aforementioned method of configuring a configuration file and a resource sharing point of view, resource arrangements for various operations will be schematically described. A configuration method, resource arrangement, and so on, which are not illustrated or described in the present specification, may also be configured according to the principle described in the present specification and, thus, may be within the scope of the present invention.

FIGS. 42 to 49 are diagrams for explanation of resource arrangement configured for an operation(s) according to an embodiment of the present invention.

Hereinafter, with regard to FIGS. 42 to 49, with reference to the above description of configuration of a resource configuration file, etc., repeated description will be omitted and a schematic description will be given in terms of differences from the above description.

Figure 42:
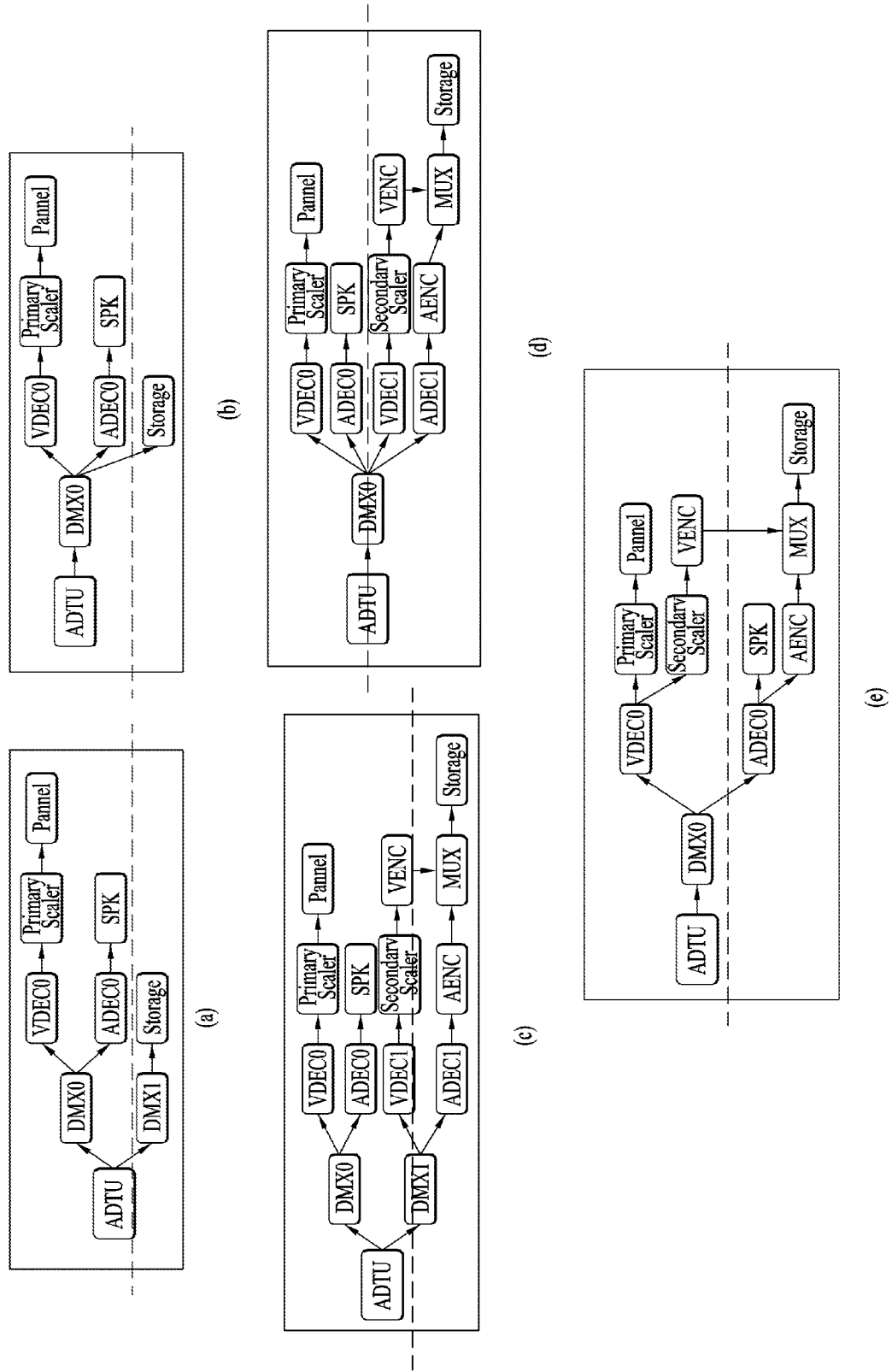

FIG. 42 illustrates resource arrangement using a resource sharing concept when a DTV watching operation and a DVR recording operation are simultaneously performed. In particular, FIGS. 42a and 42b illustrate the case of HQ and FIGS. 42c to 42e illustrate the case of LQ.

First, FIG. 42a illustrates resource arrangement when only ADTU among resources for the DTV watching operation and the DVR recording (HQ) operation is shared. Here, in the DTV watching operation, video data may be output through a panel via the ADTU, DMX0 (demultiplexer), VDEC0, and a primary scaler, and audio data may be output through SPK (speaker) via ADEC0. In addition, the DVR recording operation may be transmitted to and stored in a storage from the shared ADTU through DM1.

On the other hand, unlike FIG. 42a above, FIG. 42b illustrates an example in which DMX is shared together. In this case, resource arrangement of the DTV watching operation is the same as in FIG. 42a but the DVR recording operation is different from the above case in that data is demultiplexed by the resource DMX0 acquired for DTV watching and is directly stored in a storage without going through DMX1.

As described above, when a resource is shared, it is not required to allocate a resource via separate communication with a resource manager of a media server for a corresponding service operation and, thus, a resource may be more effectively used.

In FIG. 42c, for example, two resources are shared. In this case, the two shared resources may be ADTU and MUX (multiplexer). The DTV watching operation is the same as in FIGS. 42a and 42b above. However, resource arrangement for the DVR recording operation may be different from in FIGS. 42a and 42b above. For example, in FIG. 42c, a signal for DVR recording may be demultiplexed to video data and audio data through DMX1, video data may be transmitted to MUX through VDEC1, a secondary scaler, and VENC, and audio data may be transmitted to MUX through ADEC1 and AENC, multiplexed with the video data transmitted through VENC, and stored in a storage.

FIG. 42*d* is almost the same as FIG. 42*c* above but is different from FIG. 42*c* in that DMX as well as ADTU is shared.

In FIG. 42*e*, more resources are shared than in FIG. 42*c* above. For example, for the DTV watching operation and the DVR recording operation, ADTU and DMX0 are shared. In other words, a signal for a DTV watching operation and a signal for a DVR recording operation may be processed through a shared resource and may be separated for video data and audio data for the DTV watching operation and the DVR recording operation by DMX0, and VDEC and ADEC may be minimally used. That is, the video data for the DTV watching operation may be transmitted to a panel through VDEC0 and a primary scaler and the video data for the DVR recording operation may be transmitted to MUX through VDEC0, a secondary scaler, and VENC. In addition, the audio data for the DTV watching operation may be transmitted to SPK through ADEC0, the audio data for the DVR recording operation may be transmitted to MUX through AENC, and both the audio data may be multiplexed with the video data transmitted to MUX through VENC and transmitted to and stored in a storage.

FIG. 43 illustrates resource arrangement when a DTV watching operation and a second TV operation are simultaneously performed.

In FIG. 43*a*, for a DTV watching operation and a second TV operation, ADTU, DMX, VDEC, ADEC, and MUX are shared. For the DTV watching operation and the second TV operation, a signal for the two operations may be transmitted through the shared ADTU and DMX0, all video data may be transmitted to VDEC0, and audio data may be transmitted to ADEC0. In VDEC0, the video data for the DTV watching operation may be transmitted through a primary scaler and a panel and the video data for the second TV operation may be transmitted to MUX through a secondary scaler and VENC. In ADEC0, the audio data for the DTV watching operation may be output directly to SPK, the audio data for the second TV operation may be transmitted to MUX through AENC, and both the audio data may be multiplexed with the video data transmitted through VENC in MUX and transmitted to a storage.

On the other hand, FIG. 43*b* corresponds to the case in which VDEC and ADEC are not shared in FIG. 43*a* and is different from FIG. 43*a* in that VDEC0 and ADEC0 are used for the DTV watching operation and VDEC1 and ADEC1 are used for the second TV operation.

In addition, FIG. 43*c* corresponds to the case in which DMX is not shared in FIG. 43*b* and is different from FIG. 43*b* in that a signal for the DTV watching operation processed through the shared ADTU and DMX0 and a signal for the second TV operation is processed through DMX1.

FIG. 44 illustrates resource arrangement configured for simultaneously performing a DTV watching operation and SCART output.

FIG. 44 is almost the same as FIG. 43 above but is different from FIG. 43 in that SCART output instead of a secondary TV operation is performed together with the DTV watching operation and a different resource for SCART output is used.

Generally, FIG. 44*a* has the feature in that VDEC and ADEC subsequent to ADTU and DMX are shared and FIG. 44*b* has the feature in that VDEC and ADEC are not shared compared with FIG. 44*a*. Lastly, FIG. 44*c* has the feature in that DMX is not shared compared with FIG. 44*b*.

FIGS. 42 to 44 illustrates resource arrangement configured for simultaneously performing two operations, whereas FIGS. 45 to 49 illustrates how resource arrangement is changed according to, for example, a TV scenario.

Figure 45:
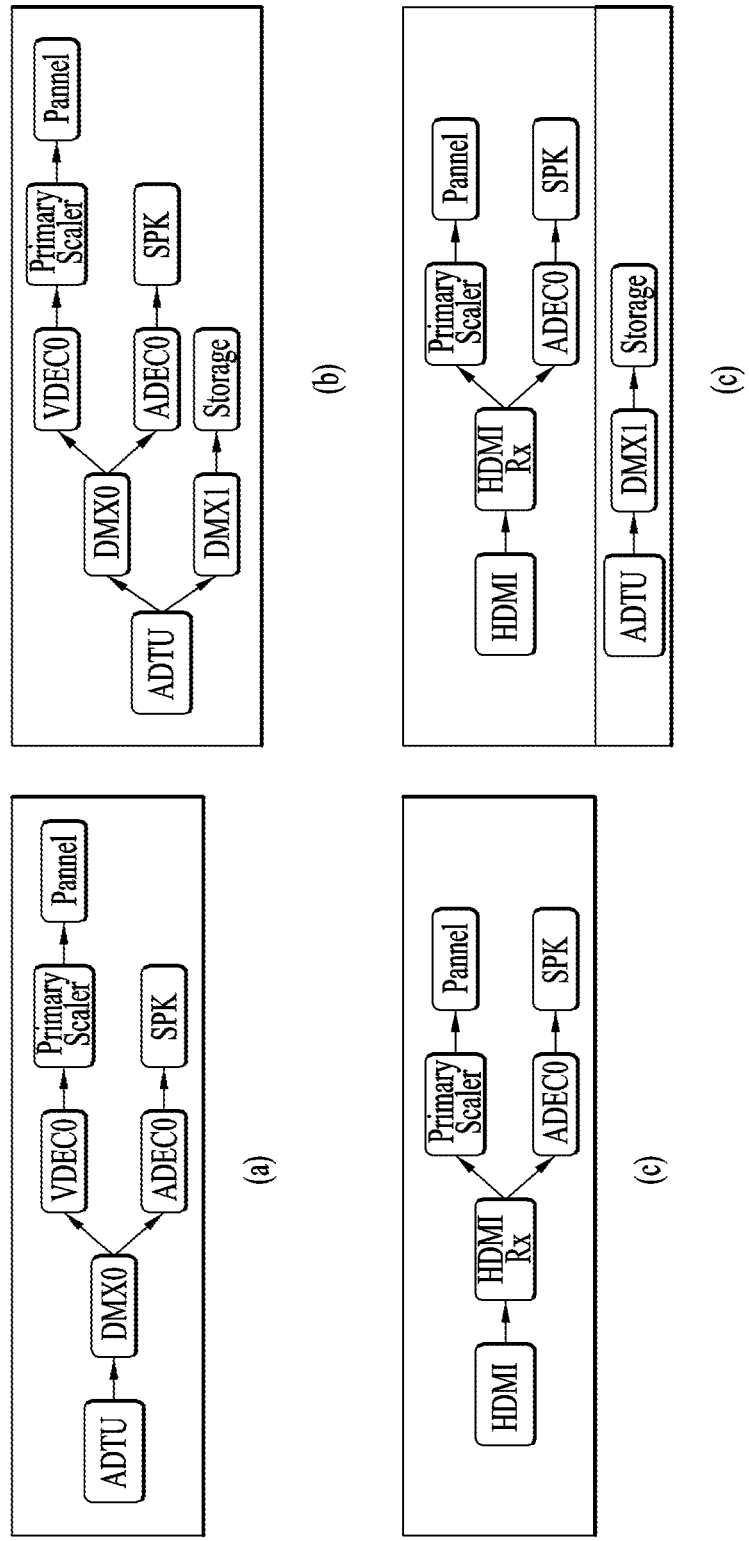

Referring to FIG. 45, FIG. 45*a* illustrates resource arrangement for a DTV watching operation, FIG. 45*b* illustrates resource arrangement for performing a DVR recording operation together with the DTV watching operation according to a DVR recording request, FIG. 45*c* illustrates resource arrangement for performing a DVR recording operation and an HDMI inputting operation when the DTV watching operation is removed due to conflict as an input source is changed to HDMI input, and lastly, FIG. 45*d* illustrates resource arrangement configured to watch HDMI input through HDMI input when the DVR recording operation is terminated in FIG. 45*c* above. Here, FIGS. 45*a* to 45*d* sequentially illustrate change in configuration of resource arrangement according to change in a TV scenario and the converse may also be possible.

First, referring to FIG. 45*a*, according to resource arrangement for DTV watching, video transmitted through ADTU and DMX0 may be output to a panel through VDEC0 and a primary scaler and audio data may be output to SPK through ADEC0.

In FIG. 45*a*, when a request for the DVR recording operation is received during the DTV watching operation, whether the two operations are simultaneously performed may be determined based on the resource sharing concept in consideration of whether resource conflict occurs, whether a resource is acquired, etc., as described above. In addition, as illustrated in the drawing, when the two operations can be simultaneously performed, resource arrangement may be configured as illustrated in the drawing. Accordingly, a detailed description of resources after DMX0 through the shared ADTU is the same as in FIG. 45*a* above. However, data is stored in a storage through the ADTU and the DMX1 for the DVR recording operation.

When an input source between DTV and HDMI is changed during the procedure of FIG. 45*b*, resources may be arranged. In this case, the input source between the DTV and the HDMI may be changed and resources for the DTV watching operation may be released. In addition, in consideration of resource conflict between an HDMI input source change operation and a DVR recording operation, etc., whether the two operations are simultaneously performed may be determined. As illustrated in the drawing, the two operations can be simultaneously performed. However, in FIG. 45*b*, since ADTU may be shared with the DTV watching operation, the ADTU is used for the DVR operation, ADTU needs to be re-acquired through a resource manager of a media server according to resource release for the DTV watching operation. The HDMI may output video data through an HDMI Rx (HDMI receiver), a primary scaler, and a panel and output audio data through ADEC0 and SPK. In this case, in the above case, although resources of the primary scaler, the panel, ADEC0, SPK, etc. are the same as resources for the DTV watching operation in FIG. 45*b*, resource release is already performed as described above and, thus, the resources may be resources re-allocated from a resource manager of a media server for an HDMI input operation.

Then, when DVR recording is stopped or terminated, resource arrangement only for HDMI watching may be configured as illustrated in FIG. 45*d*.

Figure 46:
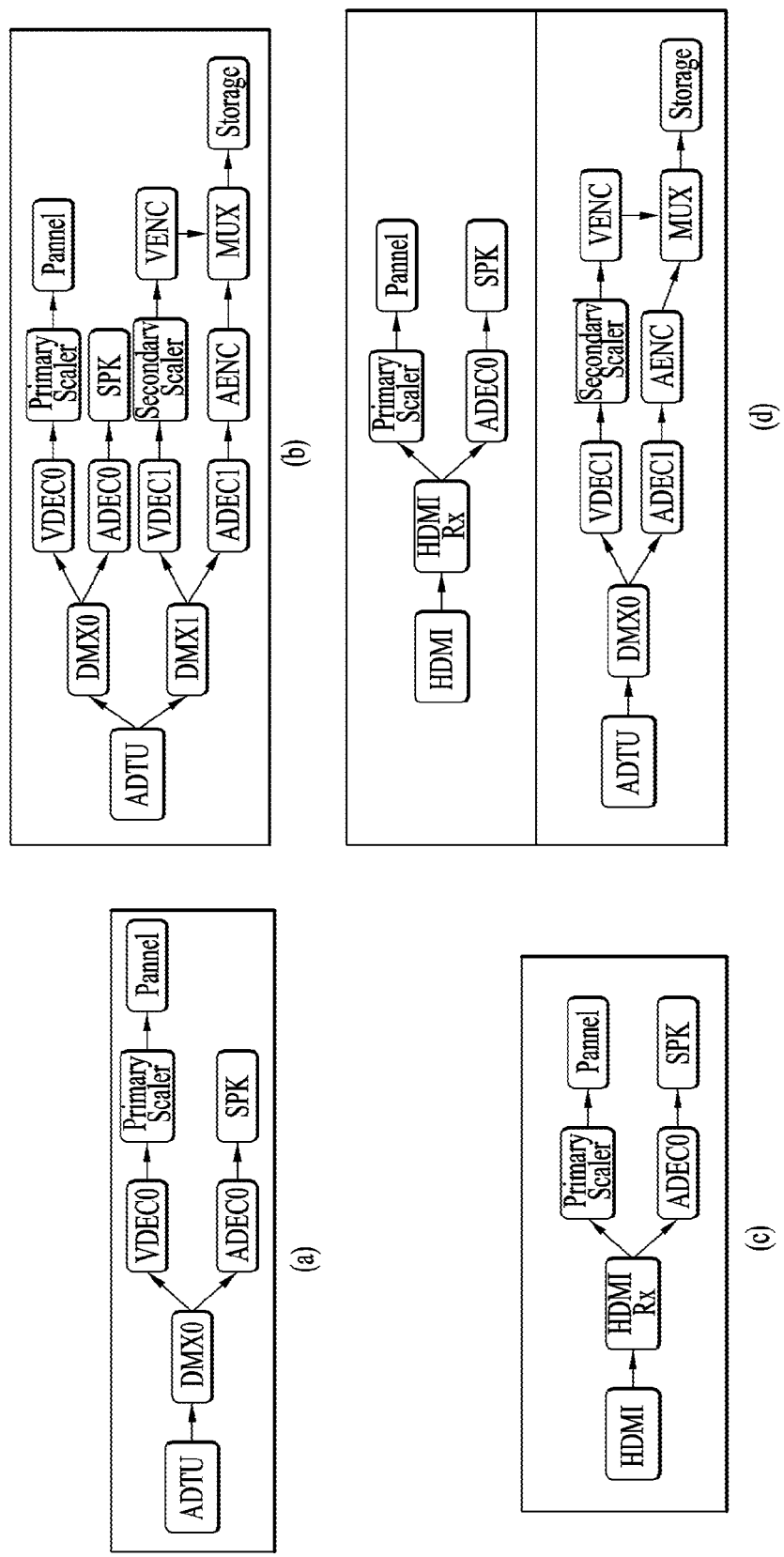
Figure 47:
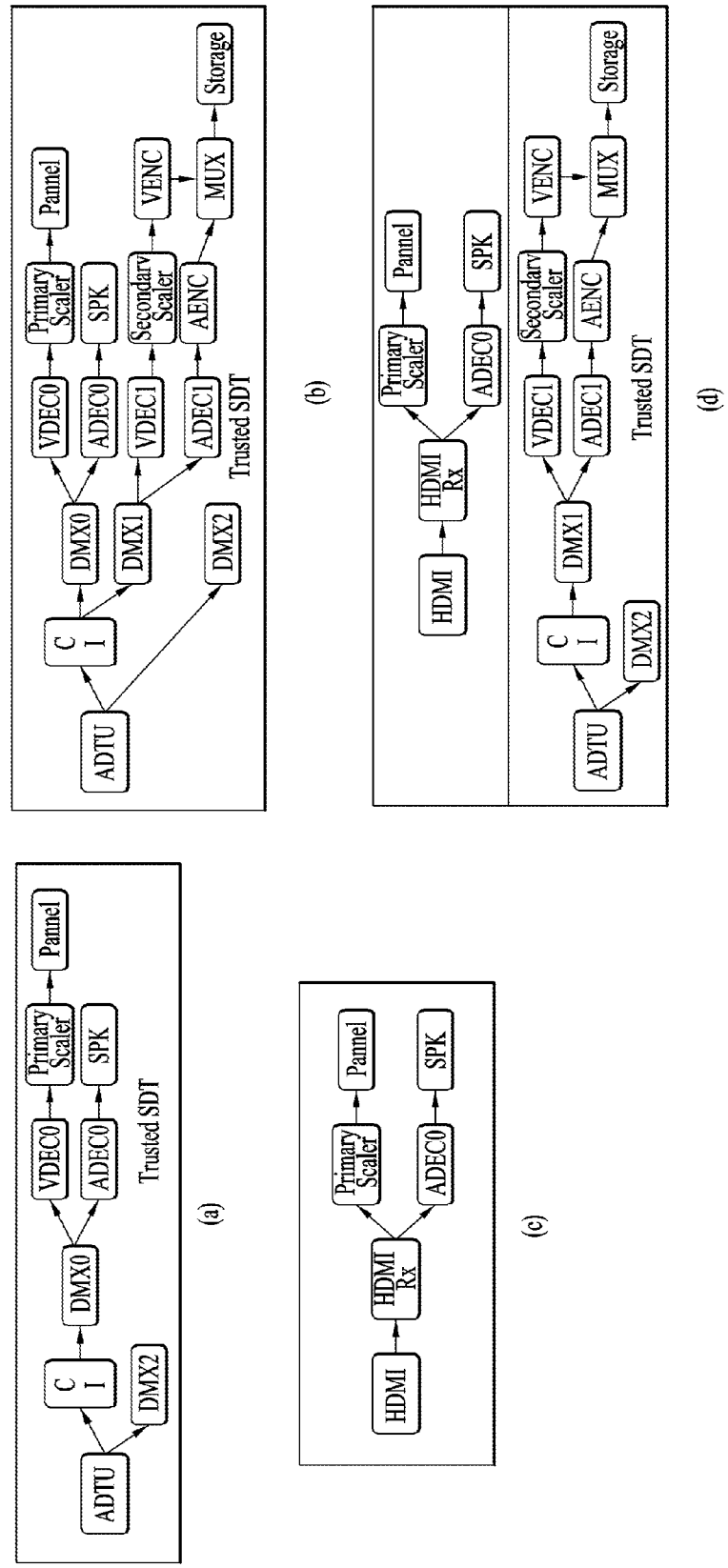

FIGS. 46 and 47 are almost the same as FIG. 45 above. However, FIGS. 46 and 47 are different from FIG. 45 in that resource arrangement is configured in such a way that some resources share a resource like in FIGS. 42 to 44 above. For example, the difference between FIGS. 45b and 46b is the same as difference between FIGS. 42a and 42c.

FIG. 47a illustrates the case of watching of a DTV with a camcorder, ADTU may be shared, a watching operation may be performed through a common interface (CI), DMX0, VDEC, ADEC, etc., and signaling information for the watching operation may be received through DMX2 through ADTU.

FIGS. 47b to 47d are almost the same as FIGS. 46b to 46d except for the difference from FIG. 47a.

Figure 48:
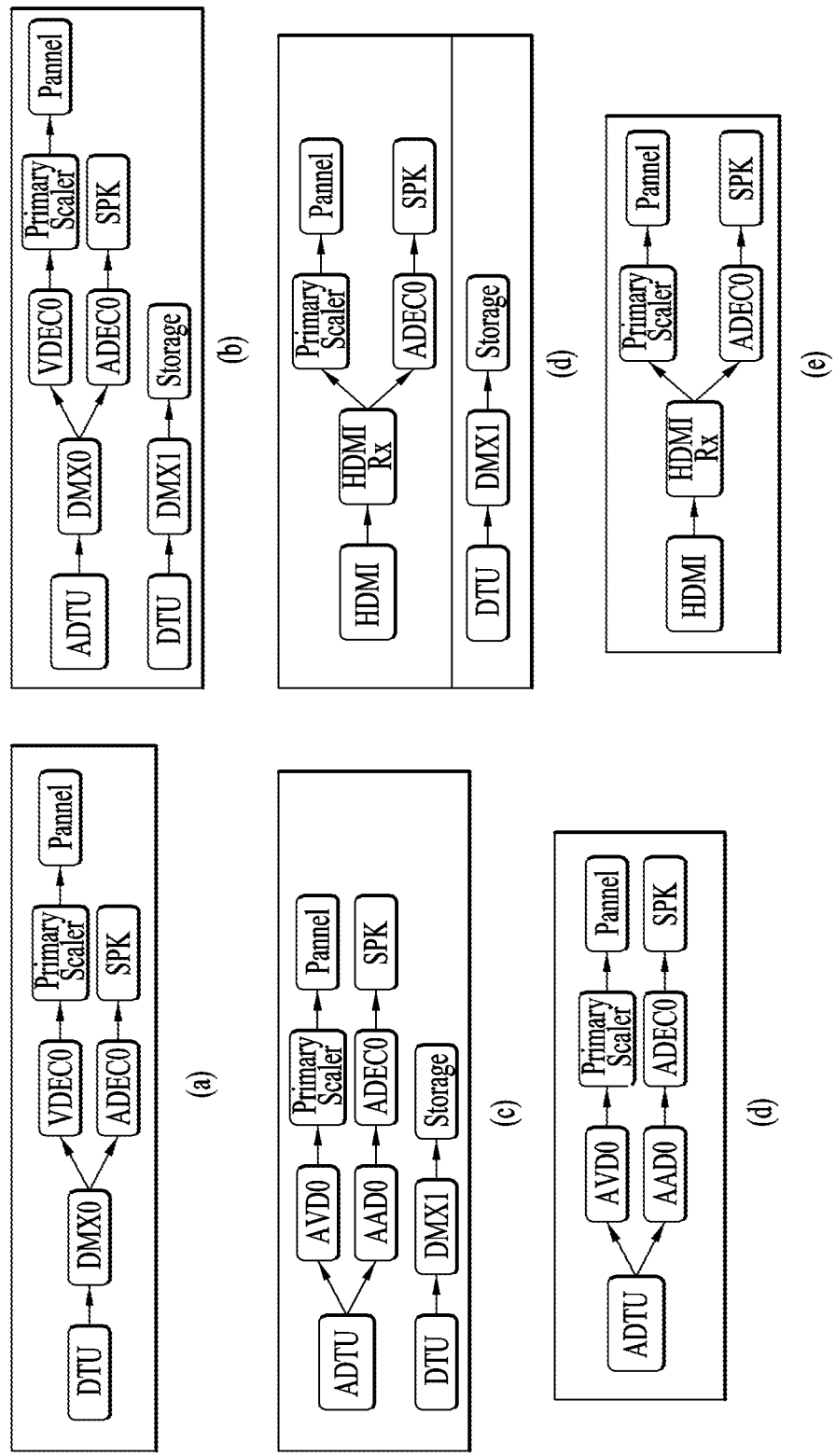
Figure 49:
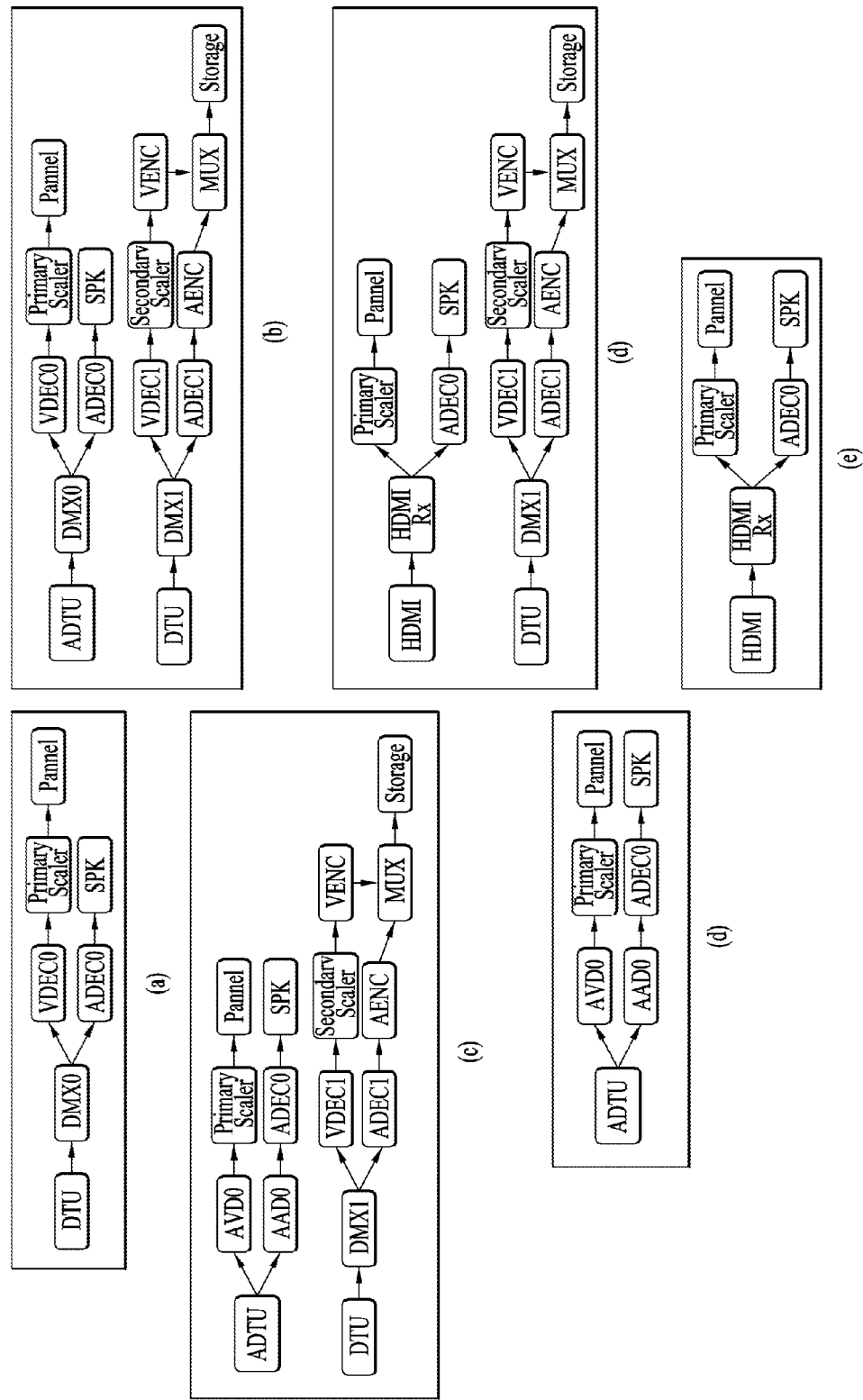

FIGS. 45 to 47 illustrate a method of configuring resource arrangement for an operation in a single tuner, whereas FIGS. 48 and 49 illustrate a method of configuring resource arrangement for an operation in a multi-tuner.

FIG. 48a illustrates the case of a DTV watching operation, video data may be output to VDEC0, a primary scaler, and a panel through DTU and DMX0, and audio data may be output to ADEC0 and SPK.

FIG. 48b illustrates the case in which a request for a DVR recording operation is received during a DTV watching operation and illustrates the case of a multi-tuner. Accordingly, FIG. 48b is different from FIG. 48a in that resource arrangement is not changed for the DTV watching operation and a separate DTU (tuner) is allocated for the DVR recording operation.

FIG. 48c illustrates the case in which an input source is changed to HDMI from a DTV. In this case, unlike in the above case, a separate tuner DTU is allocated for the DVR recording operation and, thus, it may be sufficient to simply release all resources for DTV watching and separate contact or communication with a resource manager for the DVR recording operation may not be required. In addition, it may be sufficient to configure resource arrangement of a pipeline for an HDMI operation.

FIG. 48d illustrates the case in which change between a DTV and an ATV occurs in FIG. 48b. That is, FIG. 48b illustrates resource arrangement configured for simultaneously performing a DTV watching operation and a DVR recording operation, whereas FIG. 48d illustrates resource arrangement configured for simultaneously performing an ATV watching operation and a DVR recording operation. In this case, as described above, FIG. 48 assumes a multi-tuner and, thus, resource arrangement for a DVR recording operation is not affected. However, all resources for the DTV watching operation are released and it may be sufficient to configure only resource arrangement for an ATV watching operation.

When recording is stopped or terminated in FIG. 48c, resource arrangement may be configured as illustrated in FIG. 48e. However, when recording is stopped or terminated in FIG. 48d, resource arrangement may be configured as illustrated in FIG. 48f, which will be sufficiently understood with reference to FIGS. 45 to 47 above.

FIG. 49 is almost the same as FIG. 48 above but illustrates the case in which resource arrangement is configured in such a way that a shared resource among resources required to perform each operation or to simultaneously perform a plurality of operations is slightly different from in FIG. 48. Accordingly, an overall description of FIG. 49 is almost the same as that of FIG. 48 above and, thus, will be understand with reference to the description of FIG. 48, and a detailed description of FIG. 49 will be omitted here.

Figure 50:
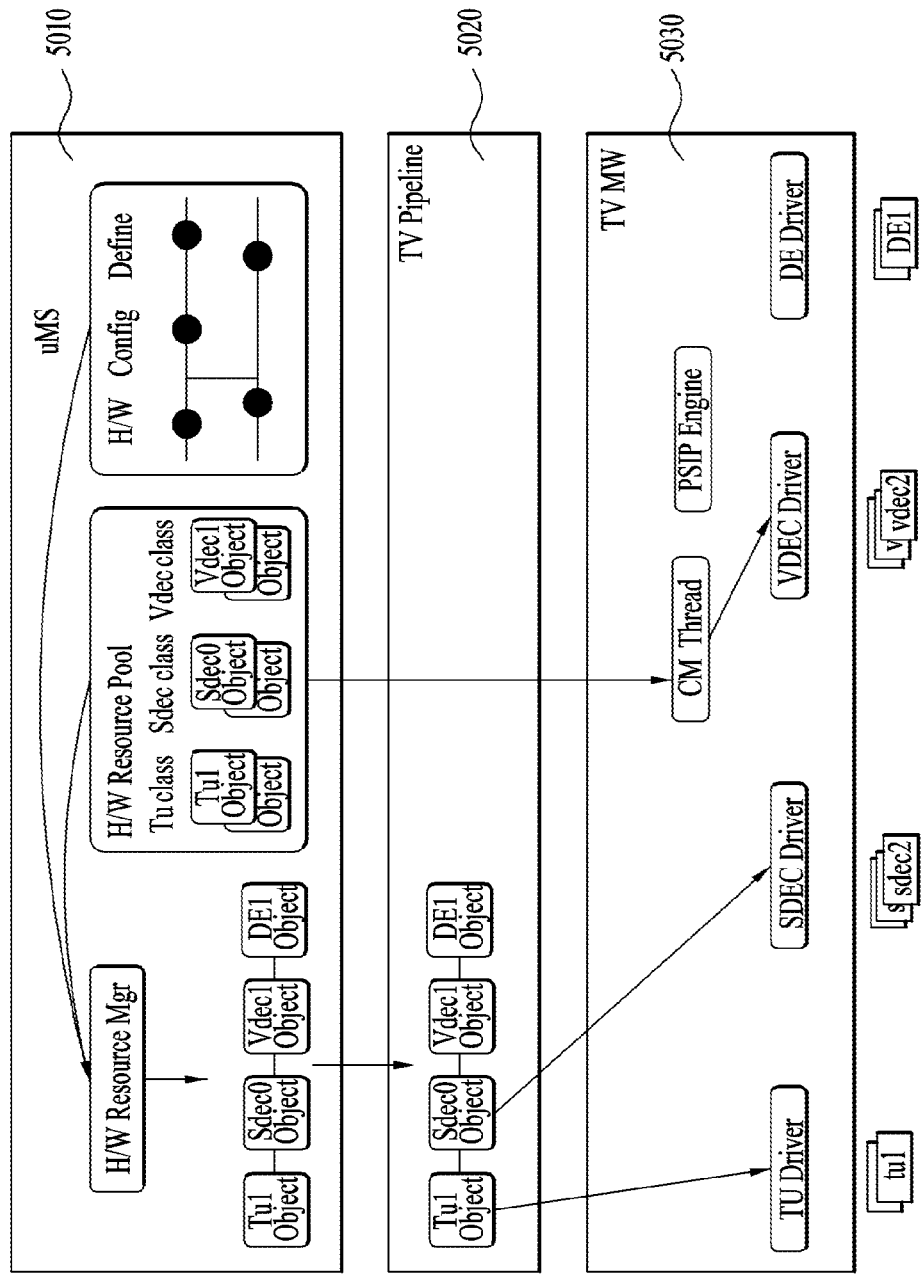
FIG. 50 is a diagram for explanation of a service restructure according to an embodiment of the present invention.

FIG. 50 is a diagram for explanation of a service restructure according to an embodiment of the present invention.

FIG. 50 illustrates a restructure of, in particular, a TV service. The restructure of the TV service is required because it is difficult to smoothly process a TV service in a web OS-based digital device using a TV service structure of a conventional broadcast receiver. The conventional broadcast receiver includes a finite state machine (FSM) and uses MRE as a system-based state machine. However, when the MRE is used, there is inconvenience of using the FSM. In addition, the conventional broadcast receiver has degraded flexibility or extensibility due to a fixed resource path. In addition, the conventional broadcast receiver cannot distinguish a UX scenario from a resource limited scenario. For example, even if resource limit is removed, it may be difficult to remove the resource limited scenario by the conventional broadcast receiver. Accordingly, in the present specification, in order to smoothly perform a TV service on a web OS platform, a TV service may be restricted as follows.

First, MRE used in the conventional broadcast receiver may not be used. That is, a centralized state machine may not be used. To this end, as in FIG. 51, the TV service may be restructured. For example, when a TV pipeline manager/TV pipeline sets a path when there is an input change or a specific function is performed in the web OS platform. In addition, the TV resource manager may allocate a resource in each state and a path manager may provide path information. In addition, the TV service may be ported to a web OS. As illustrated in FIG. 50, the TV service may be restructured to use a system-based pseudo pipeline. In addition, in the web OS platform, a UX scenario and a resource limited scenario may be separated. In other words, a TV policy manager or a TV pipeline manager may be in charge of the resource limited scenario.

Referring to FIG. 50, a hardware resource manager may receive a load request (Load tv://) and a media server may define a hardware resource configuration file. The hardware resource manager may allocate a resource based on the defined hardware resource configuration file. In addition, the hardware resource manager may receive class information from a hardware resource pool. The hardware resource manager may generate path information (ex, TU1 object-SDEC0 object-VDEC1 object-DE1 object) and transmit the path information to a TV pipeline and the TV pipeline may configure a pipeline based on the transmitted path information.

When the TV pipeline is configured, each object may transmit an open request (ex, TU1 open to TU driver, SDEC0 open to SDEC driver) to corresponding drivers of TV middleware. Thereby, drivers related to the object may be opened and path control may be configured.

Then, upon receiving a play request (Play tv://), the hardware resource manager may transmit the received play request to a channel manager (CM) thread in the TV middleware and, accordingly, a required driver may be opened and a service may be performed. As such, a hardware resource may be controlled to perform a service operation such as channel change.

Figure 51:
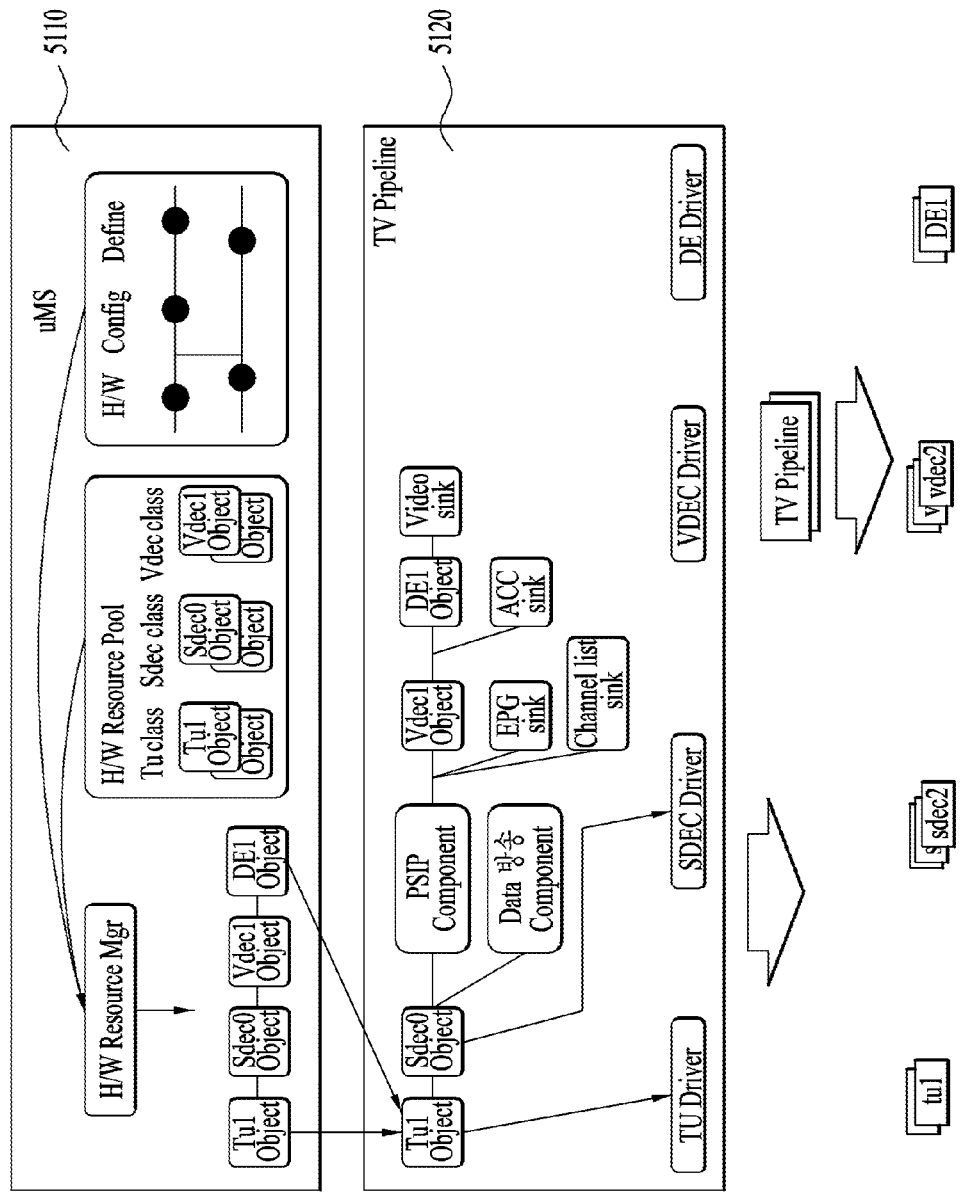
FIG. 51 is a diagram for explanation of a service restructure according to another embodiment of the present invention.

FIG. 51 is a diagram for explanation of a service restructure according to another embodiment of the present invention.

A handling procedure of an upper end of a TV pipeline of FIG. 51 is the same as a handling procedure of an upper end of a TV pipeline of FIG. 50 above and, thus, will be understood with reference to the above description of FIG. 50, and a detailed description of FIG. 51 will be omitted here. Accordingly, here, a lower end of the TV pipeline will be mainly described.

As described above, FIGS. 50 and 51 are different in terms of a configuration of a TV pipeline, which is the most important difference between FIGS. 50 and 51. FIG. 50 above is for configuration of a pseudo pipeline for porting a TV service to a web OS, whereas FIG. 51 is for replacement of MRE supported by a conventional TV service. Accordingly, the TV service restructure illustrated in FIG. 51 may be different from a conventional TV service in terms of, for example, functions of a TV pipeline manager related to a TV pipeline, a TV resource manager, a path manager, etc.

FIG. 50 illustrates configuration of a pseudo pipeline, whereas as seen from FIG. 51, more resources are arranged in relation to a TV service, TV pipeline configuration of which is requested. In addition, unlike in FIG. 50, in FIG. 51, a TV pipeline end, but not a TV middleware end may directly handle drivers for resources. These may correspond to, for example, difference between FIGS. 50 and 51.

With reference to FIG. 51, a TV pipeline end will be described in more detail.

Resource arrangement for channel change as a TV service in the TV pipeline end may be configured according to objects TU-SDEC-VDEC-DE, as illustrated in FIG. 50 above. Arrangement of the objects is deemed to illustrate basic resources for the TV service, for example. FIG. 50 illustrates the case in which TV middleware connects related drivers and resources and performs subsequent processes when only the basic resources are arranged. However, in FIG. 51, intervention of a TV middleware end may be minimized to minimize load and a TV pipeline end may directly handle drivers for connection with a resource to rapidly perform processes.

TV pipelines for a channel change TV service of FIG. 51 may be arranged according to a sink order of TU-SDEC0-PSIP-VEDC1-DE1-VIDEO. Here, it may be seen that a data broadcast component may be arranged between a SDEC0 object and a PSIP component as necessary, and an EPS sink, a channel list sink, etc. may be arranged between the PSIP component and the VDEC1 object as necessary, and an ACC sink may be additionally arranged between the VDEC1 and the DE1 object. In addition, the TV pipeline end may directly handle driver open for connection with a hardware resource such as an object, a component, and a sink which are arranged in the pipeline. As such, the TV pipeline end may directly handle a driver so as to minimize an operation and burden of the TV middleware and to rapidly perform access, handling, etc. In the above case, a TV pipeline configuration structured for a channel change service is an example illustrated to aid in understanding of the present invention and for convenience of description and, thus, is not limited to the drawing. In addition, in the above case, the PSIP component may be changed to a DVB component or the like according to definition in the standard related to signals and a PSI component may be further added.

Hereinafter, policy management according to the present invention will be described in more detail with reference to the accompanying drawings.

In the above case, for configuration of a pipeline, resources may be appropriately arranged using a resource sharing concept. However, a resource in a digital device for a service or an application may be limited. Accordingly, limited resources need to be appropriately arranged in order to support the service or the application in a web OS according to the present invention, which may be necessary in order to support multitasking, etc., in particular in a web OS platform. In other words, in order to support a service or an application by a digital device, resources may be required but there is possibility that resource conflict occurs in more resources. As such, when resource conflict occurs, user inconvenience may be minimized by appropriately controlling the resource conflict so as to smoothly provide a service.

Here, policy management to be described below in more detail may be performed. The policy management may also be referred to as a policy action as necessary.

The policy management according to the present invention may be roughly processed by a centralized policy manager and a distributed policy manager. Here, FIG. 52 illustrates the centralized policy manager and FIG. 53 illustrates the distributed policy manager.

Figure 52:
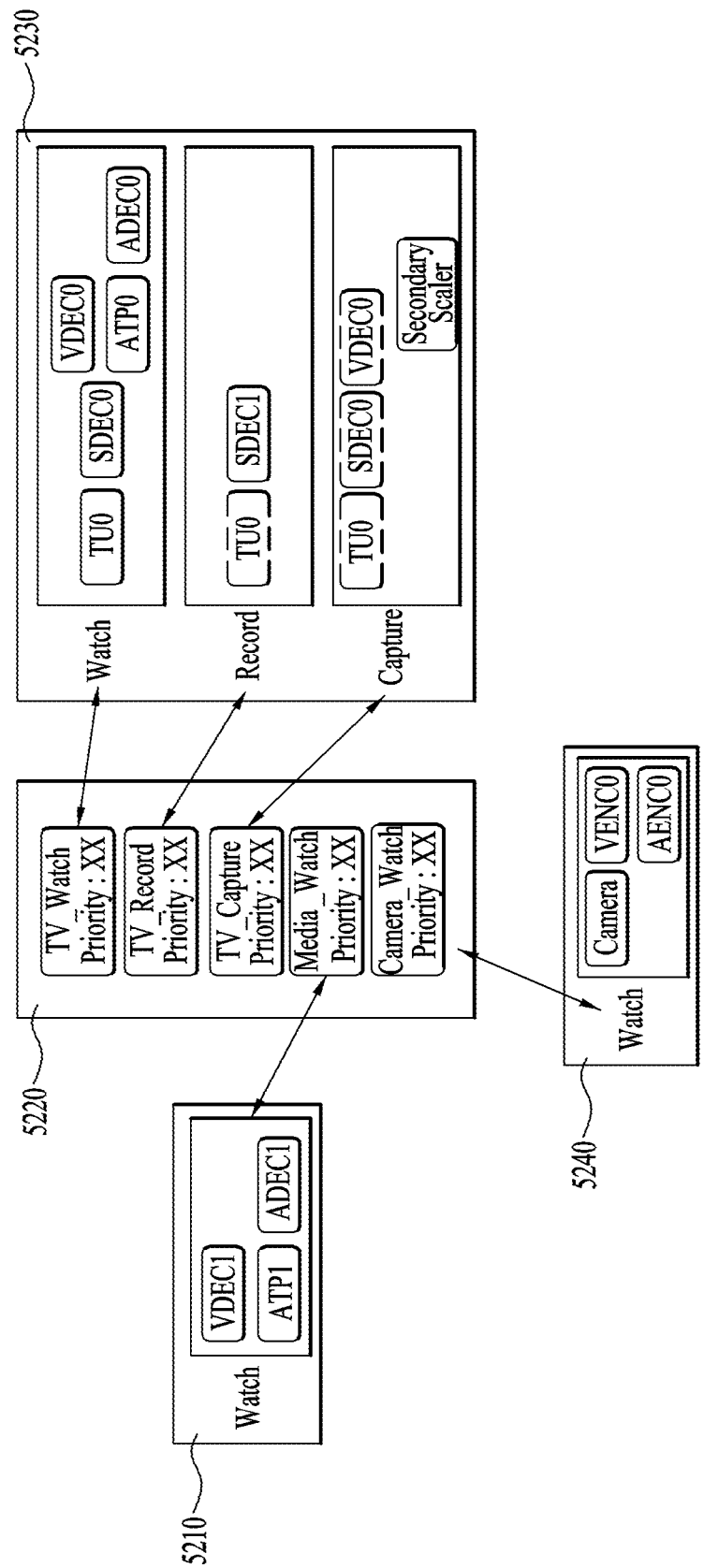
FIG. 52 is a diagram for explanation of policy management according to an embodiment of the present invention.
Figure 53:
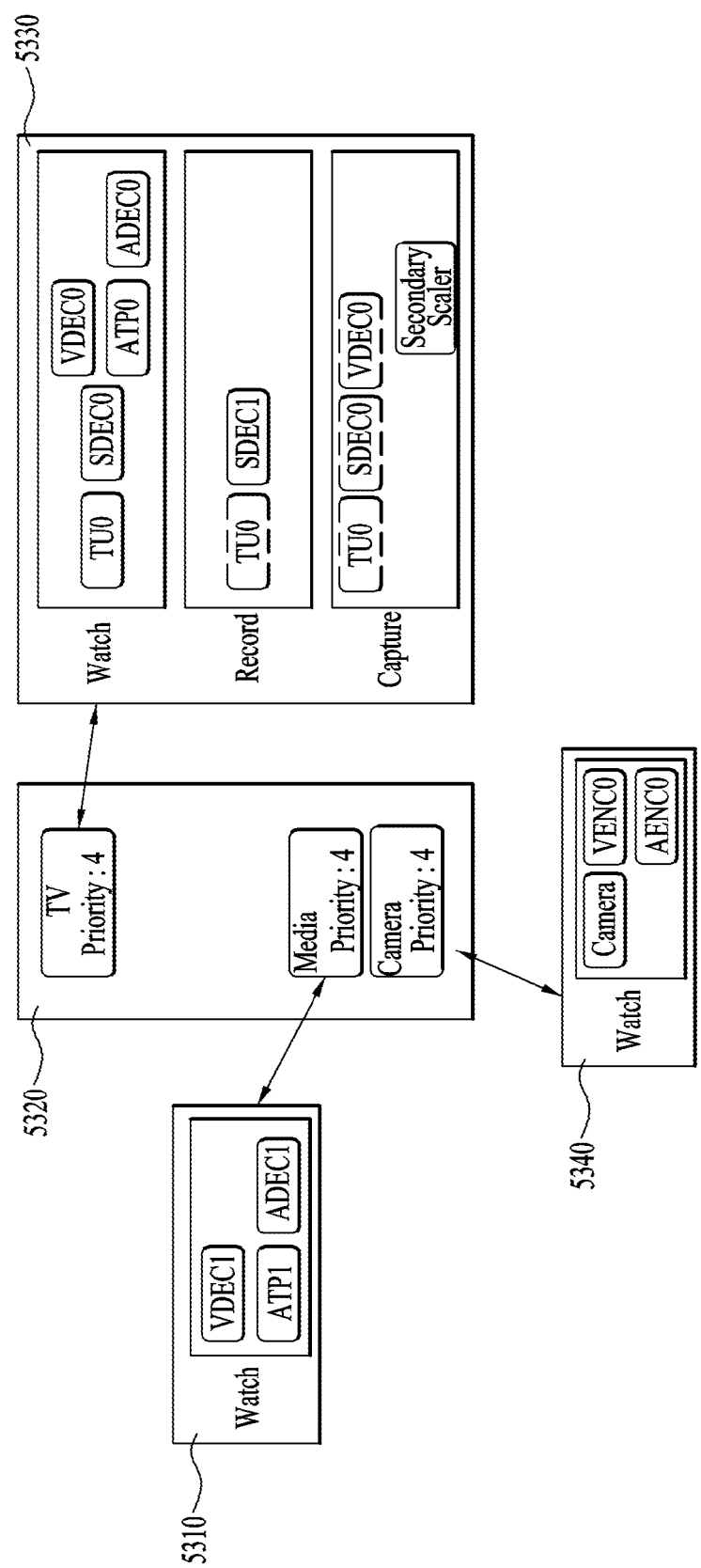
FIG. 53 is a diagram for explanation of policy management according to another embodiment of the present invention.

FIG. 52 is a diagram for explanation of policy management according to an embodiment of the present invention.

First, with reference to FIG. 52, the centralized policy manager will be described below.

A policy may be basically applied to each pipeline and may be intuitive. When resource conflict occurs, only a resource manager of a media server may consider the policy. In other words, the pipeline(s) do not necessarily consider the policy. This is because the resource manager needs to arrange resources in each pipeline in consideration of the policy.

When there is a common policy to be commonly applied to a TV system, it is easy to apply the common policy and, thus, the centralized policy manager may reduce a load. In other words, one or resources or modules related to a pipeline may not basically consider a complex policy in order to reduce a load, which may be interpreted as if a policy needs to be consistently applied to a digital device.

However, in terms of the centralized policy manager, the policy manager needs to care all policies in a digital device and, thus, there is a worry of increased code complexity. The code may become more complex because a policy needs to be defined so as to process various exception handlings related to a service or application by which it is difficult to address the common policy as well as the common policy. For this reason, when the centralized policy manager is employed, the code quality and reusability of the media server may be degraded, and when a new pipeline is added, there may be a burden to compare priorities all existing pipelines and, accordingly, an order needs to be re-determined. When a digital device supports a TV service, there is a worry of increased code complexity in handling such as resource arrangement in the case of a shareable resource, dynamic priority, and so on.

Referring to FIG. 52, a media pipeline 5210 for watching may require resources VDEC1, ATP1, and ADCE1 for watching. In addition, a TV service 5230 may have three pipelines, i.e., a watch pipeline, a record pipeline, and a capture pipeline. Here, the watch pipeline may require resources TU0, SDEC0, VDEC0, ATP0, and ADEC0, the record pipeline may require resources TU0 and SDEC1, and the capture pipeline may require resources TU0, SDEC0, VDEO0, and Secondary Scaler. In addition, a camera pipeline 5240 may require resources Camera, VENC0, and AENC0 for watching.

As described above, when each pipeline requires resources, a resource manager 5220 in a media server may appropriately allocate required resource(s) to a corresponding pipeline. However, as described above, basically, a digital device has limited resources and, thus, it may be necessary to appropriately allocate the resources. For example, the resource manager 5220 may order a resource TU0 that is commonly required by watch, recording, and capture pipelines in a TV service to be shared according to a resource sharing scheme among resources required by the three pipelines and order resources SDEC0 and VDEC0 to be shared with respect to watch and capture pipelines. As described above, the resource manager needs to consider a resource required by a media pipeline and camera pipelines as well as pipelines of a TV service, as described above. To this end, the resource manager 5220 may pre-store resource allocation priority data with respect to each service and/or pipelines and allocate resources based on the data. As an example of FIG. 52, the resource manager may order resources required by each pipeline to be appropriately allocated or shared according to a pre-stored resource allocation priority order with respect to TV watching, TV recording, TV capture, media watching, camera watching, etc., allocate resource(s) with conflict to a pipeline with high priority based on the priority order, and return resource allocation refusal intention with respect to pipeline(s) with low priority. As such, the policy manager may allocate a resource based on the priority order in consideration of resource conflict possibility. In other words, whenever a pipeline is generated and the generated pipeline requires a resource, the resource manager may check conflict possibility with the generated pipeline with respect to resource(s) allocated to the generated pipeline(s), and when conflict occurs as the check result, the resource manager may appropriately determine a resource to be released according to a policy based on the priority order and a pipeline to which the released resource is to be allocated. Although the case in which the aforementioned policy management is performed based on the pre-determined or pre-stored priority order with respect to each pipeline has been described, the resource release or allocation may be determined by further considering least recently used (LRU) data as necessary.

FIG. 53 is a diagram for explanation of policy management according to another embodiment of the present invention.

Unlike the centralized policy manager of FIG. 52, FIG. 53 illustrates a distributed policy manager.

According to the distributed policy manager, independency between services is high compared with the centralized policy manager. In addition, the centralized policy manager considers exception handling of various services to cause a complex code, whereas the distributed policy manager may internally process exception handling of the service in a corresponding service and, thus, priority with respect to another service may not be affected. As such, in the distributed policy manager, a resource manager in a media server does not necessarily care all policies of a digital device and, thus, a code may be simplified, and reusability is high and resource management is easy compared with the centralized policy manager. In addition, a policy separately proceeds in a unit of each service and, thus, a module that knows a corresponding service may manage the policy, and priority may also be easily applied when a new pipeline is added.

On the other hand, in terms of the distributed policy manager, it may be difficult to apply and process the aforementioned common policy. In addition, a function and module that separately manage a policy of each service need to be present.

The distributed policy management of FIG. 53 is similar to that of FIG. 52 above and, thus, a repeated description will be omitted and FIG. 53 will be understood with reference to the above description. Accordingly, the distributed policy management of FIG. 53 will be described in terms of a difference from the aforementioned centralized policy management method.

It may be seen that the centralized policy management method of FIG. 52 is performed in a pipeline unit, whereas the distributed policy management of FIG. 53 is performed in a service unit. Like the centralized policy management method of FIG. 52, the distributed policy management of FIG. 53 may be performed based on a priority order and/or LRU. However, as described above, the media server may be in charge of a minimum load and may entrust a detailed thing to a corresponding service.

Referring to FIG. 53, the media server may predetermine and store priority data only for a TV, media, and camera services. Accordingly, upon receiving a resource request in each service, the media server may allocate a resource to a corresponding service based on priority and/or LRU of the corresponding service. For the handling flow, resource conflict possibility needs to be considered whenever a resource is requested in each service, and when resource conflict occurs as the consideration result, policy management may be performed.

Although not illustrated in the present specification, the centralized policy management method of FIG. 52 and the distributed policy management method of FIG. 53 may be appropriately mixed as necessary. For example, upon receiving a request for resource allocation in one service, the media server may check whether there is resource conflict possibility in a service unit and allocate a resource based on the check result based on the distributed policy management method of FIG. 53. In this case, the media server may continuously allocate a resource in a service unit according to the distributed policy management method, when a plurality of pipelines are generated in a corresponding service, the media server may autonomously allocate a resource, and after determination in a service unit, the media server may allocate a resource in a pipeline unit in the corresponding service according to the centralized method of FIG. 52. In addition, when a pipeline in a service is a single pipeline, the media server may use a distributed method, and when the pipeline is multi-pipelines, the media server may use a centralized method, and the converse may also be possible. In addition, handling may be performed only when a plurality of services requests a resource.

FIGS. 54 to 57 are diagrams for explanation of a policy management method of a TV service and a media pipeline according to an embodiment of the present invention.

Figure 54:
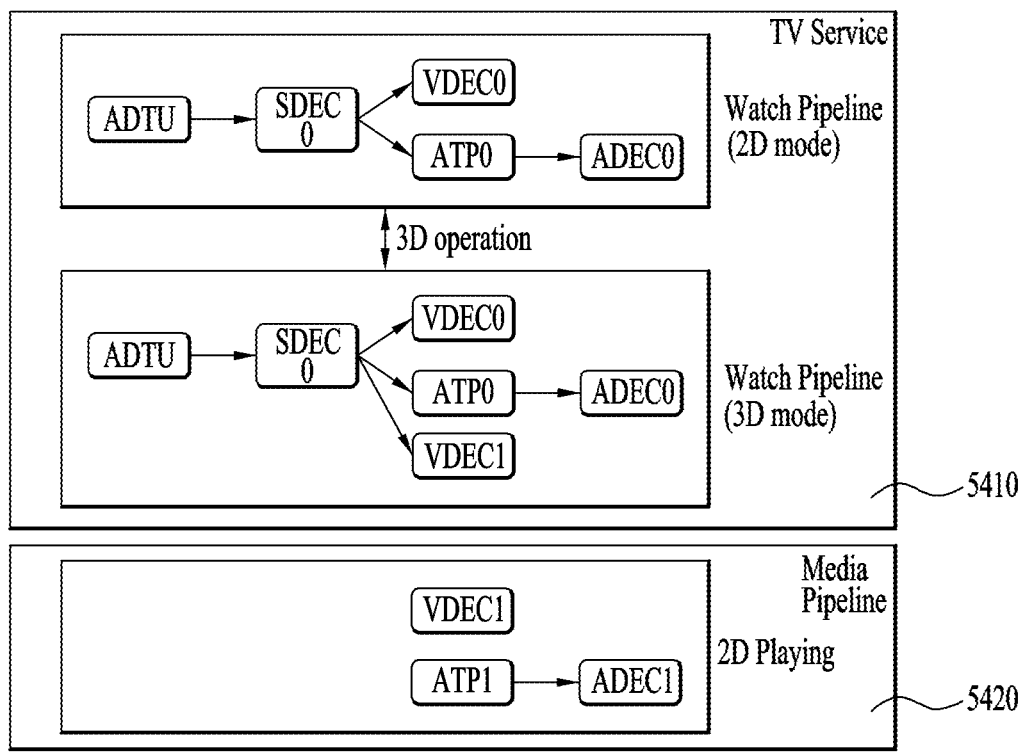
FIGS. 54 to 57 are diagrams for explanation of a policy management method of a TV service and a media pipeline according to an embodiment of the present invention.

Referring to FIG. 54, a watch pipeline A of a 2-dimensional (2D) mode and a watch pipeline B of a 3-dimensional (3D) mode are generated as a TV service, and a pipeline C for 2D reproduction is illustrated as a media pipeline. In the above case, the 2D mode watch pipeline A may require resources ADTU, SDEC0, VDEC0, ATP0, and ADEC0, the 3D mode watch pipeline B may require resources ADTU, SDEC0, VDEC0, ATP0, ADEC0, and VDEC1, and the media pipeline C may require resources VDEC1, ATP1, and ADEC1. In FIG. 54, the letters A, B, and C are illustrated for convenience of description in order to simply describe each pipeline. However, according to another embodiment of the present invention, the letters may refer to, for example, policy priority, a pipeline generation order, a resource allocation request order, or the like. Hereinafter, for convenience, although the letters are assumed to refer to each pipeline, the present invention is not limited thereto, as described above.

In the case of a conventional smart TV, when a C pipeline requests resource allocation after resource allocation with respect to A and B pipelines, a media server may refuse the resource allocation request due to resource conflict between VDEC1 of the B pipeline and VDEC1 of the C pipeline. In addition, when the B pipeline requests resource allocation after resource allocation with respect to the A and C pipelines, resource conflict may occur between the B and C pipelines, as described above. In this case, in the conventional smart TV, with respect to resource conflict, a TV service may be prioritized, that is, may have high priority and, thus, a release allocated by the C pipeline allocated resource VDEC1 may be controlled to be released. Accordingly, in this case, a TV may perform a TV service according to the A and B pipelines. In addition, when the C and A pipelines sequentially request resource allocation, there is no resource conflict and, thus, corresponding services can be simultaneously processed in the conventional smart TV. However, in this situation, when the B pipeline is generated and a request for resource allocation is received, resource conflict occurs between the B and C pipelines and, thus, resource allocation is not performed and is refused with respect to the B pipeline that lastly allocates a resource. Accordingly, in the above case, when the C pipeline is removed or does not release a resource, the 3D service cannot be used in the conventional smart TV.

On the other hand, in a digital device that employs a web OS platform according to the present invention, policy management may be performed when resource conflict occurs unlike the aforementioned conventional smart TV.

First, when the A and B pipelines request a resource and the resource is allocated via resource sharing, if the C pipeline is generated and the resource request is received, whether the resource VDEC is released as a TV service may be queried in a web OS device. In this case, a digital device may query user selection in the form of a GUI or OSD message. When the user selects to remove the 3D mode watch pipeline, the media pipeline may be allocated resource VDEC. However, when the user does not want to remove the 3D mode watch pipeline, the TV service may refuse a policy of the policy manager. Accordingly, the media pipeline cannot acquire the resource VDEC.

On the other hand, when the A and C pipelines pre-occupy resources, if the B pipeline receives resource allocation and requests a PIP TV service, the resource allocation request of the B pipeline may be refused. However, when the B pipeline requests a full-screen TV service, VDEC resource allocation of the B pipeline may be requested to the resource manager. In addition, the resource manager may request the media pipeline to release the VDEC resource.

As such, policy management may be differently performed in the conventional smart TV and the web OS device according to the present invention.

Hereinafter, a repeated description will be omitted and the present invention will be described in terms of the difference from the above description.

Figure 55:
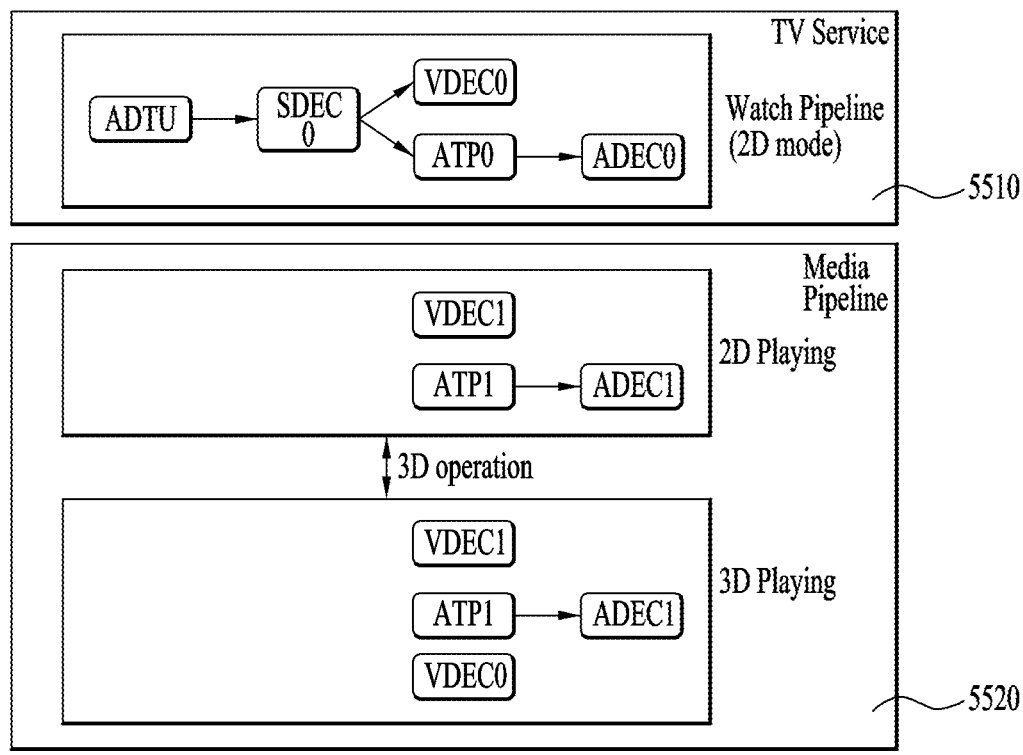

FIG. 55 illustrates a watch pipeline A of a 2D mode, and a 2D reproduction pipeline B and a 3D reproduction pipeline C as media pipelines are illustrated as a TV service. In FIG. 55, there is the possibility that conflict of resource VDEC0 occurs in the same way between the A pipeline and the C pipeline.

In a conventional smart TV, when the C pipeline requests a resource after resource allocation with respect to the A and B pipelines, a resource pre-allocated to the A pipeline may be processed to be released, and when the B pipeline requests a resource after resource allocation with respect to the A and C pipelines, a pre-allocated resource may be released with respect to the A pipeline, as described above. When the B pipeline requests a resource after sequential resource allocation with respect to the C and A pipelines, the resource of the A pipeline may be released in the same way, and when the A pipeline requests resource allocation after the C and B pipelines, resource allocation request of the A pipeline may be refused.

On the other hand, a web OS device according to the present invention performs the following handling.

When the C pipeline requests resource allocation after resource allocation with respect to the A and B pipelines and when the C pipeline request resource allocation after sequential resource allocation with respect to the B and A pipelines, if the C pipeline requests a media service via PIP, a request for the C pipeline may be refused. However, when the C pipeline requests a media service through a full-screen, the C pipeline needs to request resource VDEC to a media server. In this case, the media server requests release of VDEC as a TV service. Accordingly, the A pipeline may release the resource VDEC.

On the other hand, when the A pipeline requests a resource after resource allocation with respect to the B and C pipelines, the media server may request the media pipeline to release the VDEC. In addition, when the user selects to remove, in particular, the C pipeline, the resource VDEC may be allocated such that the TV service can be performed, but otherwise, the media pipeline may refuse a policy, and lastly, the resource VDEC cannot be acquired such that the TV service cannot be performed.

Figure 56:
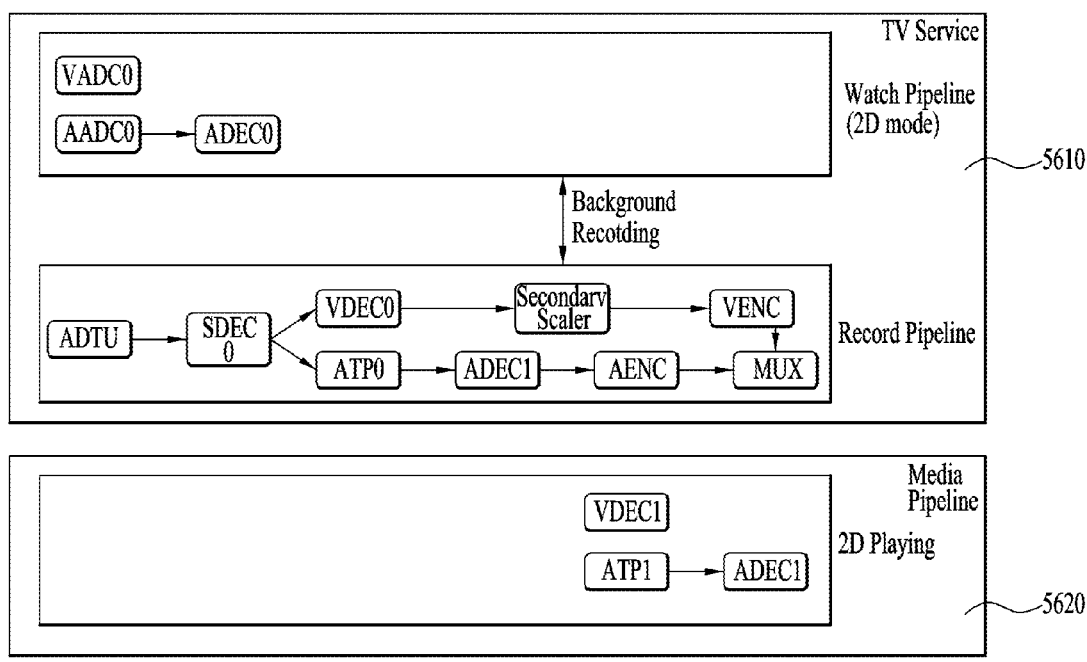

FIG. 56 illustrates the watch pipeline A and the record pipeline B according to component input and the 2D reproduction pipeline C as a media pipeline as a TV service. Here, in the above case, the A pipeline may require resources VADC0, AADC0, and ADEC0, the B pipeline may require resources ADTU, SDEC0, VDEC0, Secondary Scaler, VENC, ATP0, ADEC1, AENC, and MUX, and the C pipeline may require resources VDEC1, ATP1, and ADEC1. Accordingly, in FIG. 56, there is the possibility that conflict of resource ADEC1 occurs between the B and C pipelines.

According to the present invention, when the C pipeline requests a resource after resource allocation with respect to the A and B pipelines, when the B pipeline requests a resource after resource allocation with respect to the A and C pipelines, when the B pipeline requests a resource after resource allocation with respect to the C and A pipelines, and when the A pipeline requests a resource after resource allocation with respect to the C and B pipelines, if a pipeline that lastly requests a resource from each case requests a PIP screen, all requests for the PIP screen request may be refused.

Figure 57:
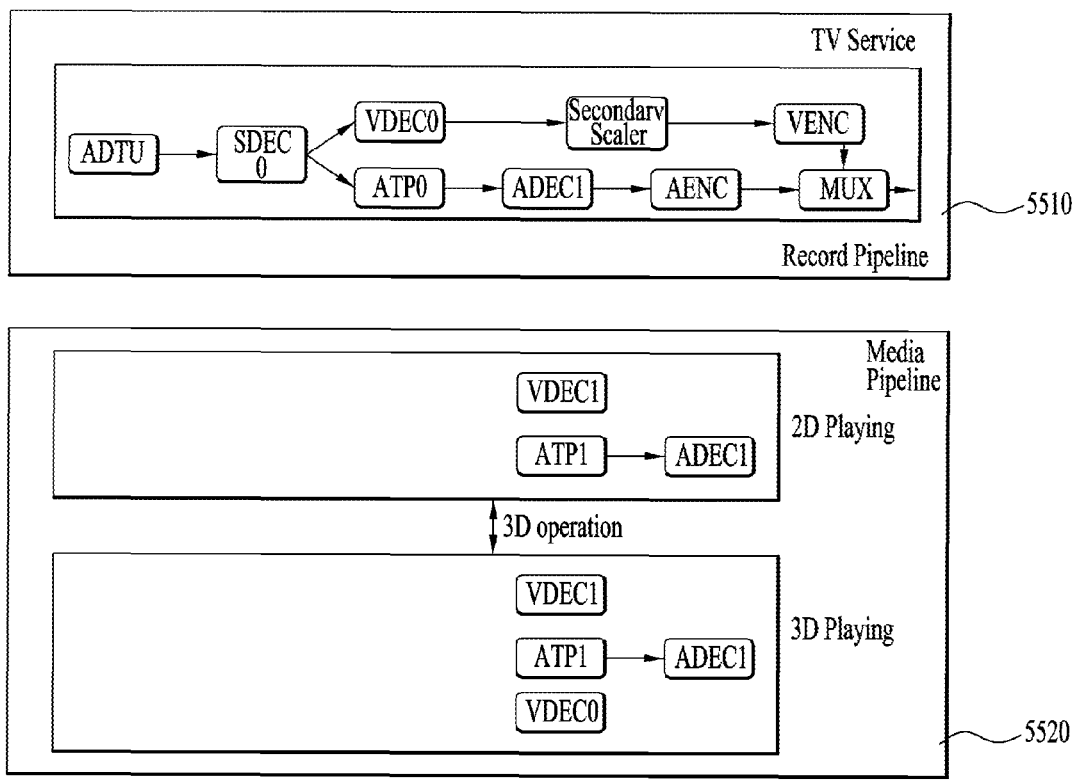

Lastly, FIG. 57 illustrates a pipeline A and a 2D reproduction pipeline B and a 3D reproduction pipeline C as a media pipeline in a TV service. In FIG. 57, there is the possibility that conflict of resources VDEC0 and ADEC1 occurs between the TV service and the media pipeline.

In the case of a conventional smart TV, in any case of FIG. 57, the C pipeline needs to refuse resource allocation or to release a pre-allocated resource. However, in a web OS device, a media server may request release of resource VDEC via a TV service but the TV service refuses the policy, and accordingly, the media pipeline may not be allocated resource VDEC. Accordingly, in this case, when the C pipeline does not terminate the TV service or does not release an arbitrary resource due to the resource VDEC0, all services cannot be performed.

Figure 58:
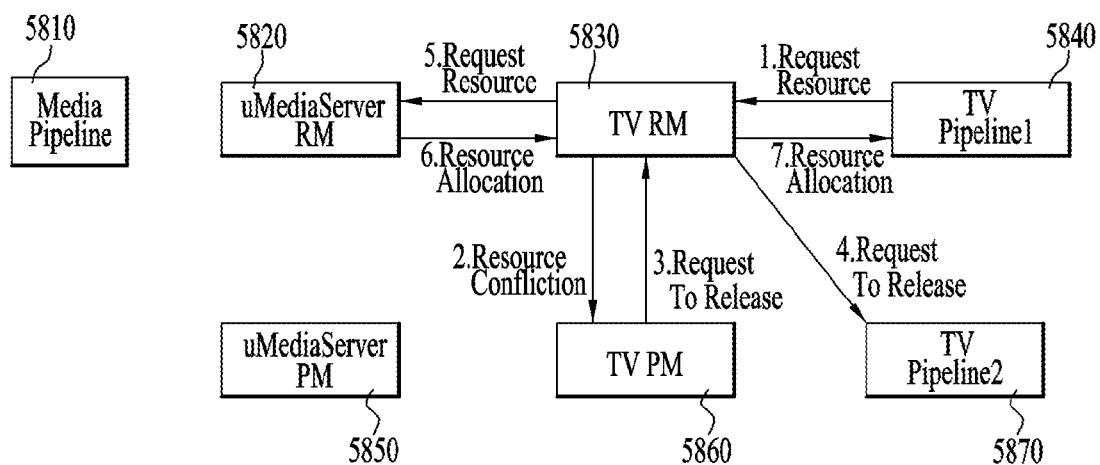
FIG. 58 is a diagram for explanation of a policy scenario between TV pipelines according to an embodiment of the present invention.

FIG. 58 is a diagram for explanation of a policy scenario between TV pipelines according to an embodiment of the present invention.

FIG. 58 illustrates the case of the distributed policy management of FIG. 53 rather than the centralized policy management of FIG. 52 above.

According to the present invention, with regard to resource management or policy management, a media server and a TV service processor may function. Here, the media server may function via functioning of a resource manager 5820 and a policy manager 5850, and with regard to the media server, one or more media pipelines for the media service may be present. The TV service processor may also operate via functioning of a TV resource manager 5830 and a TV policy manager 5860 and may control one or more TV pipelines for a TV service.

According to the present invention, resource(s) such as a tuner may be resource(s) only for a TV service. Accordingly, the TV resource manager may autonomously recognize resource conflict. Upon detecting the resource conflict after resource acquisition, the TV policy manager 5860 may appropriately process the resource conflict.

In this regard, when a TV pipeline1 5840 requests a resource, the TV resource manager 5830 may query whether resource conflict occurs via the TV policy manager. In addition, the TV policy manager 5860 may request resource release of a TV pipeline2 5870 in order to process resource conflict via the query. However, this case may correspond to the case in which resource conflict occurs.

When conflict occurs or does not occur, the TV resource manager 5830 may request the resource manager 5820 of the media server to allocate a resource, may be allocated the resource from the resource manager 5820 of the media server, and may allocate the allocated resource to the TV pipeline1 5840.

Figure 59:
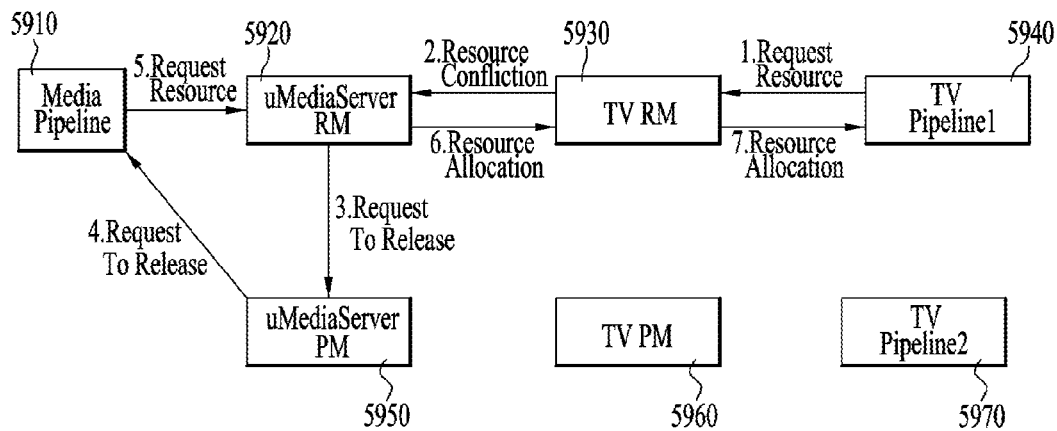
FIGS. 59 and 60 are diagrams for explanation of a policy scenario between a TV pipeline and a media pipeline according to an embodiment of the present invention.
Figure 60:
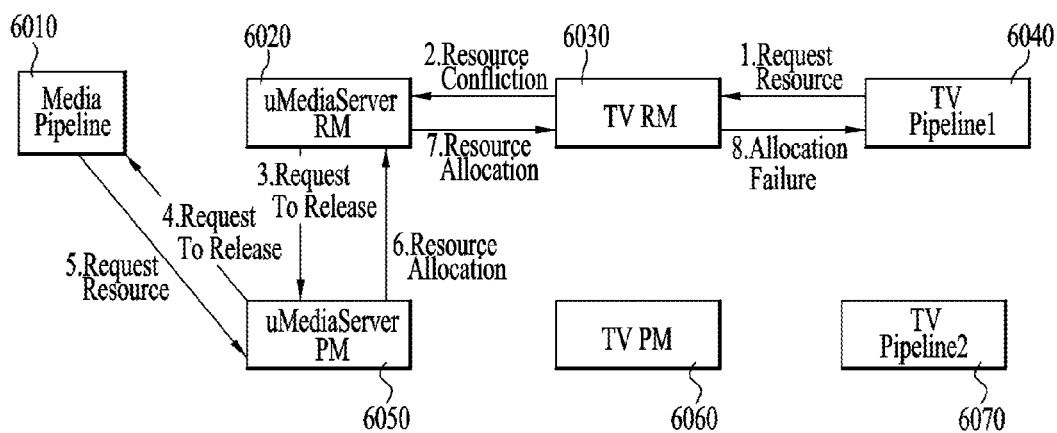

In FIG. 58, for example, only TV pipelines (the TV pipeline1 5840, the TV pipeline2 5870, etc.) may be present. On the other hand, the case in which one or more media pipelines 5810 are present will now be described. FIGS. 59 and 60 are diagrams for explanation of a policy scenario between a TV pipeline and a media pipeline according to an embodiment of the present invention.

Here, FIGS. 59 and 60 illustrates the case in which a corresponding resource is already allocated to media pipelines 5910 and 6010 when, for example, a TV pipeline makes a request for a resource.

Referring to FIG. 59, when a TV pipeline1 5940 requests a TV resource manager 5930 to allocate a resource, the TV resource manager 5930 may request a resource manager 5920 of a media server to allocate a resource in order to acquire a resource in response to the request. The resource manager 5920 of the media server may query whether resource conflict occurs to a policy manager 5950. The policy manager 5950 of the media server may request a media pipeline to release a pre-allocated resource according to the request of the resource manager 5920. When the media pipeline 5910 reports the resource manager 5920 of the media server to release a resource, the resource manager 5920 of the media server may allocate the resource requested by the TV resource manager 5930. The TV resource manager 5930 may allocate the acquired resource to the TV pipeline1 5940.

Referring to FIG. 60, when a TV pipeline1 6040 requests a TV resource manager 6030 to allocate a resource, the TV resource manager 6030 may request a resource manager 6020 of a media server to allocate a resource in response to the request. The resource manager 6020 of the media server may query whether resource conflict occurs to a policy manager 6050 of the media server. When resource conflict occurs, the policy manager 6050 may request a media pipeline 6010 to release a corresponding resource. When the media pipeline 6010 responds to refuse the request of the policy manager 6050, the policy manager 6050 may report the resource manager 6020 to refuse release, the resource manager 6020 of the media server may respond to the TV resource manager 6030 that resource allocation is not possible. The TV resource manager 6030 may re-transmit the response to the TV pipeline1 6040.

Both in FIGS. 59 and 60, there is an issue in terms of resource conflict between a TV pipeline and a media pipeline. However, FIG. 59 is different from FIG. 60 in that FIG. 59 illustrates the case in which the media pipeline 5910 responds to release request of the policy manager 5950 but FIG. 60 illustrates the case in which the media pipeline 5910 refuses the release request.

Figure 61:
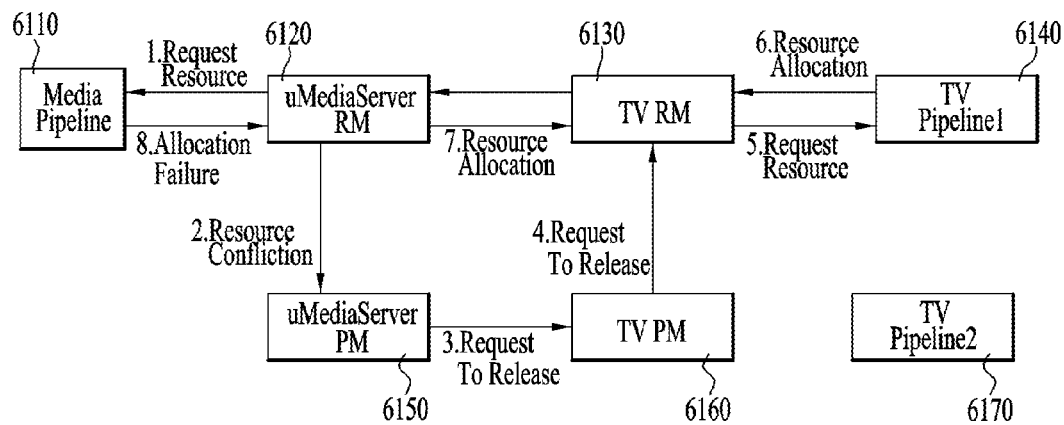
FIGS. 61 and 62 are diagrams for explanation of a policy scenario between a TV pipeline and a media pipeline according to another embodiment of the present invention.
Figure 62:
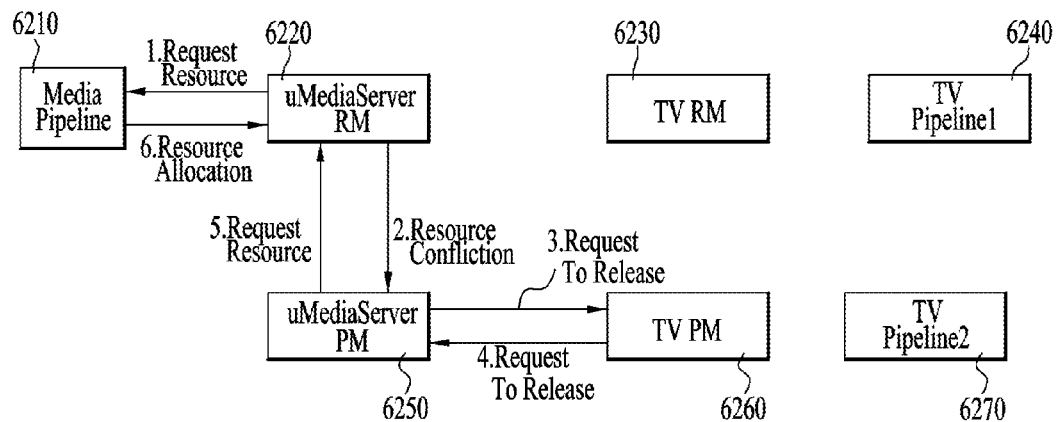

FIGS. 61 and 62 are diagrams for explanation of a policy scenario between a TV pipeline and a media pipeline according to another embodiment of the present invention.

Unlike FIGS. 59 and 60 above, FIGS. 61 and 62 illustrate a handling procedure of the case in which the requested resource is a resource that is already acquired from a TV pipeline when a media pipeline makes a request for a resource.

Referring to FIG. 61, when a media pipeline 6119 requests a resource manager 6120 of the media server to allocate a resource, the resource manager 6120 may query whether resource conflict occurs to a policy manager 6150. As the determination result of the policy manager 6150, when resource conflict occurs, the policy manager 6150 of the media server may request a TV policy manager 6160 to release a resource in which conflict occurs. Upon receiving the resource release request from the policy manager 6150 of the media server, the TV policy manager 6160 may request the TV resource manager 6130 for a resource release session. The TV resource manager 6130 may transmit the resource release session request of the policy manager 6150 to the TV pipeline1 6140 and the TV pipeline1 6140 may request the TV resource manager 6130 to release a resource according to the transmitted resource release session request. The TV resource manager 6130 may re-request the resource manager 6120 of the media server to release the corresponding resource. Lastly, the resource manager 6120 of the media server may allocate the resource released by a TV service to a media pipeline 6110.

Although FIG. 62 is almost the same as FIG. 61 above, a policy manager 6250 of the media server requests a TV policy manager to release a resource in which conflict occurs, FIG. 62 illustrates the case in which the release is refused. In this case, the policy manager 6250 of the media server may transmit the release refusal to a resource manager 6220 of the media server and the resource manager 6220 of the media server may re-transmit information indicating that resource allocation is not possible to a media pipeline 6210.

Hereinafter, a digital device for handling a service or an application according to the present invention will be described in more detail with regard to various embodiment(s) of the present invention.

In particular, hereinafter, a service or an application includes a picture in picture (PIP) or PIP application provided by a digital device. Accordingly, hereinafter, a digital device for handling a PIP service or application and a handling method thereof will be described in detail with reference to the accompanying drawings.

Figure 63:
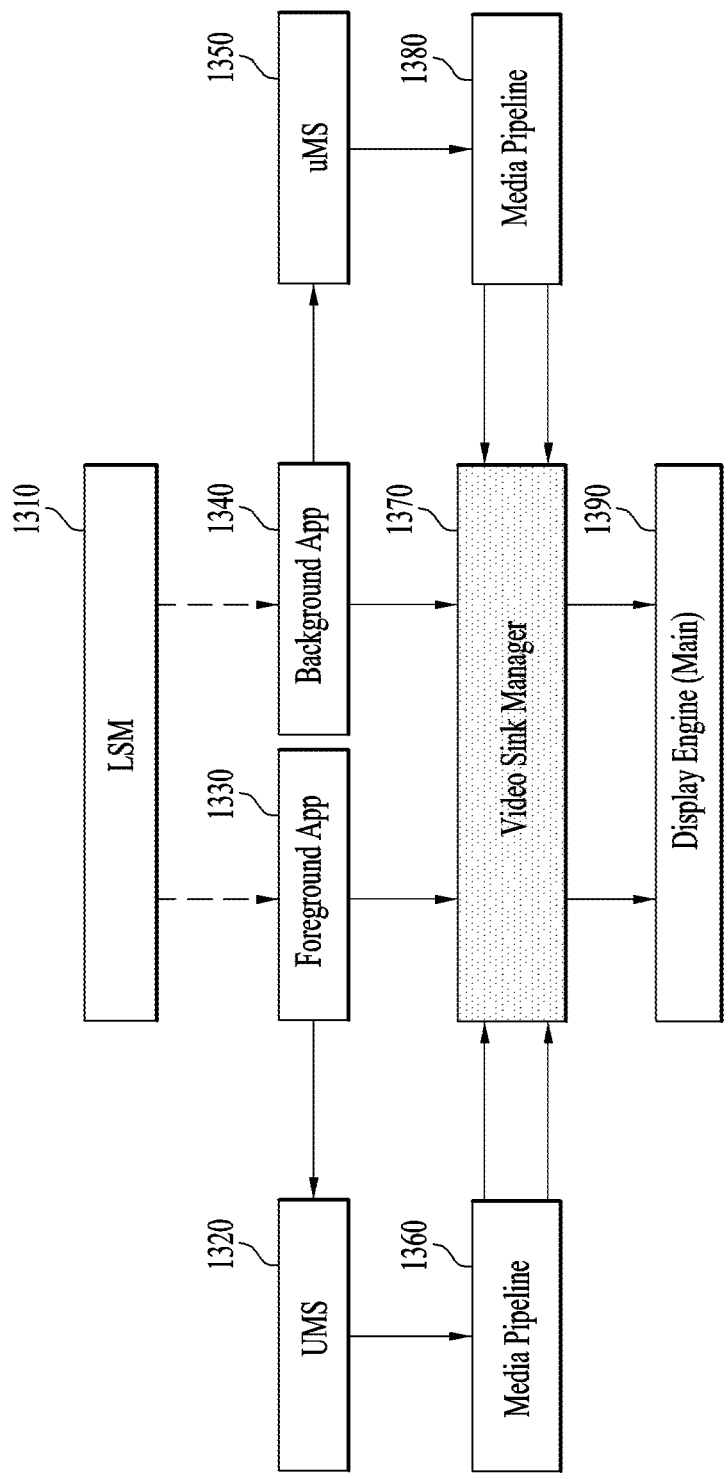
FIG. 63 is a diagram for explanation of a video sink manager (VSM) according to an embodiment of the present invention.

FIG. 63 is a diagram for explanation of a video sink manager (VSM) 6370 according to an embodiment of the present invention.

First, a single application may have a single window or multiple windows.

The VSM 6370 may recognize all video sources controlled by hardware of the digital device. This is because pipelines 6360 and 6380 register an identifier ID and a VDEC port in the VSM 6370. In addition, the VSM 6370 may provide a function for connecting each source to a display engine 6390 via an application. The display engine 6390 may have main and sub.

An application may have the foreground application 6330 and the background application 6340. The foreground may be mainly a full-screen and the background may be mainly minimized. Here, the main may refer to foreground or the sub may refer to background, or the converse may also be possible. An LSM 6310 may determine whether an application is the main. In addition, the LSM 6310 may transmit a lifecycle event via an application. The lifecycle event may include, for example, the foreground event and the background event.

The application may request the VSM 6370 to connect a video source to the display engine 6390. In particular, upon receiving the foreground event from the LSM 6310 having one video source, the foreground application 6330 may request the VSM 6370 to connect the video source to the display engine 6390. In addition, upon receiving the background event from the LSM 6310 having one video source, the background application 6340 may request the VSM 6370 not to connect the video source to the display engine 6390 or to disconnect the video source from the display engine 6390.

The foreground application 6330 may connect a video source to the display engine 6390 after loading a pipeline for displaying video. The background application 6340 may disconnect the video source from the display engine 6390 prior to unloading of a pipeline.

A video source, i.e., the pipeline 6360 may request the VSM 6370 to register a pipelineID having decoder information during loading. A video source (a pipeline) (the pipeline 6380) may request the VSM 6370 to unregister the pipelineID during unloading.

When the application is a web application, a Webkit, media plug-in, and flash plug-in may handle the connection or the disconnection instead of the application.

When the application has two or more input sources (pipelines), the application may be related to a PIP issue, which will be described in a corresponding part in more detail and will not be described here.

Each of the applications may request media servers 6320 and 6350 for load, play, pause, etc. of a video source and the media servers 6320 and 6350 may generate the media pipeline 6360 (the pipeline 6380) in response to the request.

Figure 64:
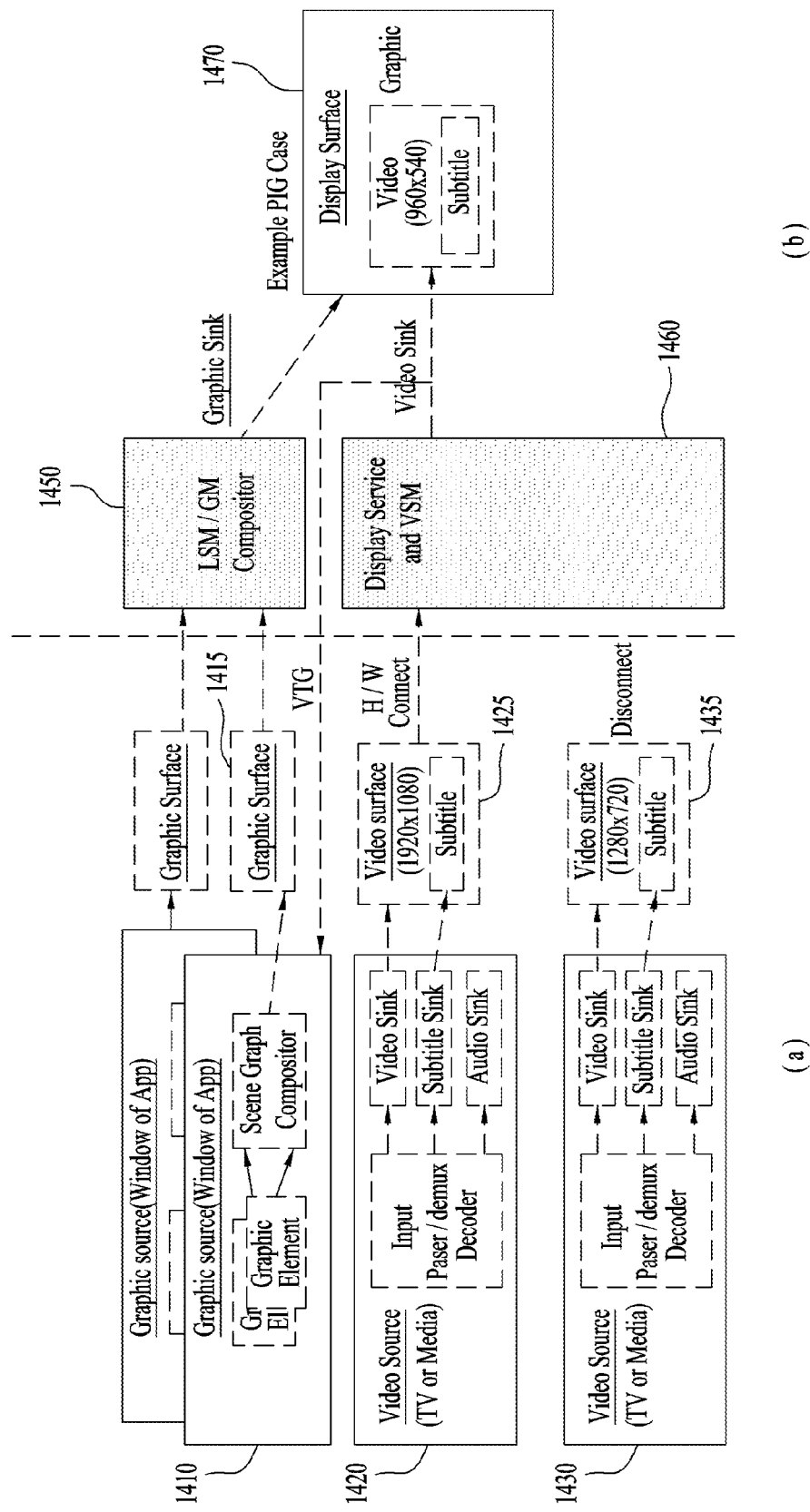
FIG. 64 is a diagram for explanation of a concept of a source and a sink in relation to video handling according to an embodiment of the present invention.

FIG. 64 is a diagram for explanation of a concept of a source and a sink in relation to video handling according to an embodiment of the present invention.

Here, FIG. 64*a* illustrates input stack and FIG. 64*b* illustrates rendering stack.

Basically, a video path may include a video source and a video sink. In addition, a graphic path may include a graphic source and a graphic sink.

A video surface from the video source and a graphic surface from the graphic source may be composed to a display surface via a video sink and a graphic sink.

The input stack of FIG. 64*a* may be used to control a video source and a graphic source and the rendering stack of FIG. 64*b* may be used to control a video sink and a graphic sink.

Referring to FIG. 64*a*, a controller of the input stack for the video source may be a media server (uMediaServer), a TV broadcast service, various media pipelines, or the like.

Referring to FIG. 64*b*, a controller of the rendering stack for the video sink may be a VSM, a TV display service, or the like.

Referring to FIG. 64*a*, a controller of the input stack for the graphic source may be a Webkit, a browser, and QT, that is, all allocations based on various graphic engines.

In addition, referring to FIG. 64*b*, controllers of the rendering stack for the graphic sink may be compositors of LSM and GM.

The VTG may be transmitted to the graphic source from the video sink and the subtitle may be controlled by the input stack. For example, a size, a position, etc. of the subtitle may be related to the video surface compared with the display service.

Figure 65:
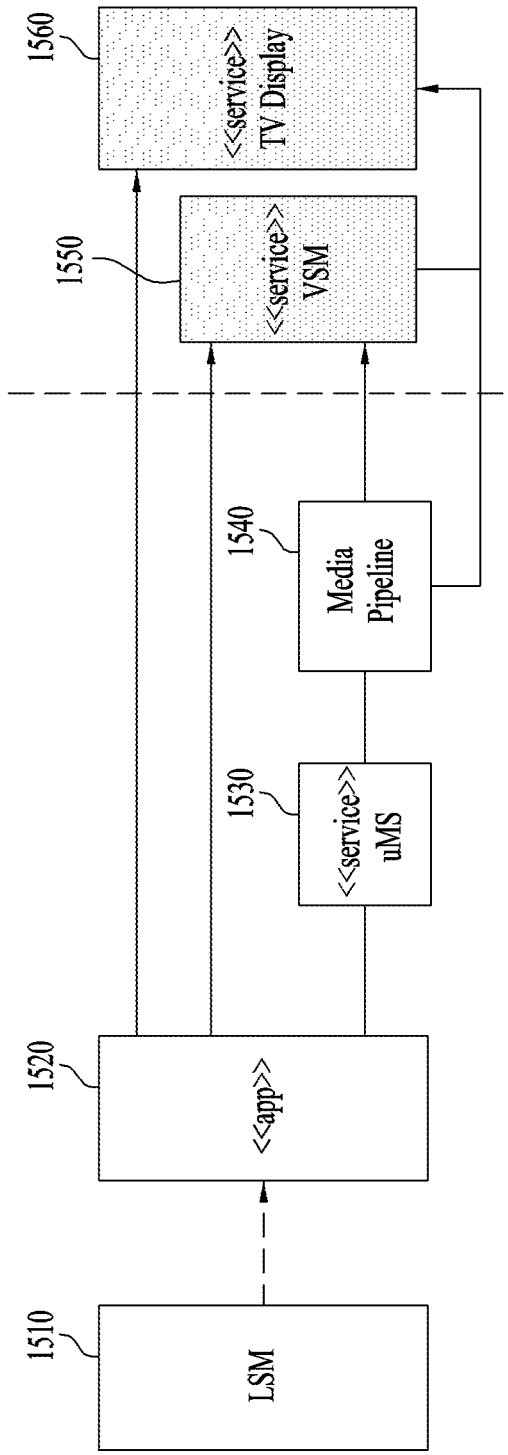
FIG. 65 is a diagram for explanation of the case in which input stack and video stack control video input according to an embodiment of the present invention.

FIG. 65 is a diagram for explanation of the case in which input stack and video stack control video input according to an embodiment of the present invention.

Here, FIG. 65*a* illustrates input stack and FIG. 65*b* illustrates rendering stack. The media server (uMediaServer) may delegate control requested by an application to a media pipeline. In particular, in the case of a web application, the application may be a Webkit (video tag), media plug-in, or flash plug-in.

Hereinafter, with reference to FIGS. 65*a* and 65*b*, a video control sequence will be described through the illustrated components.

First, a sequencer during pipeline loading will now be described.

An application 6520 may request a media server 6530 for pipeline loading with a URL. The media server 6530 may generate a media pipeline 6540 based on the request.

The media pipeline 6540 may a VSM 6550 to register a mediaID and a VDEC port after acquisition of the VDEC. A current state of the media pipeline 6540 may be a pause state and the media server 6530 may transmit load complete to the application 6520.

Upon receiving the load complete from the media server 6530, an application may request the VSM 6550 to connect the mediaID to a display engine 6560. The VSM 6550 may physically connect the VDEC port of the registered mediaID to the display engine 6560.

The application 6520 may request a display service to control the size and position of the display window. First, the size, position, etc. of the display window may be default pos {x, y, w, h}.

Then, the application 6520 may request the media server 6530 for pipeline play and, in this case, A/V may be stopped and muted.

The media pipeline 6540 may transmit video format information to the display service after play.

An additional sequence during a lifecycle of an application after pipeline loading will be described below, for example.

An LSM 6510 may transmit a lifecycle message about foreground or background to the application 6520.

Then, upon receiving foreground as the lifecycle message from the LSM 6510, the application 6520 may request the VSM 6550 to connect the mediaID to the display engine 6560. When the lifecycle message is in the background, the application 6520 may request the VSM 6550 to disconnect the mediaID from the display engine 6560.

When the application 6520 autonomously wants request, the application 6520 may request the display service to control a new size, a new position, etc. of the display window.

FIGS. 66 to 69 are diagrams for explanation of various scenarios of a web application according to an embodiment of the present invention.

First, with reference to FIG. 66, a sequence diagram of a scenario of loading a pipeline in the foreground application will be described.

An application 6610 having a video source may request a media server 6620 for pipeline loading through a Webkit 6612 having a vide tag.

The media server 6620 may generate a media pipeline 6622 according to the request and register a VDEC port for handling a mediaID and video source of the generated media pipeline 6622 in a VSM 6630.

The media server 6620 may receive the load complete message received through the media pipeline 6622 from the VSM 6630 and transmit the load complete message to the Webkit 6612.

The Webkit 6612 may request the VSM 6630 for connection with a display engine 6640 and the VSM 6630 may control to physically connect the application to the display engine 6640 since the application is in the foreground.

Then, as described above, the application 6610 may be connected to the display engine 6640 and, then, may request setting of a size, a position, etc. of a display window as necessary.

When the Webkit 6612 requests the media server 6620 for play, the media server 6620 may transmit the request to the generated media pipeline 6622 and the media pipeline 6622 may request the display engine 6640 for media video data setting based on the request so as to perform pipeline loading in the foreground application.

Hereinafter, with reference to FIG. 67, a sequence diagram of a scenario in which an application enters the background will be described.

As described above, an LSM needs to recognize a lifecycle message of an application. Accordingly, when an application needs to enter the background, the LSM may transmit minimized to an application, i.e., a Webkit.

As described above, upon receiving the minimized from the LSM, the Webkit may request the VSM for disconnection from a display engine based on the minimized. In addition, the Webkit may request the media server for pause simultaneously with or after the disconnection request. However, the pause request may be optional. When the Webkit requests the disconnection request or receives the pause request, the media server may request or command the generated media pipeline to change a state to pause from play.

Figure 66:
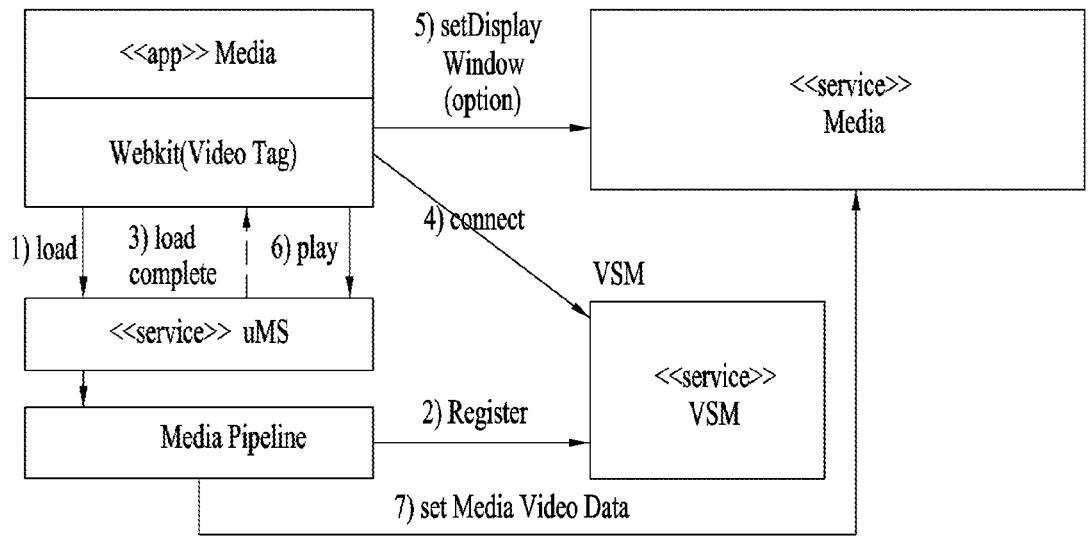
FIGS. 66 to 69 are diagrams for explanation of various scenarios of a web application according to an embodiment of the present invention.

Like in FIG. 66, when an application enters the background from the foreground, the aforementioned sequence may proceed.

Hereinafter, with reference to FIG. 68, a sequence of a scenario in which an application enters the background from the foreground in FIG. 67 and re-enters the foreground as illustrated in FIG. 66 will be described.

According to the scenario, that is, an LSM recognizes a lifecycle of an application and, thus, the LSM may transmit a full-screen instead of minimized to an application or a Webkit, as described above.

According to reception of the full-screen of the LSM, the Webkit may request the VSM for connection to the display engine. In addition, the Webkit may request the media server for play simultaneously with or after the connection request. However, the play request may be optional. When the Webkit makes a request for connection or receives the play request, the media server may request or command a media pipeline to change a state to play from pause.

Figure 67:
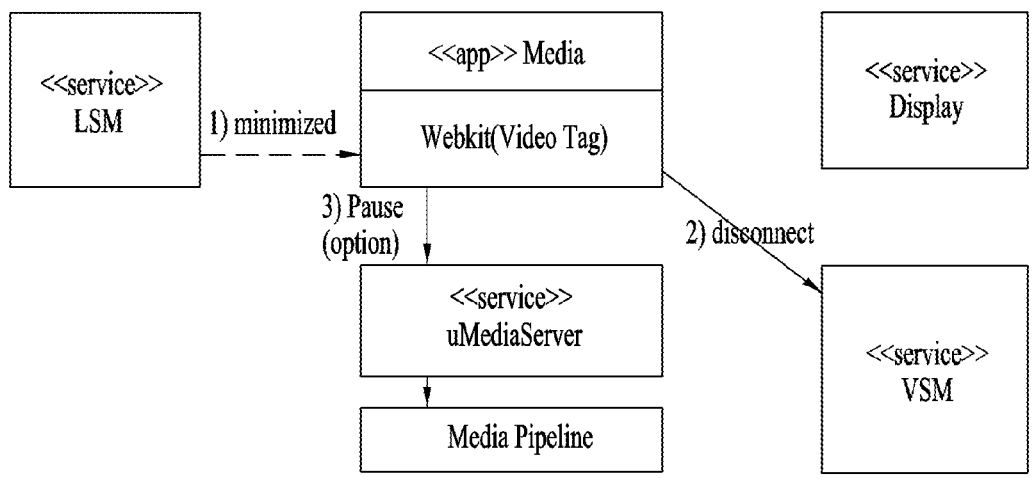
Figure 68:
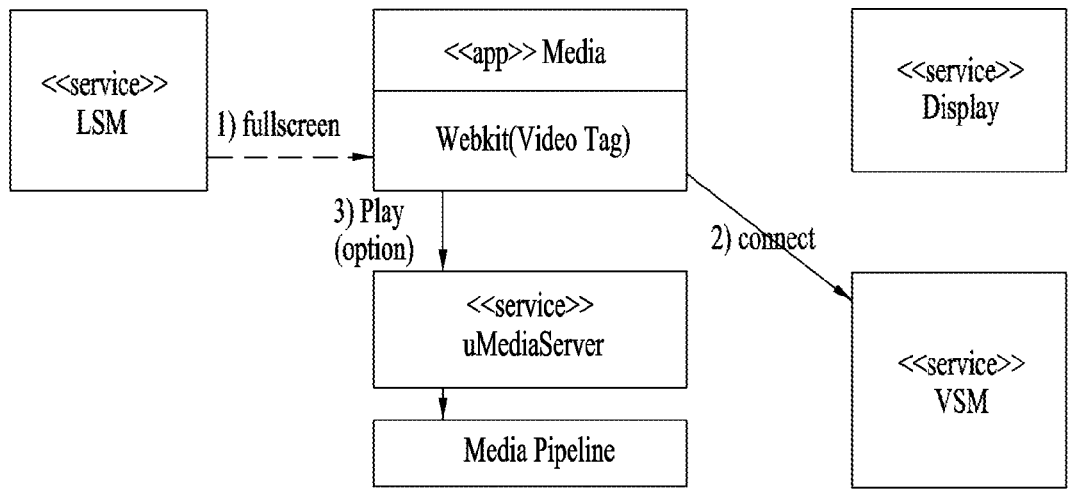

When an application is in the foreground in FIG. 66 above, enters the background in FIG. 67 above and then re-enters the foreground like in FIG. 68, the aforementioned sequence may proceed.

Figure 69:
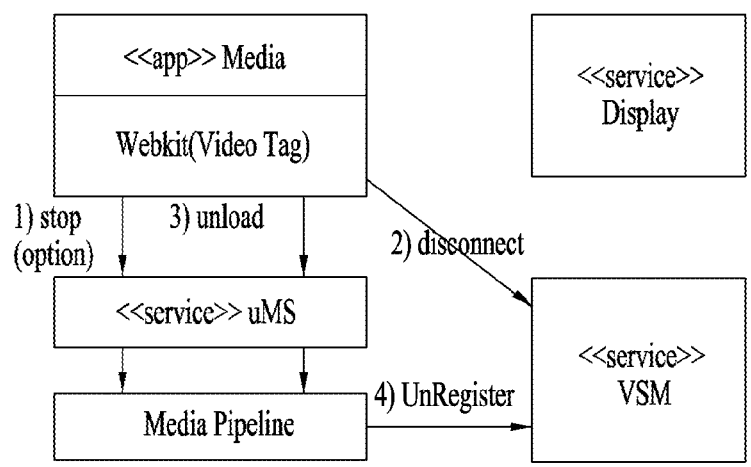

Lastly, with reference to FIG. 69, a scenario of unloading a pipeline in the foreground application will be described subsequent to FIGS. 66 to 68.

An application and a Webkit may request a media server for stop and request a VSM for disconnection from a display engine. In this case, the stop request may be alternative or optional according to, for example, the disconnection request. In the above case, upon receiving the stop request, the media server may request or command a media pipeline to change a state to stop from play.

The Webkit may request the media server for unloading simultaneously with or after the disconnection request. Upon receiving the unloading request, the media server may transmit the unloading request to the media pipeline, and upon receiving the unloading request, the media pipeline may request the VSM for unregister.

Unloading of a pipeline in the foreground application may be performed through the aforementioned procedure.

FIGS. 66 to 69 above illustrate a scenario of a lifecycle of an application of, for example, loading a pipeline in the foreground, returning to the background, re-entering the foreground and, then, lastly unloading a pipeline. Although the aforementioned scenario has been described in a time sequence to aid in understanding of the present invention and for convenience of description in the present specification, the above procedure may be changed according to a lifecycle of an application and features may be obviously understood or derived although not illustrated or described here.

Figure 70:
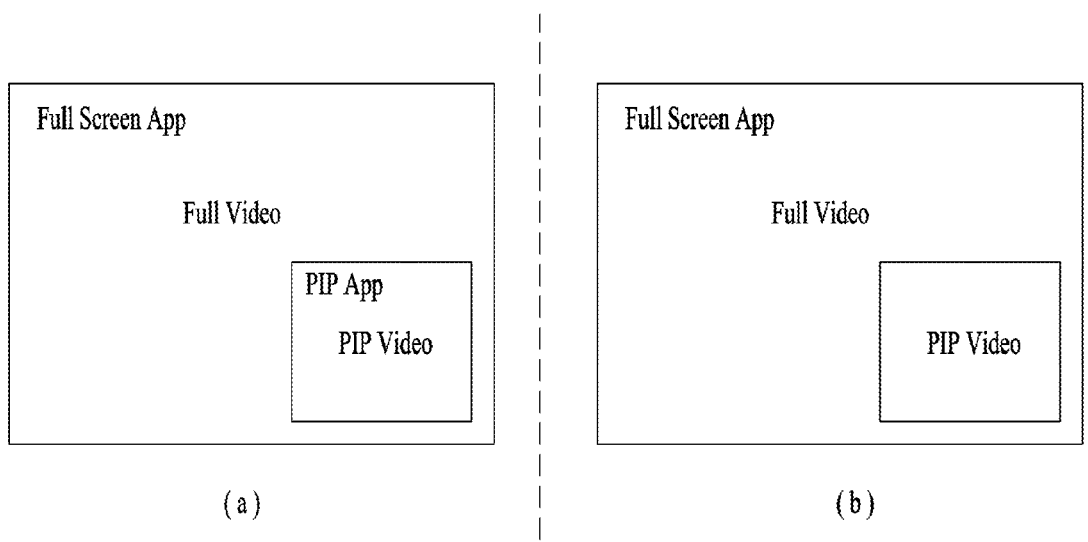
FIG. 70 is a diagram for explanation of an issue in terms of PIP according to an embodiment of the present invention.

FIG. 70 is a diagram for explanation of an issue in terms of PIP according to an embodiment of the present invention.

FIG. 70 illustrates a main sink and a sub sink of a digital device. Here, concepts of the main and the sub may be, for example, conceptual and may be mapped to any portions of hardware block. The hardware block may be changed according to each SoC.

As described above, a VSM may provide an interface for connection of a video source and the main sink or the sub sink. In general, the main sink may have more powerful performance than the sub sink and only the main sink may support full picture quality.

When one video source is present in a display, that is, in the case of a single video source, the main sink may be used. In this case, it may be sufficient that a size of the video source is or is not a full size.

However, in the case of two or more video sources, all of the video sources cannot be output on a display using only a main sink like in the above case of a single source. In other words, in the case of two or more video sources, a sub sink may also be used. This may be referred to as, for example, a PIP scenario or a PIP issue, which will be described below.

In general, in a PIP scenario, a main sink may be used for a large size on a display and a service sink may be used for a small size, but the present invention is not limited thereto. For example, when two or more video sources have the same size on a display, any one of the two sinks may be a main sink according to UX.

Although the present invention has been described above in terms of a video source, the present invention may be described in terms of an application. For example, an application may have one video source or, alternatively, have a plurality of video sources. Accordingly, in the latter case, the PIP scenario may be applied in the same way.

Accordingly, in relation to the present invention, the PIP scenario may have the following scenarios.

First, two applications are in the foreground and have respective video sources on a display.

Second, a single application has two video sources on a display. When the single application has two or more pipelines, one of these may be unloaded by a resource manager or a policy manager.

Third, two applications having two video sources are present on a display.

However, although the above embodiments have been described in present specification, a PIP scenario for supporting various scenarios that are generated on a display relation to an application, a video source, a menu, or the like is not limited thereto.

In this regard, FIG. 70*a* illustrates the first scenario among the aforementioned PIP scenarios and, in this case, two applications are in the foreground, a full-screen application provides full-video, and a PIP application provides PIP video. Here, a portion from which the PIP video is output may be referred to as a PIP screen, a sub screen, etc. On the other hand, a portion for providing the full-video may be referred to as a full-screen, a main screen, etc.

FIG. 70*b* illustrates the second scenario among the aforementioned PIP scenarios and, in this case, one application has two video sources, a first video source of the two video sources is provided as full-video, and a second video source is provided as PIP video.

Figure 71:
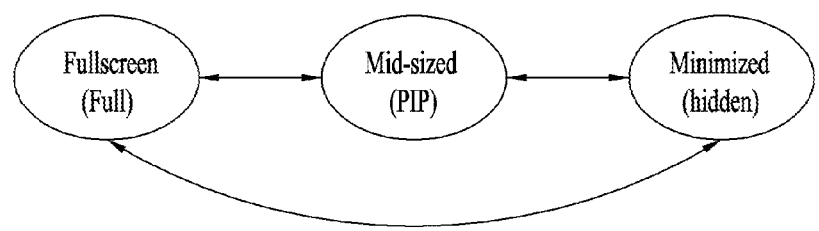
FIG. 71 is a diagram for explanation of a PIP scenario when two applications are in the foreground.

FIG. 71 is a diagram for explanation of a PIP scenario when two applications are in the foreground as illustrated in FIG. 70*a*, and FIGS. 72 to 75 are diagrams for explanation of a PIP sequence on a web application according to an embodiment of the present invention.

Referring to FIG. 71, it is assumed that both two applications are in the foreground and each application has at least one video source and, in this case, a PIP issue occurs as described above.

In this regard, an LSM may support at least two foreground applications and, in this case, the LSM may recognize whether an application is in the foreground and may also recognize the foreground application that is a full-screen and an application that is a PIP screen. For example, when there are two foreground applications, a first application may be a full-screen application and a second foreground application may be a PIP application.

Accordingly, a video source of the full-screen application may be connected to a main sink and a video source of the PIP screen may be connected to a sub sink.

The LSM may support two types of window lifecycle messages, one may be a full-screen for the foreground, and the other may be minimized for the background. However, as described above, when both the two applications are in the foreground, the two applications may receive a full-screen message based on the above type of window lifecycle message. Accordingly, in this case, a full-screen application and a PIP application of the two foreground applications cannot be differentiated using only the window lifecycle message.

Accordingly, as illustrated in FIG. 71, a type of a window lifecycle is defined as a full-screen, a mid-size, and minimized.

Here, the full-screen type message may be transmitted to an application for a full screen. The mid-sized type message may be transmitted to an application for a PIP. In addition, the mini-minimized type may be transmitted to an application for the background. Here, the mid-size, etc. may be arbitrary terms and other terms for PIP may also be used. Accordingly, the present invention is not limited to the aforementioned terms.

Although not illustrated, as a window lifecycle type, focus and unfocus states may also be defined in the foreground.

In this regard, with reference to FIG. 63, the PIP issue will now be described in more detail.

However, in FIG. 63, the background application may be changed to a PIP application and a minimized message transmitted from the LSM may be changed to a mid-sized message. In other words, in the foreground application and the background application described with reference to FIG. 63, only a full-screen application and a PIP application may be changed. Accordingly, the aforementioned repeated description of FIG. 63 is reused and a detailed description of FIG. 63 is not given and will be given in terms of a difference.

When an application a mid-sized message from the LSM, it may be seen that the corresponding application is a PIP application. Accordingly, the PIP application may request the VSM to connect a video source to a sub sink. This is different from in FIG. 63 above in that the background application makes a request for disconnection in FIG. 63. This is because the background application is not necessarily output to a screen but a PIP application is output to the screen.

On the other hand, when an application receives a full-screen message from the LSM, it may be seen that the corresponding application is a full-screen application. Accordingly, the full-screen application may request the VSM to connect the video source to main. This may be similar to the aforementioned operation of the foreground application.

When an application receives a minimized message, the corresponding application may be the background and may request the VSM to disconnect the video source from the main or the sub, which is similar to the operation of the background application described with reference to FIG. 63.

Here, in the case of a PIP application, there is a problem in terms of video scaling, which may also be one of PIP issues. This is because the PIP application cannot recognize a size and position to be output in a screen by the PIP application. This is because only the LSM recognizes an absolute coordinate of a PIP application on a display.

Accordingly, in order to overcome this problem, there may be a method in which the LSM makes a request for resize for a sub sink via a display service or a method in which the LSM transmits size and position information together during transmission of a mid-sized message to an application and the application directly makes a request for resize for a sub sink via the display service.

Hereinafter, with reference to FIGS. 72 to 75, a PIP sequence diagram in a web application when two applications are in the foreground will be described in detail.

Figure 72:
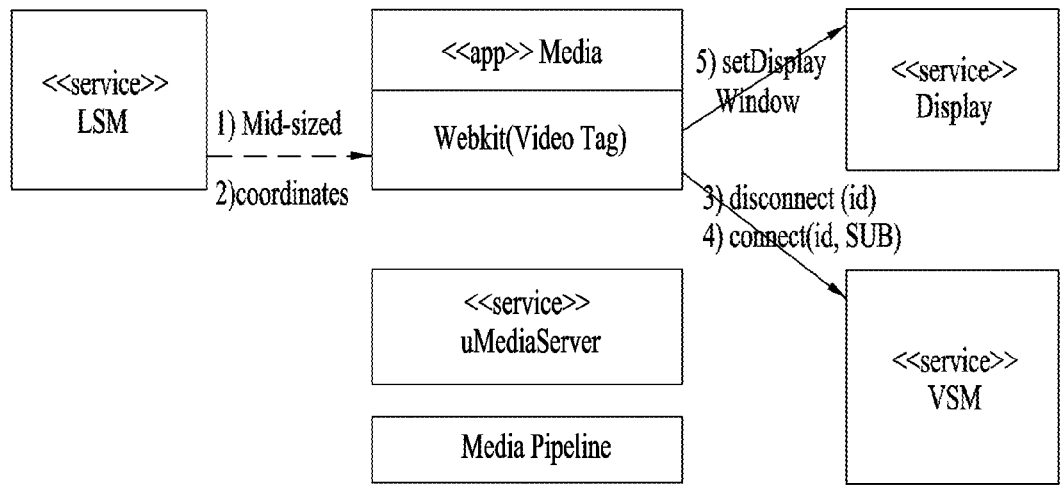
FIGS. 72 to 75 are diagrams for explanation of a PIP sequence on a web application according to an embodiment of the present invention.

Referring to FIG. 72, the LSM may recognize a lifecycle message of an application. Accordingly, when an application needs to enter PIP, the LSM may transmit a mid-sized message to a PIP application, i.e., a Webkit and, as described above, may transmit coordinate information on a size and a position in a display of the PIP application to the Webkit.

Upon receiving the mid-sized message and the coordinate information from the LSM as described above, the Webkit may request the VSM for disconnection from a main sink of a display engine based on the mid-sized message including a mediaID. In this case, the Webkit may make a request for connection with the sub sink of the display engine containing the mediaID along with the request for disconnection.

The Webkit may transmit the received coordinate information to the sub sink of the media display engine and request setting simultaneously with or after the disconnection and connection request.

An application is in the foreground but when the application becomes a PIP application, the aforementioned sequence may proceed.

Figure 73:
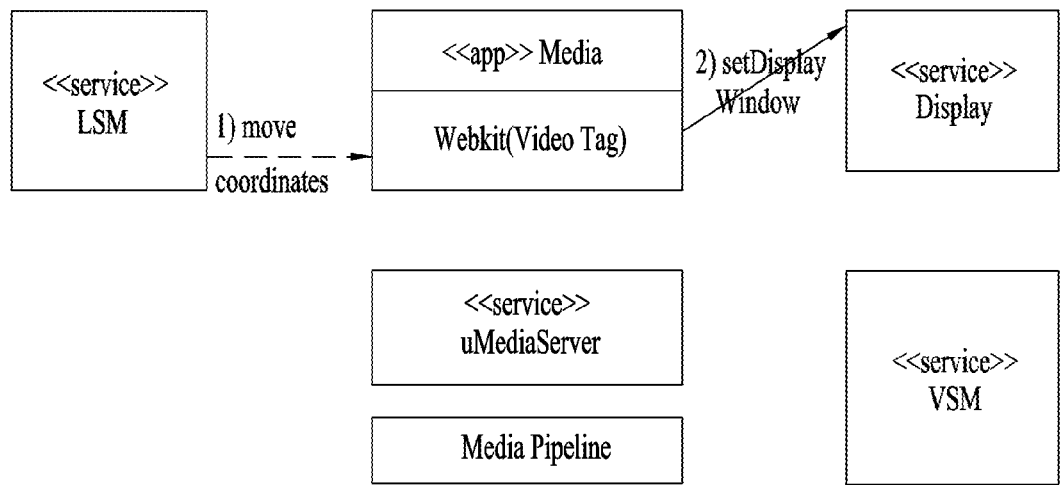

FIG. 73 illustrates a PIP sequence when a PIP screen is moved after the PIP screen is generated or output, as illustrated in FIG. 72, for example.

Although a PIP screen is always fixed as described above, the PIP screen may be moved in a display.

Hereinafter, a sequence for the above case will be described.

As described above, in this case, a PIP application cannot still recognize whether a video size and position are changed. Accordingly, for handling this, the LSM may re-transmit the changed coordinate the moved PIP screen to a Webkit, forward the changed coordinate received by the Webkit to a sub of a display engine, and make a request for coordinate change setting.

Figure 74:
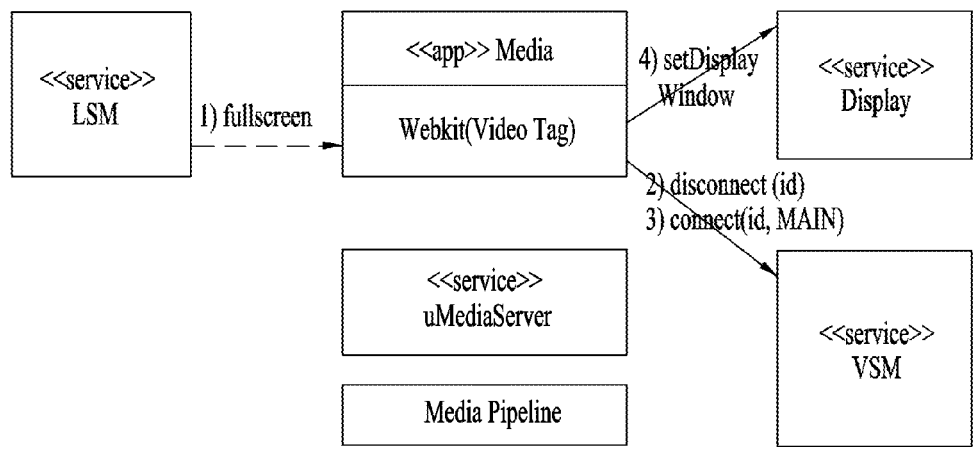

Hereinafter, with reference to FIG. 74, a sequence for the case in which a PIP application becomes, for example, a full-screen will be described.

The PIP application does not recognize whether the PIP application is changed to a full-screen from a PIP and, thus, when the LSM transmits a full-screen message (lifecycle message), the PIP application recognize that the PIP becomes a full-screen application.

Upon receiving the full-screen message, the Webkit may transmit a mediaID to the VSM, make a request for disconnection from a display engine (sub), and make a request for connection with a display engine (main) using the mediaID.

Even if there no coordinate information of the LSM, the Webkit is a full-screen and, thus, the Webkit may directly request the display engine (main) for setting of a display window.

Figure 75:
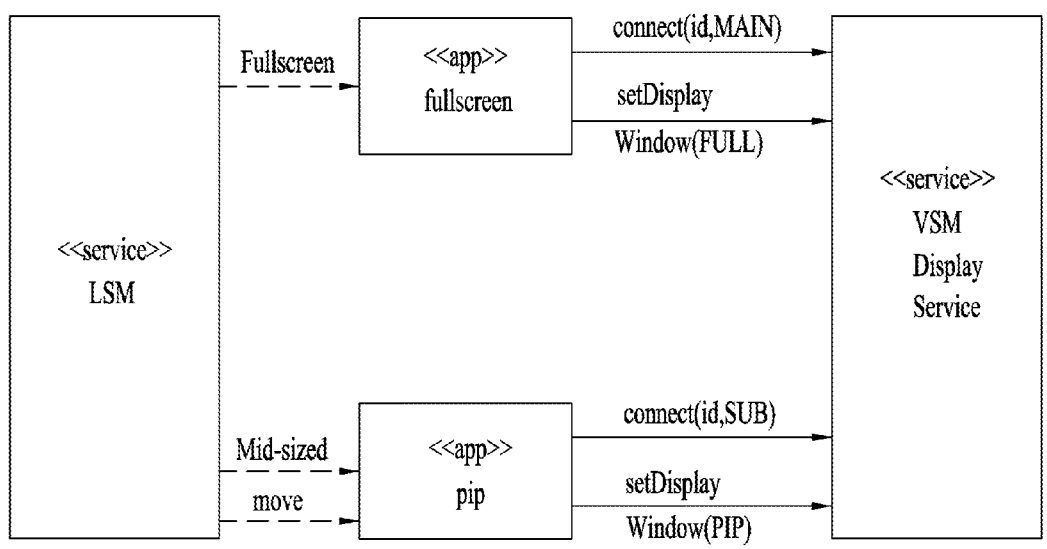
Figure 78:
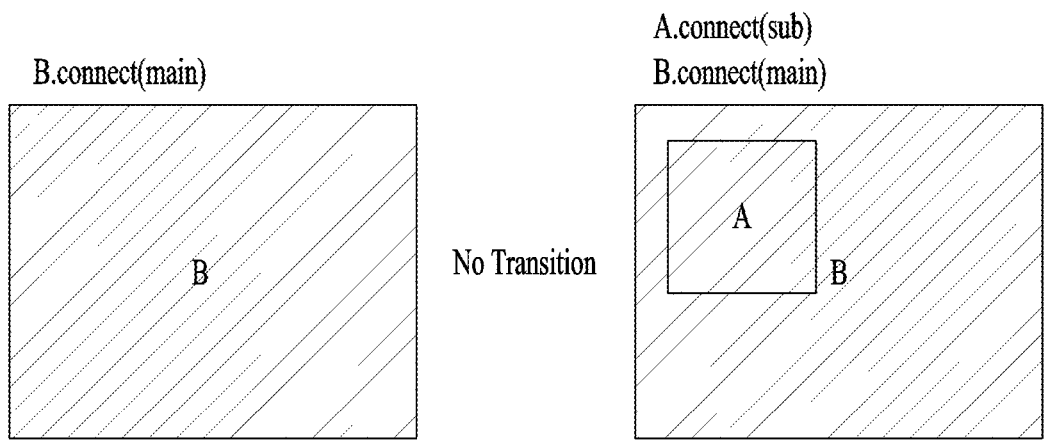
Figure 79:
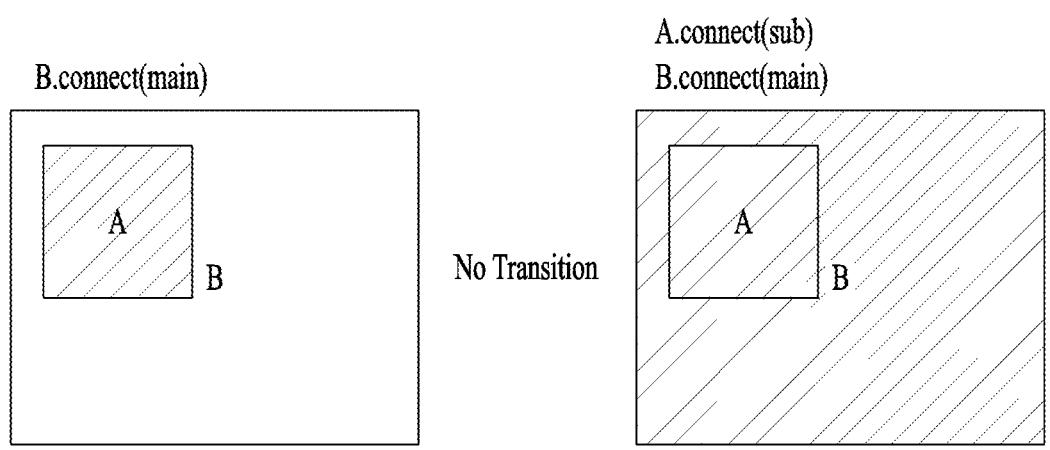
Figure 80:
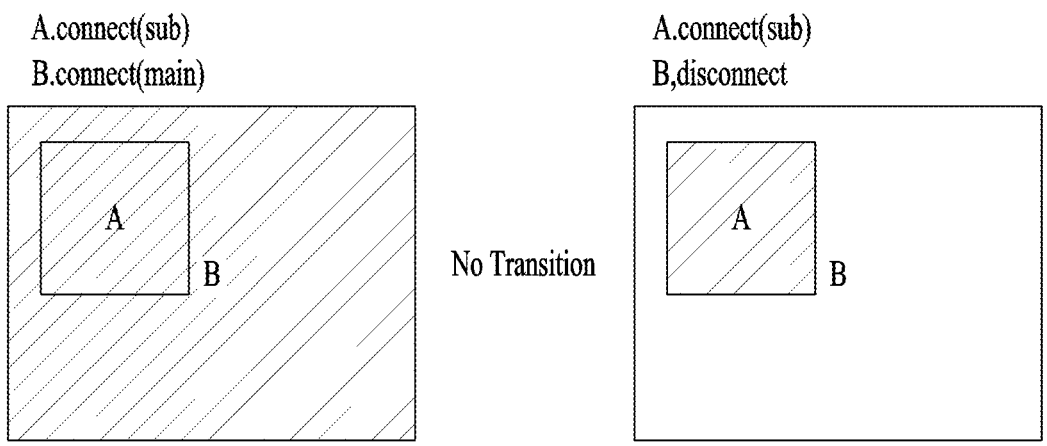
Figure 81:
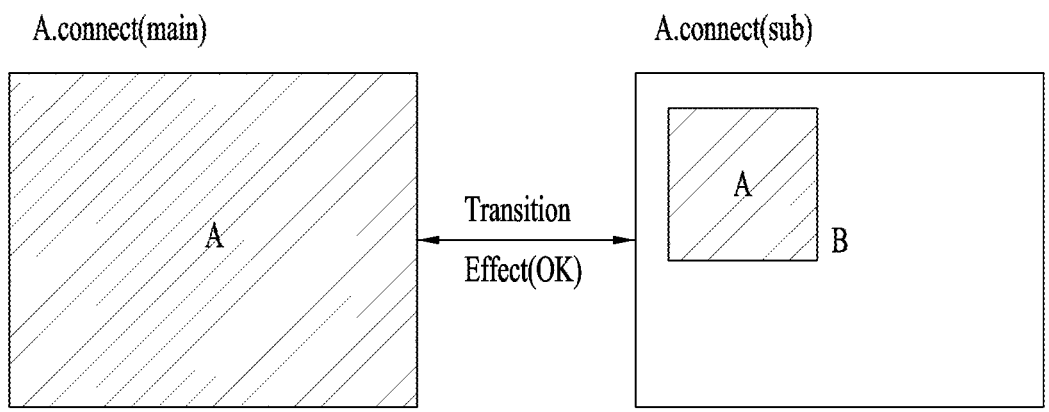
Figure 82:
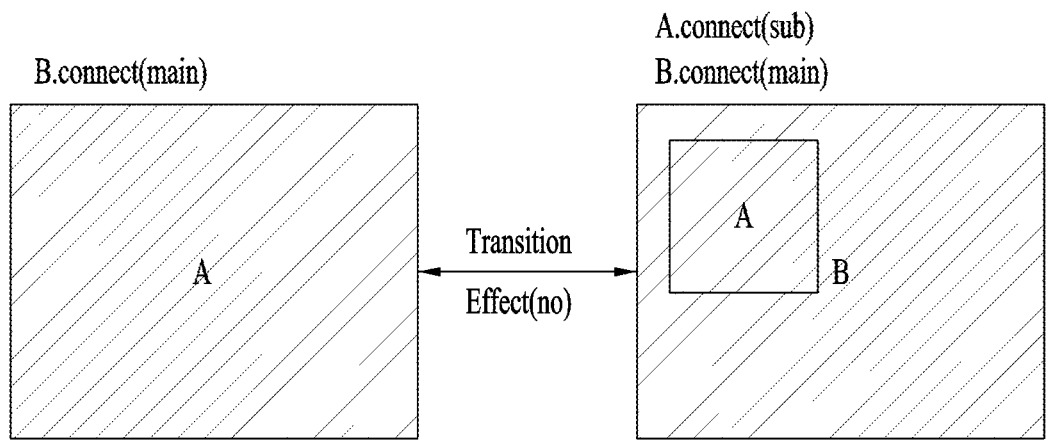
Figure 83:
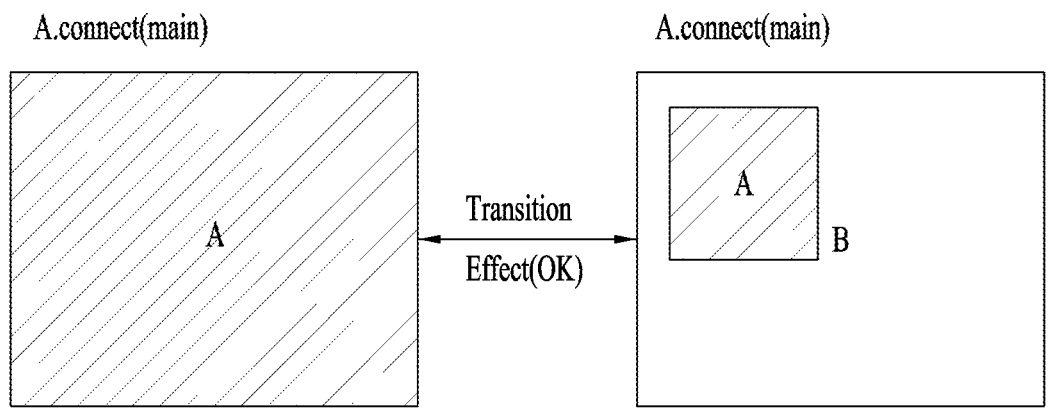

With reference to FIG. 75, a PIP sequence of a full-screen application and a PIP application when there are two foreground applications will now described below.

Although a media server or a media pipeline has not been separately described in the above PIP sequence, the media server or the media pipeline may perform the same function as in FIGS. 66 to 69 above as necessary.

As illustrated in FIG. 75, a LSM, a VSM, and a display engine may be mainly used in the PIP issue.

FIG. 76 is a diagram for explanation of audio handling when there is a PIP issue according to an embodiment of the present invention.

FIG. 76a illustrates handling when one media and one ringtone are present in general.

In other words, when there are one media pipeline and one ringtone pipeline, an audio processor (AudioD, DASS and PusleAudio) may perform control to output the media pipeline to a speaker and to output the ringtone pipeline to a headset.

As illustrated in FIG. 76a, when there are one media and one ringtone, it is general to perform handling as described above. However, like the PIP issue of the present invention, when both two applications are in the foreground and have a video source, that is, when there are two media pipelines, a handling method may be an issue. For example, one media pipeline may be HDMI and the other one may be broadcast.

FIG. 76b illustrates audio handling in the PIP issue.

In general, an outputter of an audio processor may be determined according to an audio type. In this regard, when the PIP issue of the present invention occurs, audio types of the two foreground application may be the same. In other words, it may be difficult to determine an outputter of an audio processor based on only an audio type.

Accordingly, simply, as illustrated in FIG. 76b, a first media pipeline may be controlled to be output through a speaker by the audio processor and a second media pipeline may be controlled to be output through a headset by the audio processor.

However, this may be exception handling that is against a policy of a basic audio processor. In other words, the audio processor may basically determine an audio outputter based on an audio type. In this regard, according to the present invention, when there is the PIP issue, the audio outputter cannot be determined based on the audio type.

In this case, most simply, as illustrated in FIG. 76b, a full-screen application may be controlled to be output through a speaker and a PIP screen application may be controlled to be output through a headset, but the aforementioned audio processor needs to be newly defined. In other words, when there is the PIP issue, an audio processor needs to be used.

Although the media pipeline is generated, a PIP screen application may not be output and may be output as main through a speaker.

FIGS. 77 to 83 are diagrams for explanation of a PIP window transition for video according to an embodiment of the present invention. Here, a size or position of a PIP window is illustrated as an arbitrary size and an arbitrary position to aid in understanding of the present invention and for convenience of description of the applicant and are not limited thereto.

In FIG. 77a, an application A of two applications may include a video source but an application B may not include a video source. Here, the application B may be present in the foreground and output as a full-screen and the application A may include a video source but may be present in the background to be minimized.

In FIG. 77b, in the window of FIG. 77a, the application A is connected to a sub sink of a display engine and a video source is input through a PIP window on a screen in which the foreground application, i.e., the application B is output as a full-screen. However, in this case, according to change to FIG. 77b from FIG. 77a, window transition may not occur.

FIG. 78a illustrates the case in which both of two applications, i.e., the application A and the application B include a video source. However, the application B may be a full-screen and is connected to main of a display engine but the application A may be minimized to the background and may be disconnected from a display engine.

In FIG. 78b, an application having two video sources may be executed as the application becomes the foreground via PIP in FIG. 78a above. However, the application B is connected to main of a display engine and, thus, although the application A is present in the foreground, the application A may receive a mid-sized message via PIP, may be connected to sub of a display engine, and may output a video source of the application A through a PIP window.

In the case of FIGS. 78a and 78b, window transition may not occur.

In FIG. 79a, two applications are in the foreground, the application A includes a video source and is connected to sub of a display engine according to a mid-sized message of the LSM to be output to the PIP window, and the application B may not include a video source and may be a full-screen. However, in this case, although the application B does not include a video source and is a full-screen, the application B may not be connected to main of the display engine and may be in a disconnection state.

Like in FIG. 79b, in FIG. 79a, when the application B has a video source or a new application B including a video source is executed, the application B may receive a full-screen message and may be connected to main of a display engine through the VSM.

However, window transition may not occur either.

In FIG. 80a, two applications including a video source, that is, the application A may receive a mid-sized message from the LSM and is connected to sub of a display engine through the VSM to be output to a PIP window and the application B may receive a full-screen message from the LSM and may be connected to main of the display engine through the VSM to be output to a full-screen.

In FIG. 80b, when a video source of the application B is terminated or a new application B without a video source is present in the foreground oppositely to FIG. 79b above, the application B may be disconnected from main of the display engine that has been pre-connected through the VSM. However, in this case, window transition may not occur either and the application A may be continuously output through the PIP window.

In FIG. 81a, the application A may include a video source and may be output to a full-screen, and the application B may not include a video source and may be executed in the background according to a minimized message.

In FIG. 81b, the application B may receive a full-screen message and may be present in the foreground in FIG. 81a above, and the application A may output a video source through a full-screen in FIG. 81a but may receive a mid-sized message from the LSM, may be disconnected from main of the display engine that has been pre-connected through the VSM and may be re-connected to sub to be output through a PIP window.

In this case, in FIG. 81b, a window transition effect occurs from FIG. 81a.

In FIG. 82a, among two applications including a video source, the application A may be connected to main of a display engine in the foreground to be output to a full-screen and the application B may be present in the background according to a minimized message and may be disconnected from the display engine.

In FIG. 82b, the application B that has been executed in the background in FIG. 82a may receive a full-screen message from the LSM and may be connected to main of the display engine through the VSM to be output to a full-screen and, accordingly, the application A may be disconnected from main of the pre-connected display engine but may receive a mid-sized message from the LSM and may be connected to sub but not the main of the display engine through the VSM to be output through the PIP window. In this case, unlike in FIG. 81, although the application A is output to a full-screen in FIG. 81a and then is output to a PIP screen of FIG. 81b, a window transition effect may not occur.

Lastly, in FIG. 83a, when the application A includes a video source and is connected to main of the display engine as a full-screen, the application B is output to a full-screen while being present in the foreground like in FIG. 83b but the application B does not include a video source and, thus, when the application is output to a PIP window according to a mid-sized message but the application A and is continuously connected to main of the display engine rather than being disconnected from the main because the application B does not include a video source despite the mid-sized message, a transition effect may occur.

Figures 84, 85:
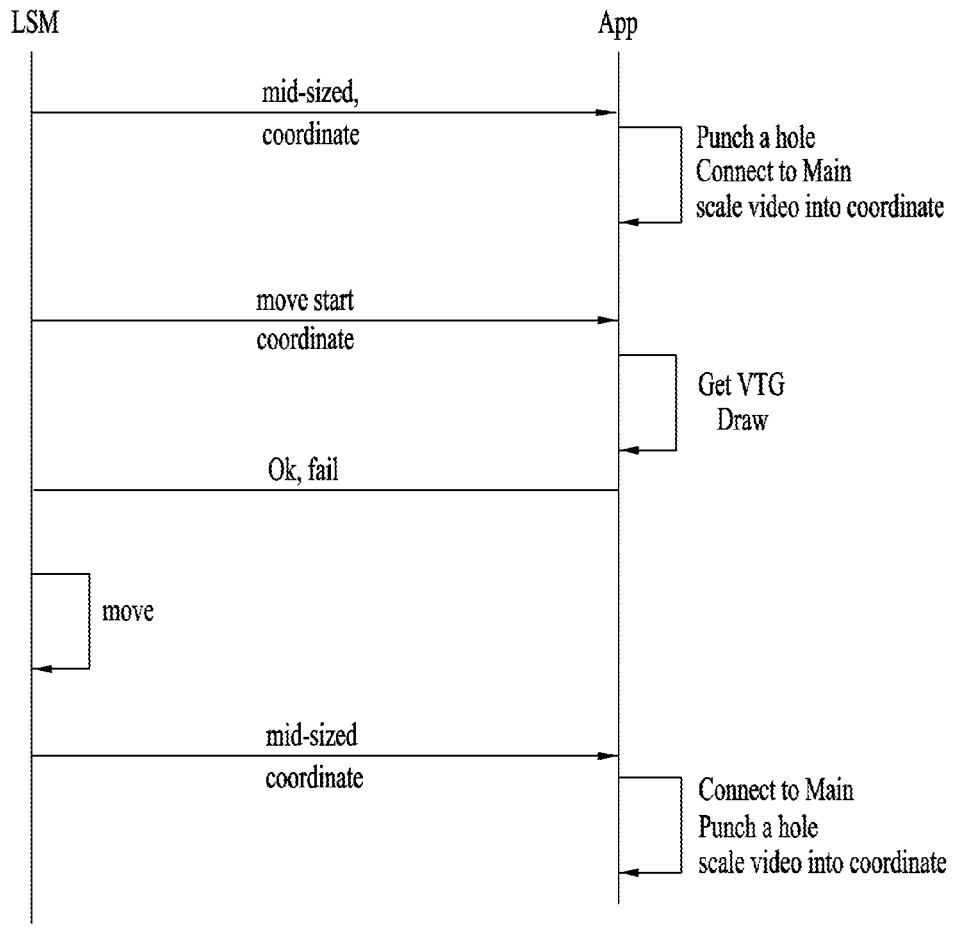

FIG. 84 is a flowchart for explanation of a PIP window transition procedure according to an embodiment of the present invention.

An LSM may transmit a mid-sized message and coordinate information on a size, position, etc. of a PIP window to an application (S8402).

The application that receives the mid-sized message and the coordinate information may punch a hole, may be connected to sub of a display engine, and may scale a video source to the connected sub of the display engine according to the coordinate (S8404).

Then, when the LSM transmits a move start message and move coordinate information to the application (S8406), the application may acquire and draw VTG (S8408).

The application responds to whether movement is ok or fail to the LSM (S8410), if the response is ok, the LSM may perform movement (S8412) and re-transmit the mid-sized message and moved coordinate information to the application according to the movement (S8414).

The application may transmit coordinate information to the sub of the display engine according to the message of the LSM and scale a video source based on the coordinate information (S8416).

FIG. 85 is a diagram for explanation of a movement scenario of a PIP window transition procedure according to an embodiment of the present invention.

First, priority of the VTG may be lower than, for example, sub video.

With reference to FIG. 85, a movement scenario will now be described. When only single video, i.e., main video is present, if a full-screen is moved to a PIP screen, a transition effect may be generated using VTG. In addition, in an opposite case, that is, when a PIP screen is moved to a full-screen, a transition effect may also be generated using VTG.

However, when double video, i.e., both of main and sub are present, a full-screen is moved to a PIP screen or in an opposite case, a transition effect using VTG may not be generated. However, in this case, each video may be connected to a sub sink of a display engine only for the PIP screen.

Hereinafter, a UX/UI scenario of adjusting a position and size of a PIP or app on app through an input device will be described with regard to an embodiment of the present invention.

Figure 86:
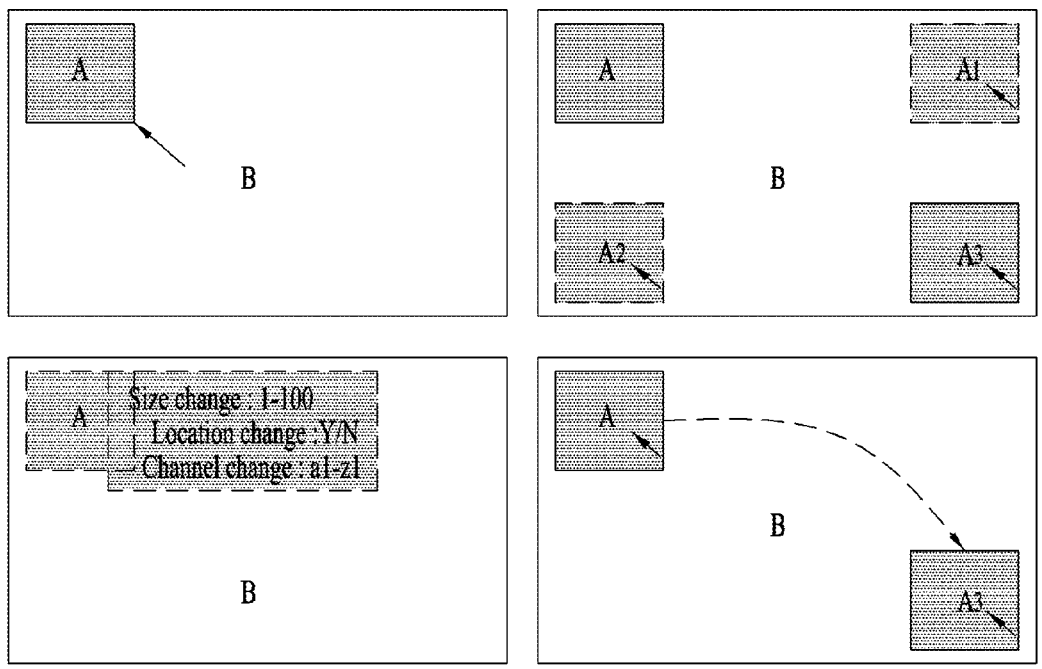
FIGS. 86 to 88 are diagrams for explanation of a scenario of controlling a PIP window according to embodiments of the present invention.
Figure 87:
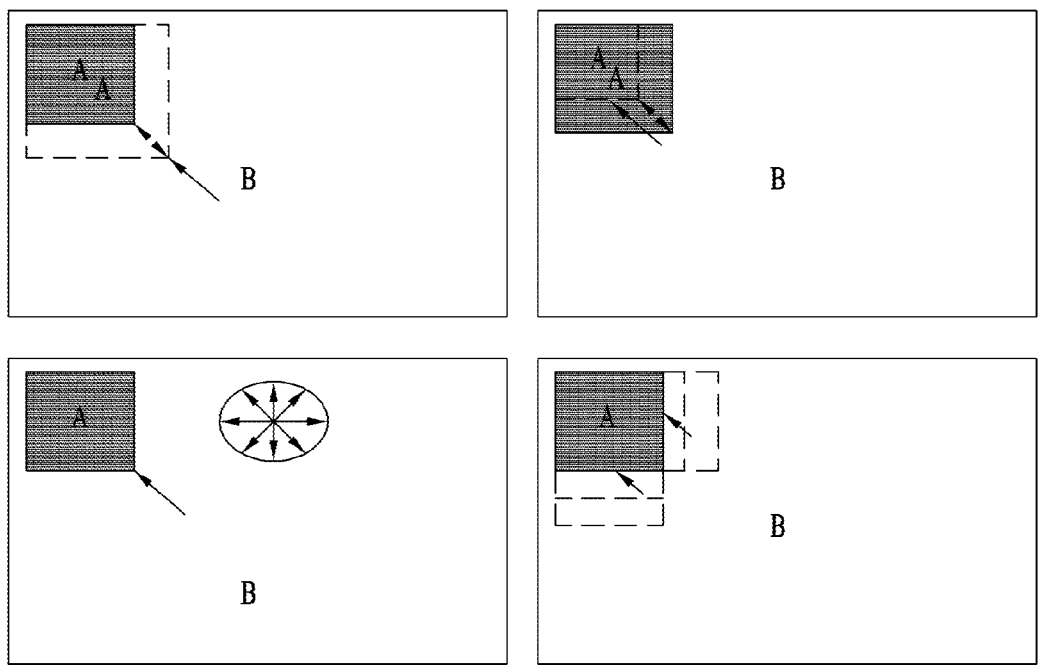
Figure 88:
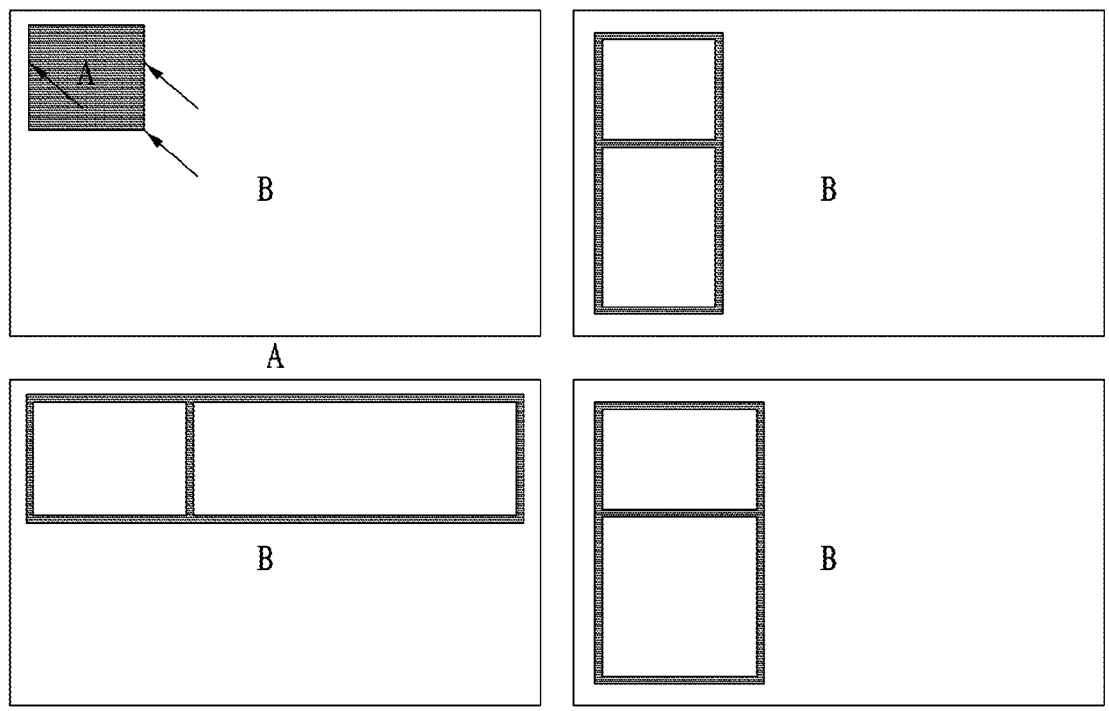

FIGS. 86 to 88 are diagrams for explanation of a scenario of controlling a PIP window according to embodiments of the present invention.

In FIG. 86a, a main image and a PIP image may be simultaneously output on a screen of a digital device. Here, when a user inputs a control command about the PIP screen through an input device such as a remote controller, the digital device may control the PIP screen according to the control command.

For example, as illustrated in FIG. 86a, when a cursor 3610 is positioned in a boundary region of a PIP screen 8620, the digital device may recognize user intention as control of the PIP screen 8620 and provide a control GUI including various information items related to the control.

For example, referring to FIG. 86b, when a cursor is positioned in a boundary region of a PIP screen as illustrated in FIG. 86a, moveable regions A1, A2, and A3 of the PIP screen may be provided in the form of dotted lines. Here, when the user moves the cursor to any one of the regions A1 to A3, the digital device may move a pre-output PIP screen to a corresponding region and, continuously, may provide the PIP screen.

As illustrated in FIG. 86c, the digital device may provide a control menu GUI 8650. Here, the control menu GUI 8650 may output items such as size change 1-100, position change Y/N, and channel change a1-z1. Although not illustrated, the control menu GUI 8650 may provide the same menu items as the case in which a menu is called in a predetermined of a main screen. In the above case, when size change is requested, a degree of a current size may be displayed and an adjustment key for adjusting the displayed sized may be provided. In this case, when the user inputs a number corresponding to a size through a number adjusting key, the input may be immediately applied such that the user is intuitively recognize size change of the PIP screen according to size change. When the cursor is positioned in a boundary region of the PIP screen, the PIP screen is changed through FIG. 86c or directly to a state in which a size is adjustable while being highlighted and the size may be adjusted like in FIG. 87a or 87b. In addition, in the above case, when yes (y) is selected from the position change item, information on a changeable region may be provided as illustrated in FIG. 86b or a cursor may be changed so as to change the position of the PIP screen in the form of drag&drop to a region in a screen as illustrated in FIG. 86d. Although not illustrated, when the channel change item is selected, a channel item may be provided to be scrollable or a small size of EPG screen may be provided to another layer and may be immediately changed to a corresponding channel according to selection. In this case, when the channel that is requested to be changed may be handled to additionally provide a PIP screen of the selected channel while an existing PIP screen is maintained. The added PIP screen may be selected and output to the selected region in the form of, for example, FIG. 86b or may be processed using a drag&drop method as illustrated in FIG. 86d.

When a cursor of an input device is moved to a PIP boundary region (or an edge region of a quadrangular shape) as illustrated in FIG. 86a, a corresponding PIP screen may provide a size change or position change GUI for providing a first inclined arrow directed towards an upper direction between upper and left arrows as well as highlight or up, down, right, and left directions as illustrated in FIG. 87c and a second inclined arrow directed towards a downward direction between a right arrow and a left arrow. For example, when the user moves the upper arrow upward while contacting the upper arrow, an image may be enlarged, when the user moves the lower arrange downward while contacting the lower arrow, the image may be reduced, when the user obliquely moves the first arrow upwards while contacting the first arrow, the image may be increased at a ratio with the same right and left ratio, and when the user obliquely moves the second arrow while contacting the second arrow, the image may be reduced at a ratio with the same right and left ratio. The adjustment GUI may also be used for position movement as well as for a size.

An icon for adjusting an image size simply by being moved to an edge portion may be generated and provided as illustrated in FIG. 87d. For example, when the cursor is positioned in a right edge of a PIP screen, icons extensible to a right edge may be generated and provided. In addition, when the cursor is positioned in a lower edge of the PIP screen, icons extensible to the lower edge may be generated and provided.

In addition, as illustrated in FIG. 88, when the cursor is positioned in a lower edge of the PIP screen, a menu may be provided or a lower end may be extended as illustrated in FIG. 88b in response to double-click of a user or a wheel movement level of an input device. In this case, a corresponding channel may be continuously provided in a first region of the extended PIP screen and detailed information on the channel may be provided or one or more different channels may be provided in a second region.

On the other hand, in FIG. 88a, when the cursor is positioned in a right edge of the PIP screen, only a right side may be extended as illustrated in FIG. 88c in response to double-click of a user or a wheel movement level of an input device. The wheel movement level may refer to a manner in which an image is gradually extended by moving a wheel upward and the image is gradually reduced by moving the wheel downward. In this case, extension or reduction may be applied directly to every wheel movement such that a user may intuitively recognize movement in response to the wheel movement level of the digital device. In this case, each region may be the same as the above detailed description of FIG. 88b.

In FIG. 88a, when the cursor is positioned in a left edge or upper edge of a PIP screen and a user applies double-click or moves a wheel of an input device, the PIP screen may be extended by as much as a ½ region of an entire screen to which the PIP screen belongs as illustrated in FIG. 88d. In this case, the PIP screen may be extended or a new PIP screen may be generated or provided in a region to which the PIP screen does not belong while an existing PIP is maintained. A region of FIG. 88d may also be handled using the aforementioned method.

In this case, referring to FIG. 88a, the PIP screen is positioned at an upper-right edge and, thus, the cursor with respect to an edge of FIG. 88a may be controlled as described above but the present invention is not limited thereto. In other words, the cursor with respect to an edge may be controlled using the same mechanism as the aforementioned mechanism according to a position, etc. of the PIP screen.

Figure 89:
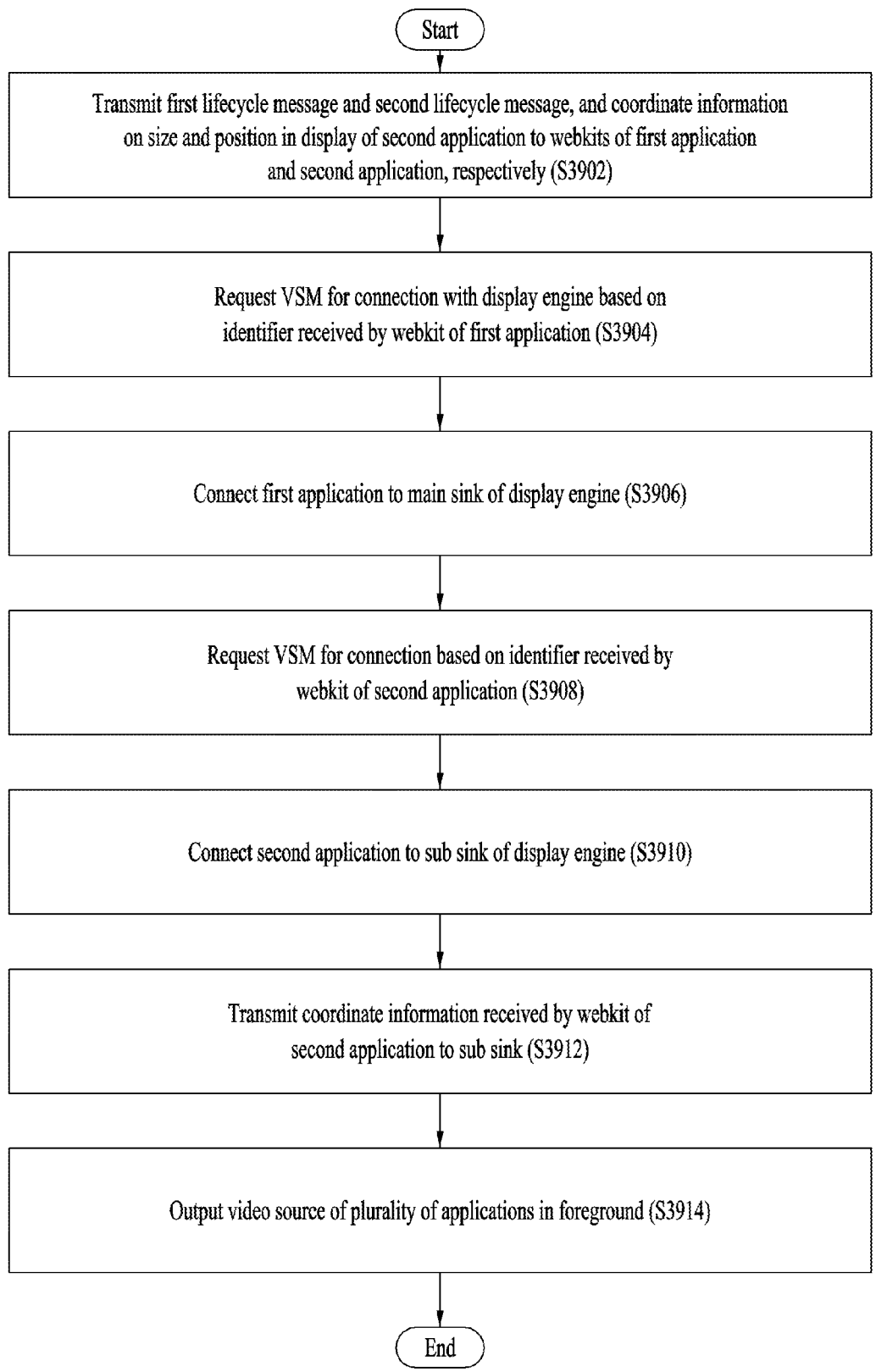
FIG. 89 is a flowchart for explanation of a PIP processing method according to an embodiment of the present invention.

FIG. 89 is a flowchart for explanation of a PIP processing method according to an embodiment of the present invention.

When a plurality of applications are in the foreground, a first lifecycle message and a second lifecycle message, and coordinate information on a size and a position in a display of the second application may be transmitted to Webkits of the first application and the second application, respectively (S8902).

The VSM may be requested for connection with the display engine based on an identifier received by the Webkit of the first application (S8904).

The first application may be connected to a main sink of the display engine (S8906). The VSM may be requested for connection based on an identifier received by the Webkit of the second application (S8908).

The second application may be connected to a sub sink of the display engine (S8910) and the coordinate information received by the Webkit of the second application may be transmitted to the sub sink (S8912).

A video source of a plurality of applications in the foreground may be output (S8914).

In the above case, the lifecycle message may be at least one of a full-screen message, a mid-sized message, and a minimized message. The mid-sized message may be used to control execution of a corresponding application in a PIP screen and the minimized message may be used to control execution of a corresponding application in the background.

In the above case, when a display window according to the sub sink is moved, the lifecycle message according to movement and changed coordinate information may be transmitted to the Webkit of the second application.

In addition, the Webkit of the second application may not request the VSM for disconnection from the sub sink according to a movement message and the changed coordinate information, may transmit only the changed coordinate information to the sub sink, and may set the display window according to the changed coordinate information. Upon receiving a full-screen message as a lifecycle message from the LSM, the Webkit of the second application may request the VSM for disconnection from a pre-connected sub sink and may request the VSM for connection with the main sink. In addition, the Webkit of the second application may request the main sink for display window setting.

The LSM may also transmit corresponding coordinate information only when the mid-sized message and the movement message of the lifecycle message are transmitted.

In addition, when output of the first application or the second application is changed such that the first application or the second application is output as a full-screen and then output as a PIP screen, window transition may occur. In the above case, at least one of the first application and the second application may include a video source.

MODE FOR INVENTION

The digital device with a web operating system (OS) installed therein and a method of handling a service or an application in the digital device according to the present specification are not limited to the configurations and methods of the above-described embodiments. That is, the above-described embodiments may be partially or wholly combined to make various modifications.

An operating method of a digital device according to the present specification can also be embodied as processor readable codes on a processor readable recording medium. The processor readable recording medium is any data storage device that can store data which can be thereafter read by a processor. Examples of the processor readable recording medium include read-only memory (ROM), random-access memory (RAM), CD-ROMs, magnetic tapes, floppy discs, optical data storage devices, etc. The processor readable recording medium can also be embodied in the form of carrier-wave such as transmission via the Internet. The processor readable recording medium can also be distributed over network coupled computer systems so that the processor readable code is stored and executed in a distributed fashion.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention relates to a digital device and can be used in overall industrial fields using a digital device.

The invention claimed is:

1. A digital device comprising:
a display processor configured to transmit a first lifecycle message and a second lifecycle message, and coordinate information on a size and a position in a display of a second application to Webkits of a first application and the second application, respectively when a plurality of applications are in the foreground;
a display engine comprising a main sink for the first application and a sub sink for the second application; and
a video processor configured to connect the first application to the main sink of the display engine according to an identifier and connection request received by the Webkit of the first application, to connect the second application to the sub sink of the display engine according to an identifier and connection request received by the Webkit of the second application, and to output a video source of the plurality of applications in the foreground.

2. The digital device according to claim 1, wherein the lifecycle message comprises at least one of a full-screen message, a mid-sized message, and a minimized message.

3. The digital device according to claim 2, wherein the mid-sized message is used to control execution of a corresponding application in a picture in picture (PIP) screen and the minimized message is used to control execution of a corresponding application in the background.

4. The digital device according to claim 1, wherein, when a display window according to the sub sink is moved, the display processor transmits a lifecycle message according to the movement and changed coordinate information to the Webkit of the second application.

5. The digital device according to claim 4, wherein the Webkit does not request the video processor for disconnection from the sub sink according to a movement message and the changed coordinate information, transmits only the changed coordinate information to the sub sink, and sets the display window according to the changed coordinate information.

6. The digital device according to claim 2, wherein, upon receiving a full-screen message as a lifecycle message from the display processor, the Webkit of the second application requests the video processor for disconnection from the pre-connected sub sink and requests the video processor for connection with the main sink.

7. The digital device according to claim 6, wherein the Webkit of the second application requests the main sink to set the display window.

8. The digital device according to claim 2, wherein the display processor transmits corresponding coordinate information together only when transmitting a mid-sized message and a movement message of the lifecycle message.

9. The digital device according to claim 2, wherein, when output of the first application or the second application is changed such that the first application or the second application is output as a full-screen and then output as a PIP screen, window transition occurs.

10. The digital device according to claim 9, wherein at least one of the first application and the second application comprises a video source.

11. A method of processing an application, the method comprising:
transmitting a first lifecycle message and a second lifecycle message, and coordinate information on a size and a position in a display of a second application to Webkits of a first application and the second application, respectively when a plurality of applications are in the foreground, by a display processor;
requesting a video processor for connection with a display engine based on an identifier received by the Webkit of the first application;

connecting the first application to a main sink of the first application;

requesting the video processor for connection based on an identifier received by the Webkit of the second application;

connecting the second application to a sub sink of the display engine;

transmitting the coordinate information received by the Webkit of the second application to the sub sink; and outputting a video source of the plurality of application in the foreground.

12. The method according to claim 11, wherein the lifecycle message comprises at least one of a full-screen message, a mid-sized message, and a minimized message.

13. The method according to claim 12, wherein the mid-sized message is used to control execution of a corresponding application in a picture in picture (PIP) screen and the minimized message is used to control execution of a corresponding application in the background.

14. The method according to claim 11, further comprising: when a display window according to the sub sink is moved, transmitting a lifecycle message according to the movement and changed coordinate information to the Webkit of the second application.

15. The method according to claim 14, wherein the Webkit does not request the video processor for disconnection from the sub sink according to a movement message and the changed coordinate information, transmits only the changed coordinate information to the sub sink, and sets the display window according to the changed coordinate information.

16. The method according to claim 12, wherein, upon receiving a full-screen message as a lifecycle message from the display processor, the Webkit of the second application requests the video processor for disconnection from the pre-connected sub sink and requests the video processor for connection with the main sink.

17. The method according to claim 16, wherein the Webkit of the second application requests the main sink to set the display window.

18. The method according to claim 12, wherein the display processor transmits corresponding coordinate information together only when transmitting a mid-sized message and a movement message of the lifecycle message.

19. The method according to claim 12, wherein, when output of the first application or the second application is changed such that the first application or the second application is output as a full-screen and then output as a PIP screen, window transition occurs.

20. The method according to claim 19, wherein at least one of the first application and the second application comprises a video source.

* * * * *